United States Patent [19]

Mussatt

[11] 4,302,784
[45] Nov. 24, 1981

[54] METHOD AND APPARATUS FOR CONTROLLING TAPE RECORDER

[75] Inventor: Thomas J. Mussatt, Riverton, Ill.

[73] Assignee: Sangamo Weston, Inc., Atlanta, Ga.

[21] Appl. No.: 127,937

[22] Filed: Mar. 7, 1980

Related U.S. Application Data

[62] Division of Ser. No. 897,136, Apr. 17, 1978, Pat. No. 4,214,284.

[30] Foreign Application Priority Data

Apr. 18, 1977 [GB] United Kingdom ............... 16063/77

[51] Int. Cl.³ ............................................. G11B 15/48
[52] U.S. Cl. ..................................... 360/71; 360/72.1; 360/72.3; 360/74.1
[58] Field of Search ....................... 360/71, 72.1, 72.3, 360/74.1

[56] References Cited

U.S. PATENT DOCUMENTS 4,054,924 10/1977 Zimmerman .................. 360/74.1 X
4,214,284 7/1980 Mussatt ............................ 360/74.1

Primary Examiner—Harold I. Pitts
Attorney, Agent, or Firm—Emrich, Root, Lee, Brown & Hill

[57] ABSTRACT

Control apparatus for a tape recorder includes a Central Processor Unit (CPU) and a Control Panel having data entry switches, mode selection switches, speed selection switches, a multiposition function select switch and other controls and a display, all of which communicate with the CPU. The system enables the operator to enter commands to be executed by the CPU in controlling the tape transport as predetermined footage locations on the tape (such as Beginning of Data or End of Data) or at a predetermined value of parameters, such as tape pack diameters of the reel being emptied or filled (Beginning of Tape or End of Tape).

3 Claims, 61 Drawing Figures

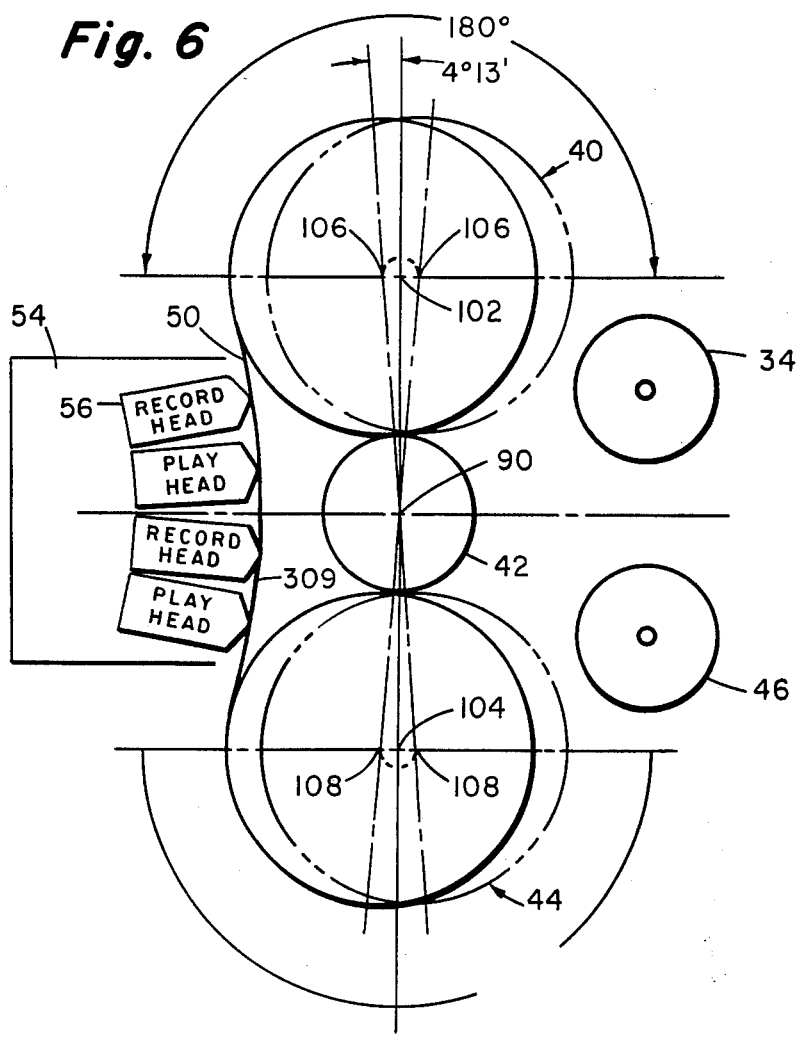
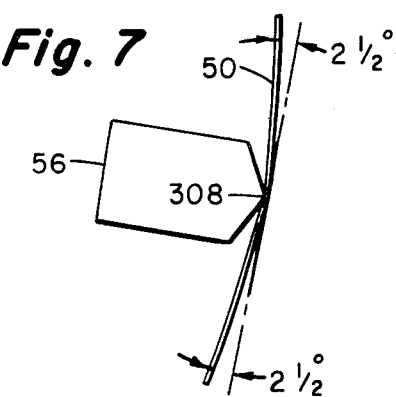

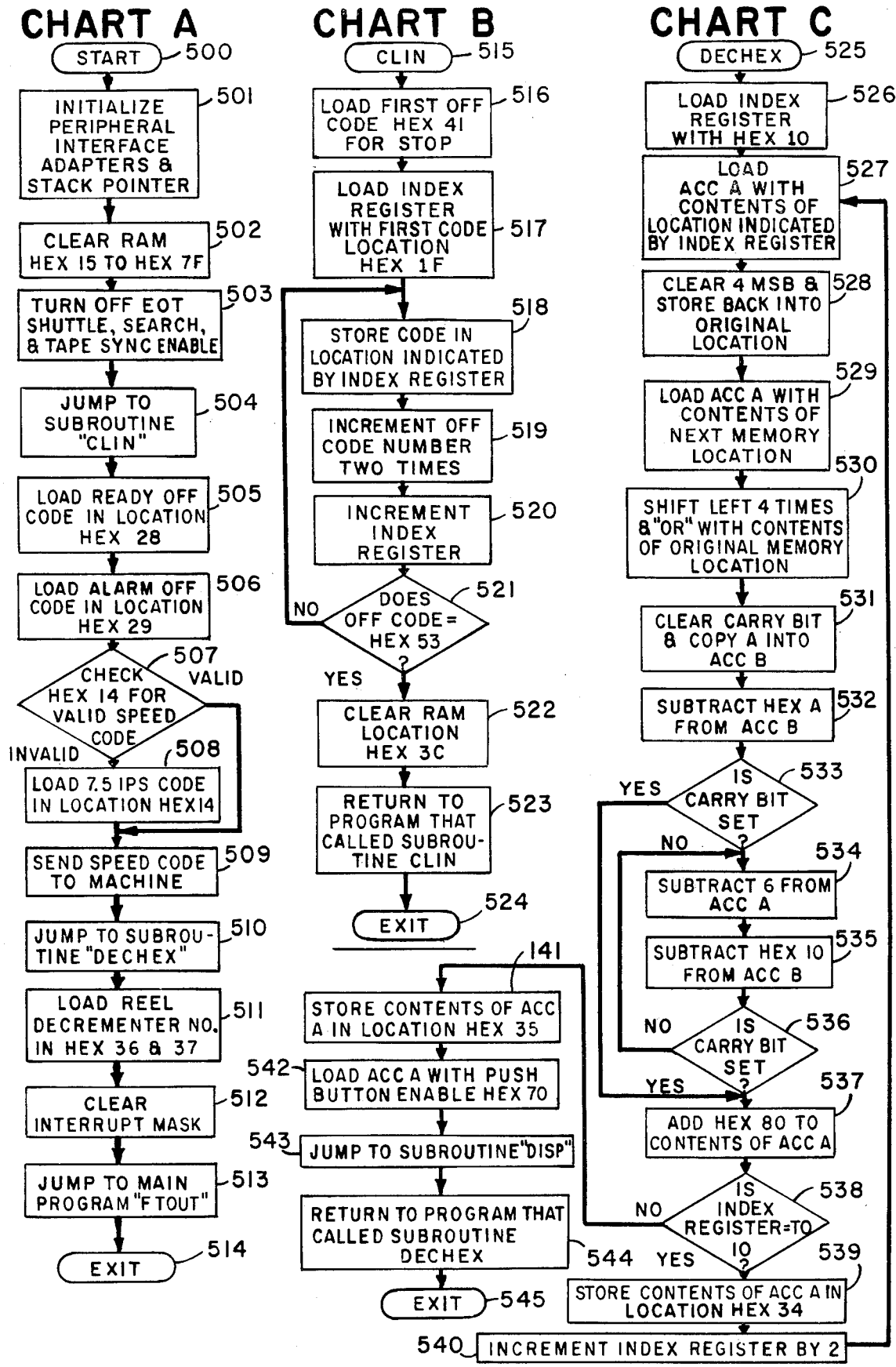

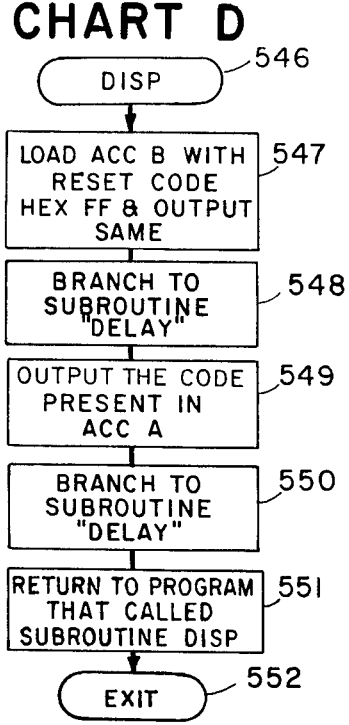
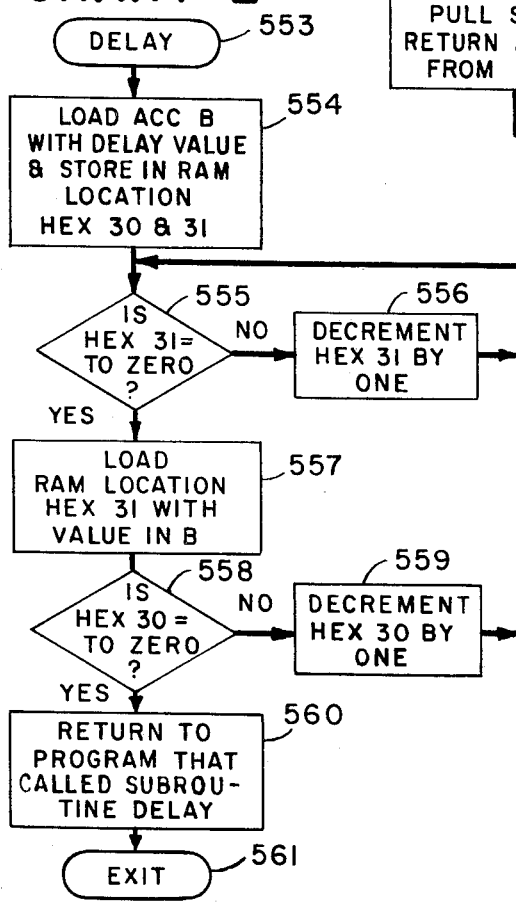
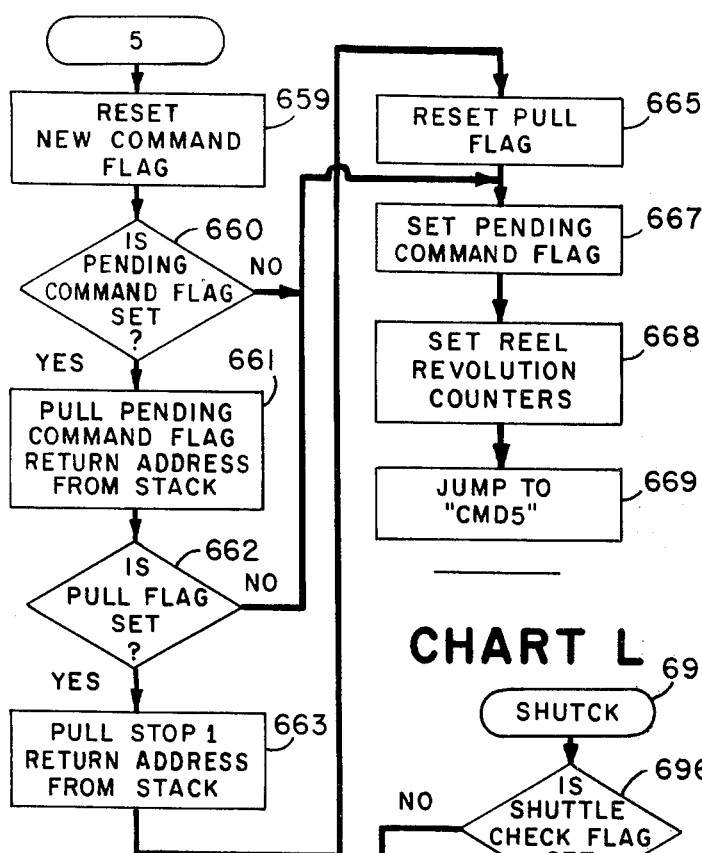
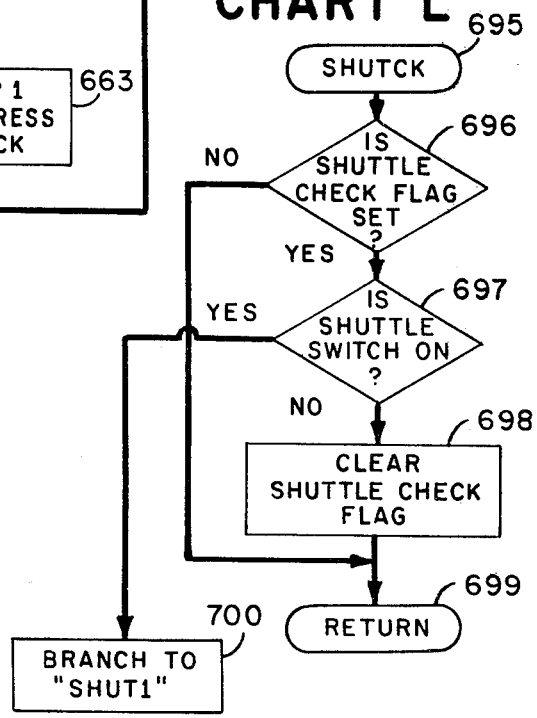

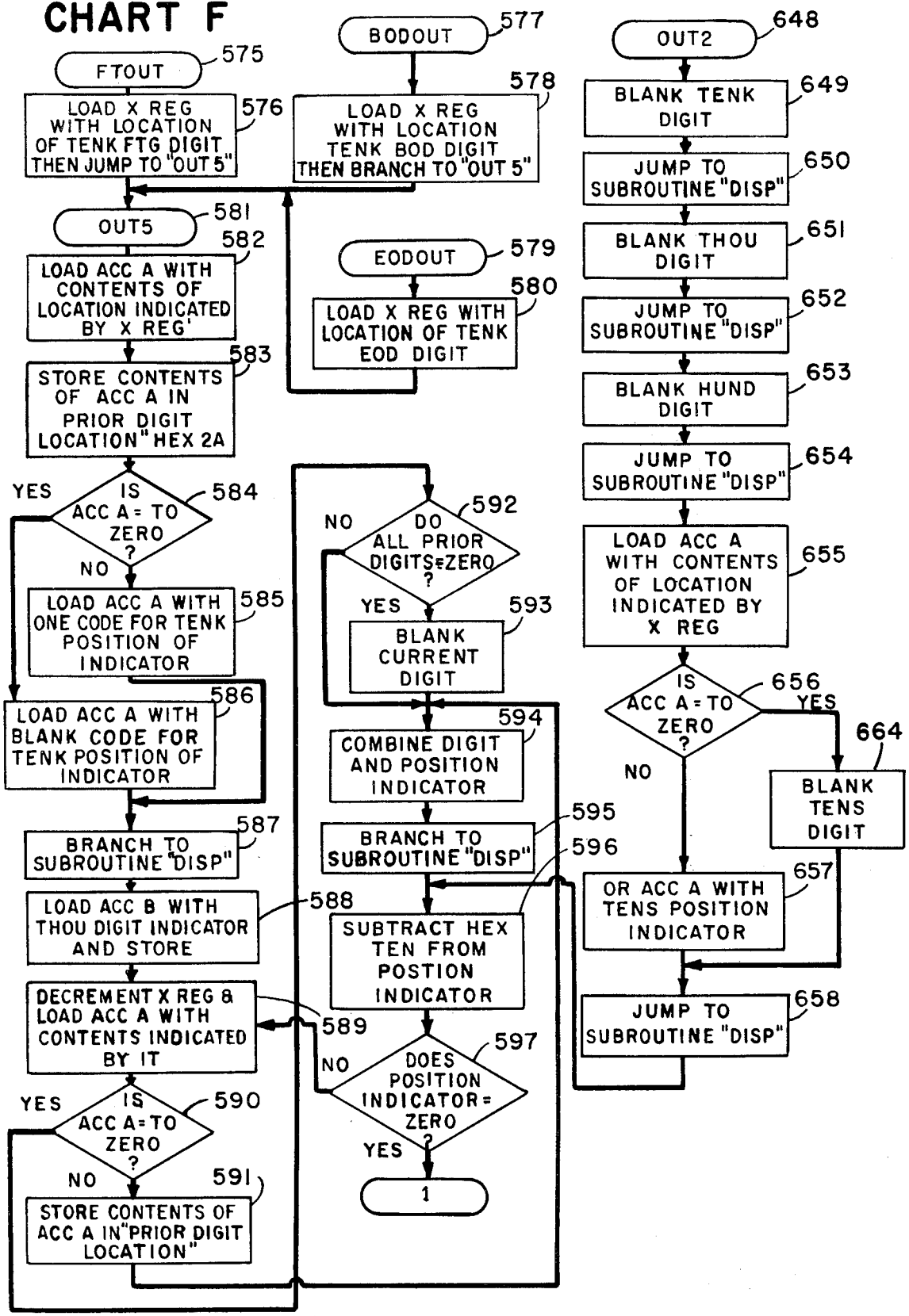

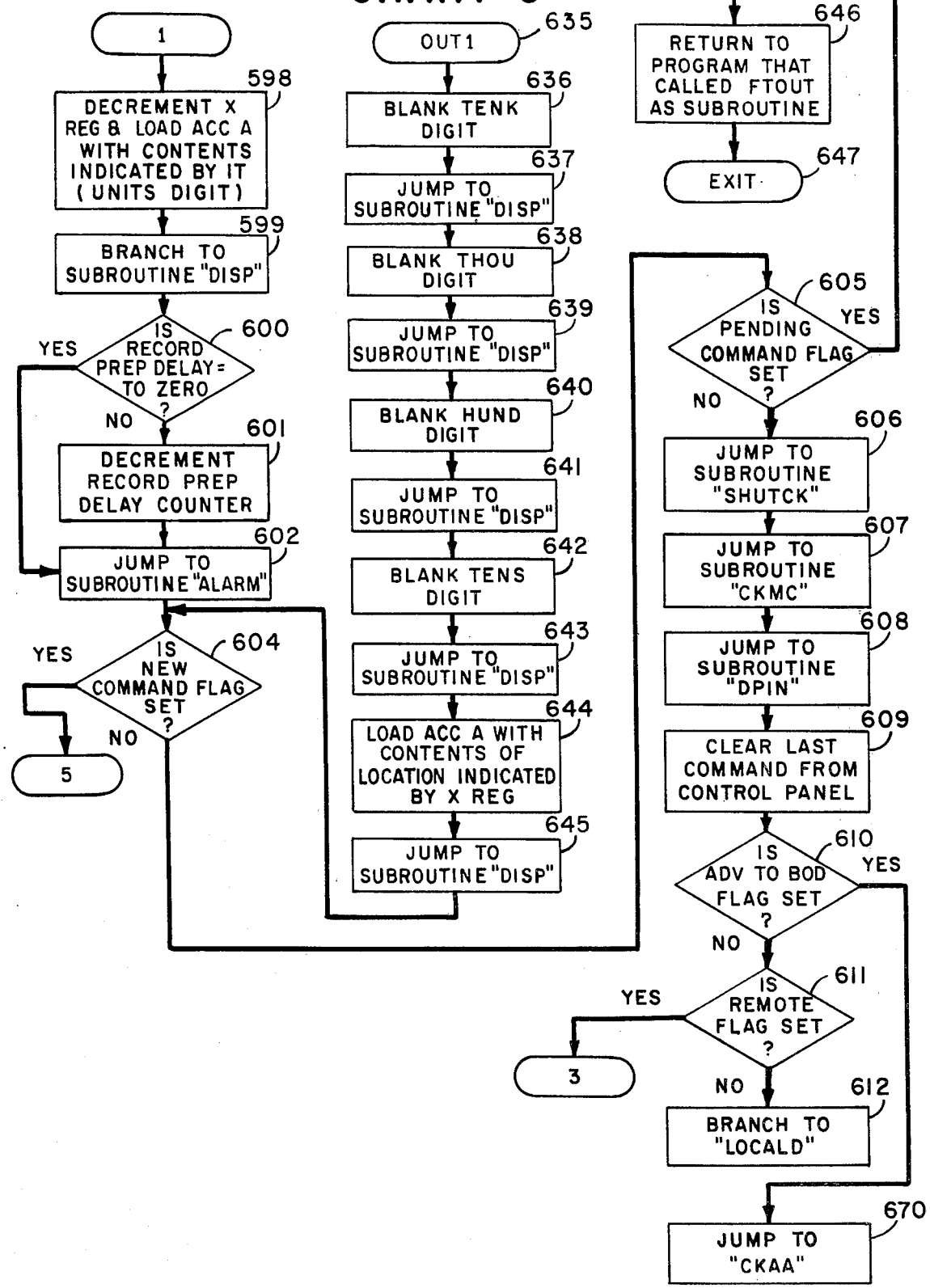

CHART J
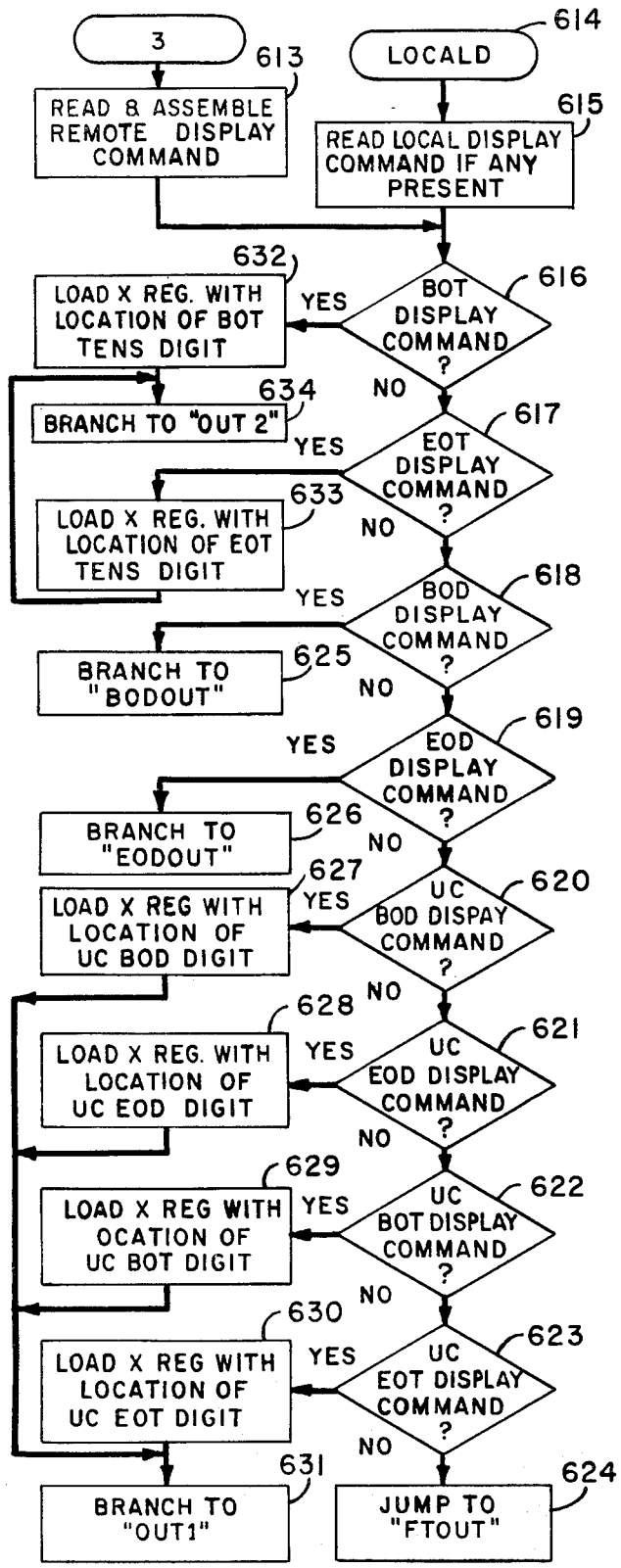
CHART K
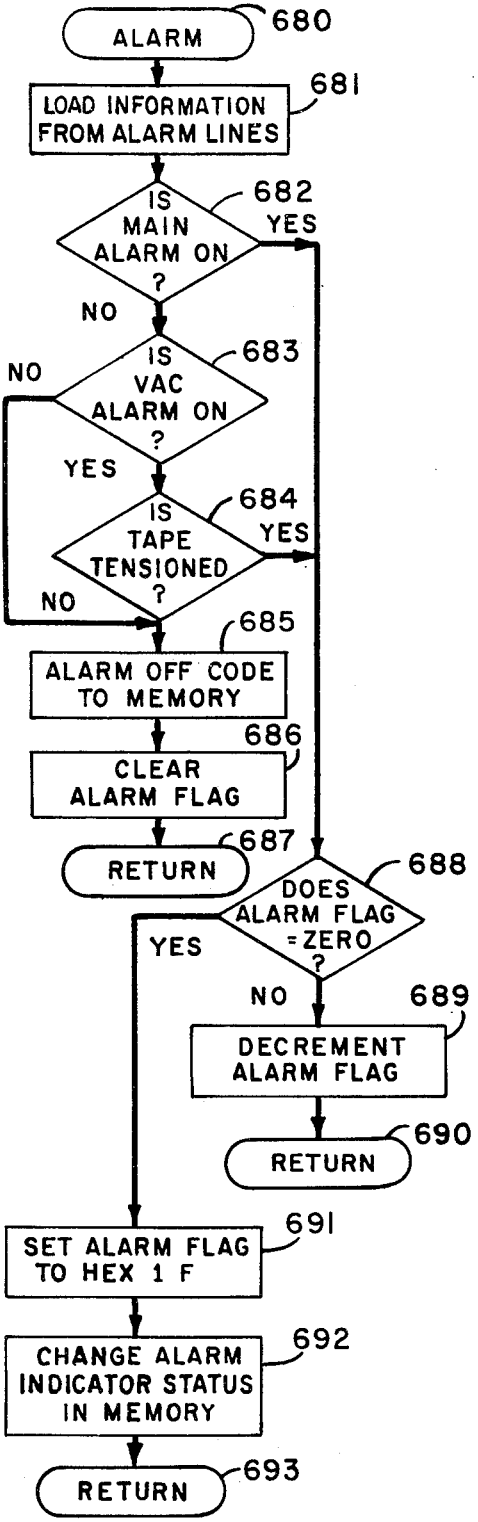

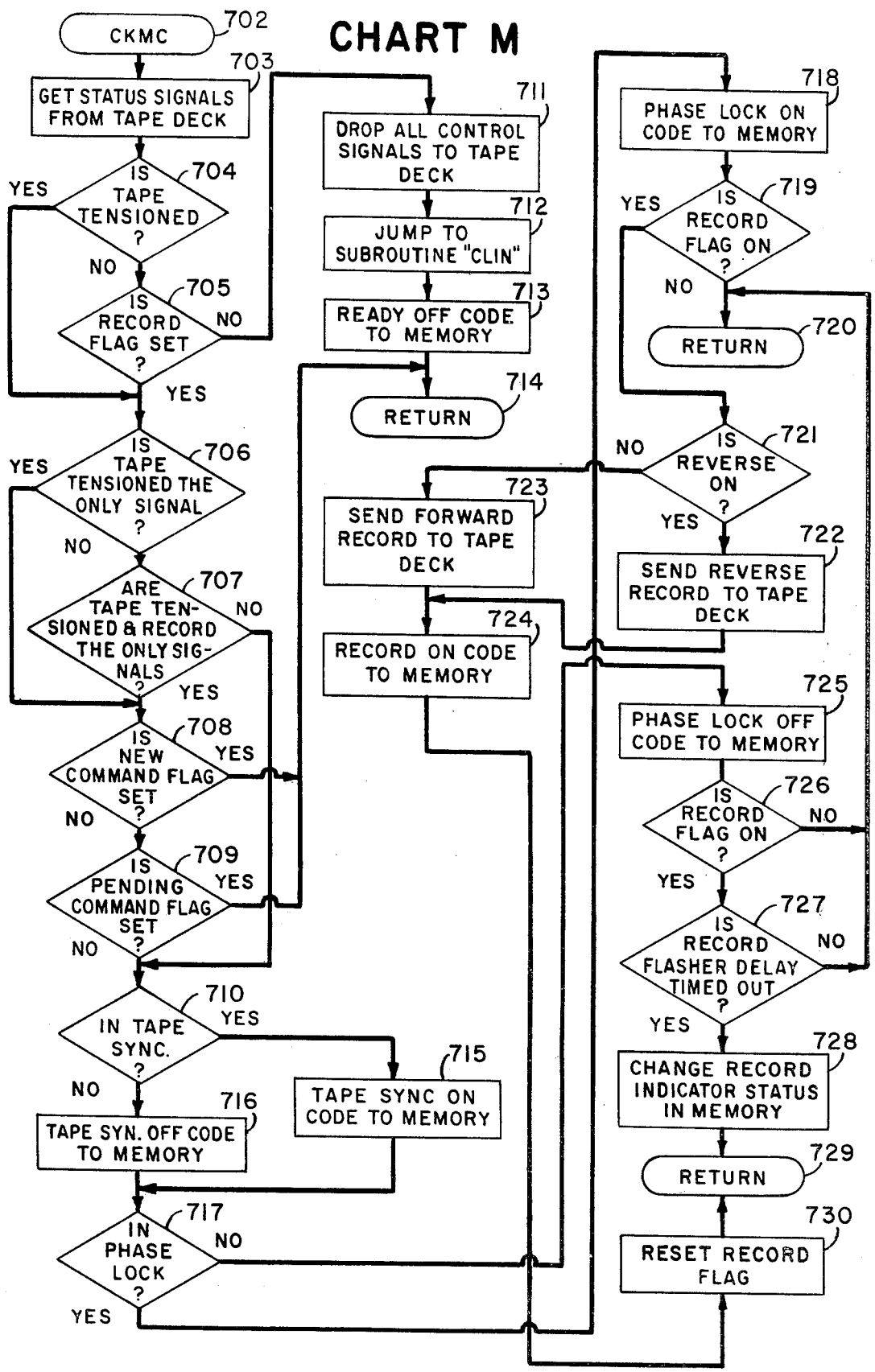

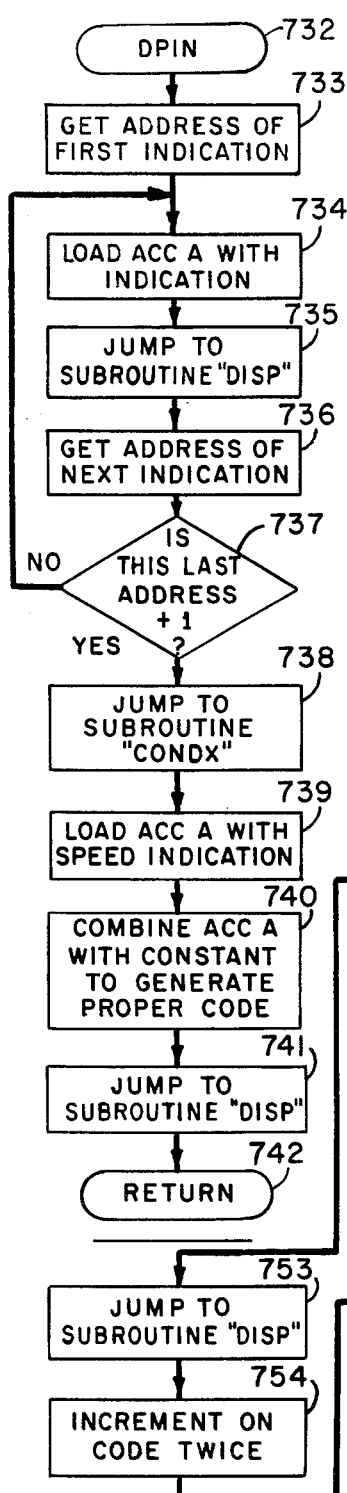
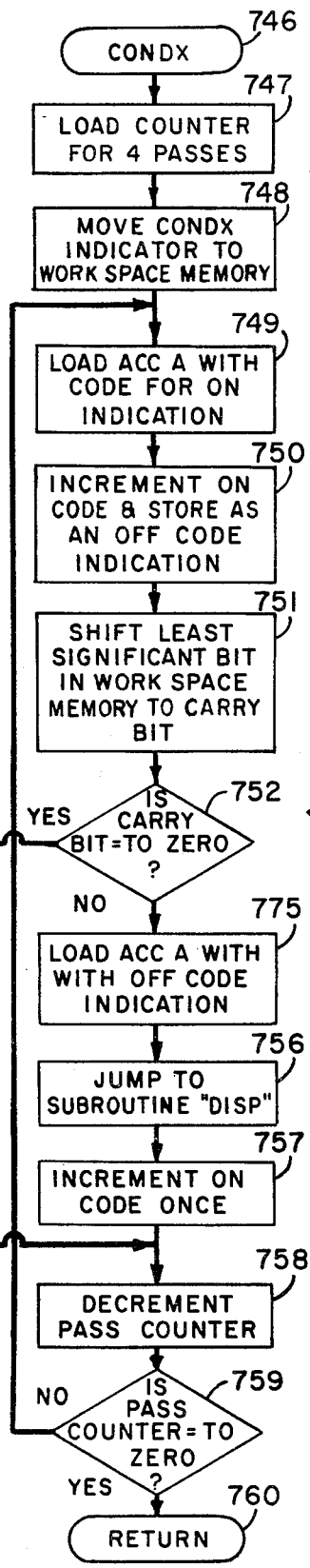
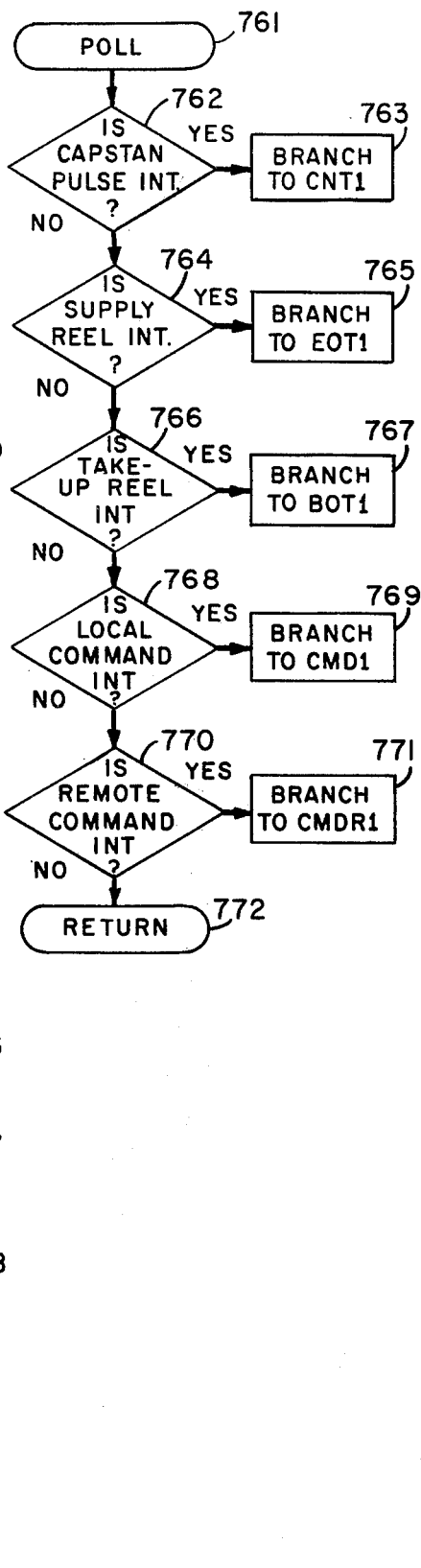

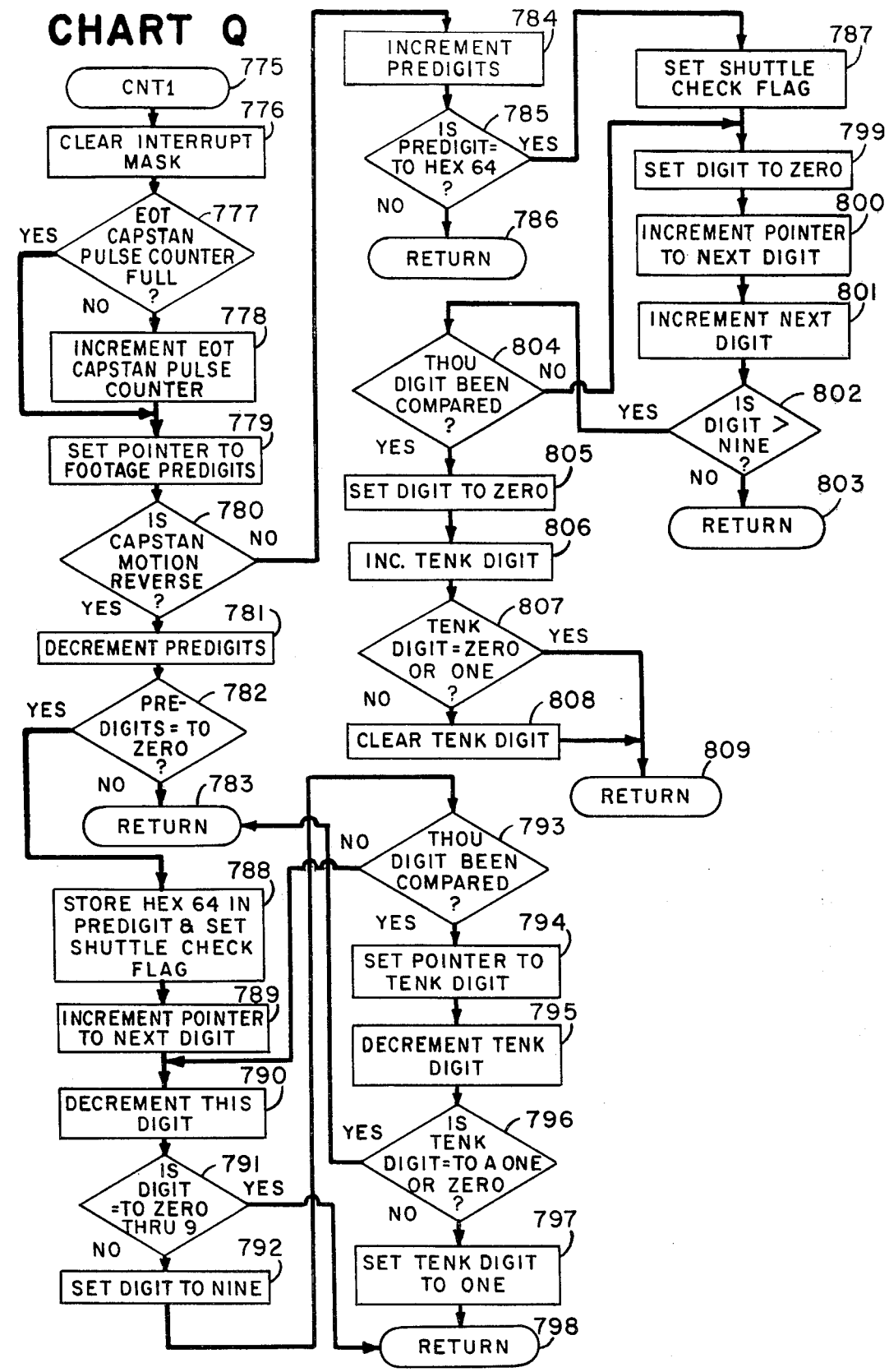

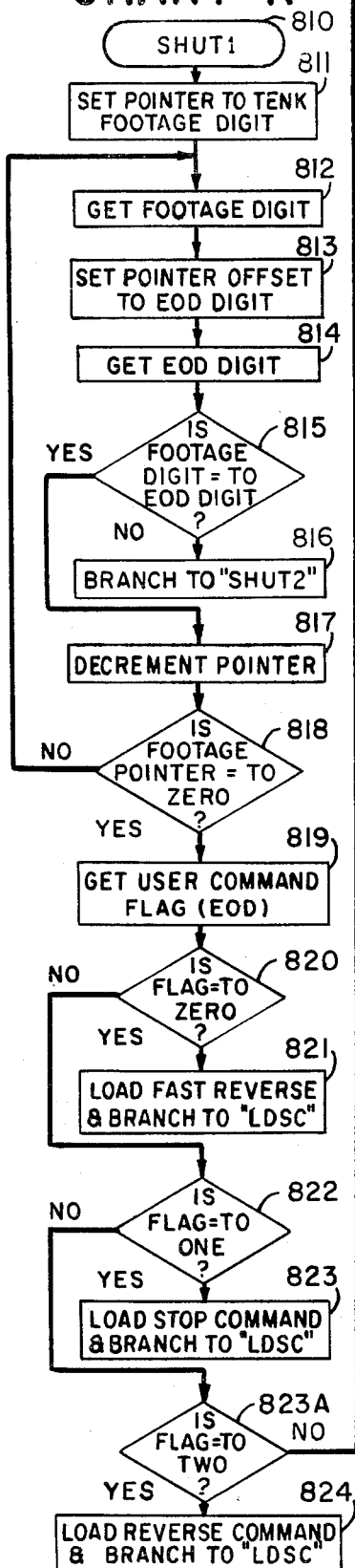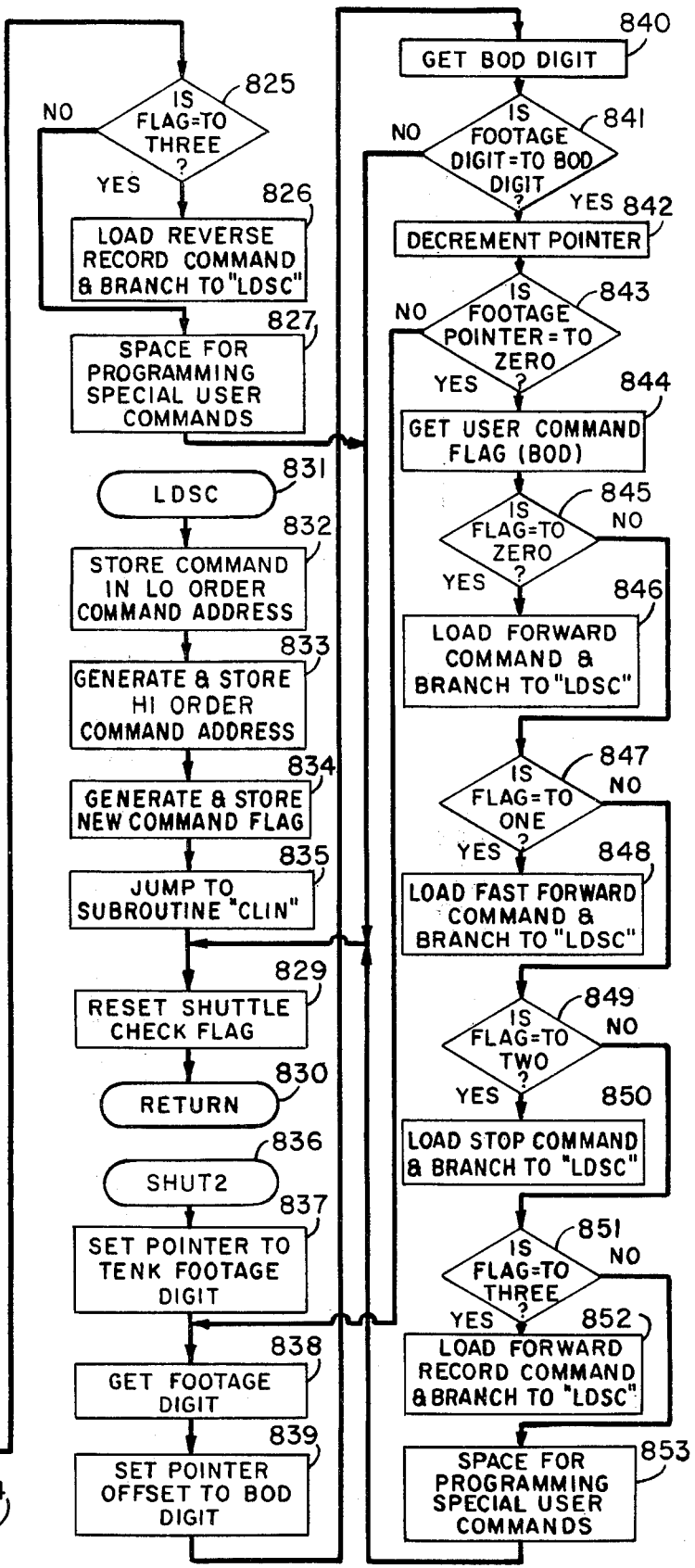

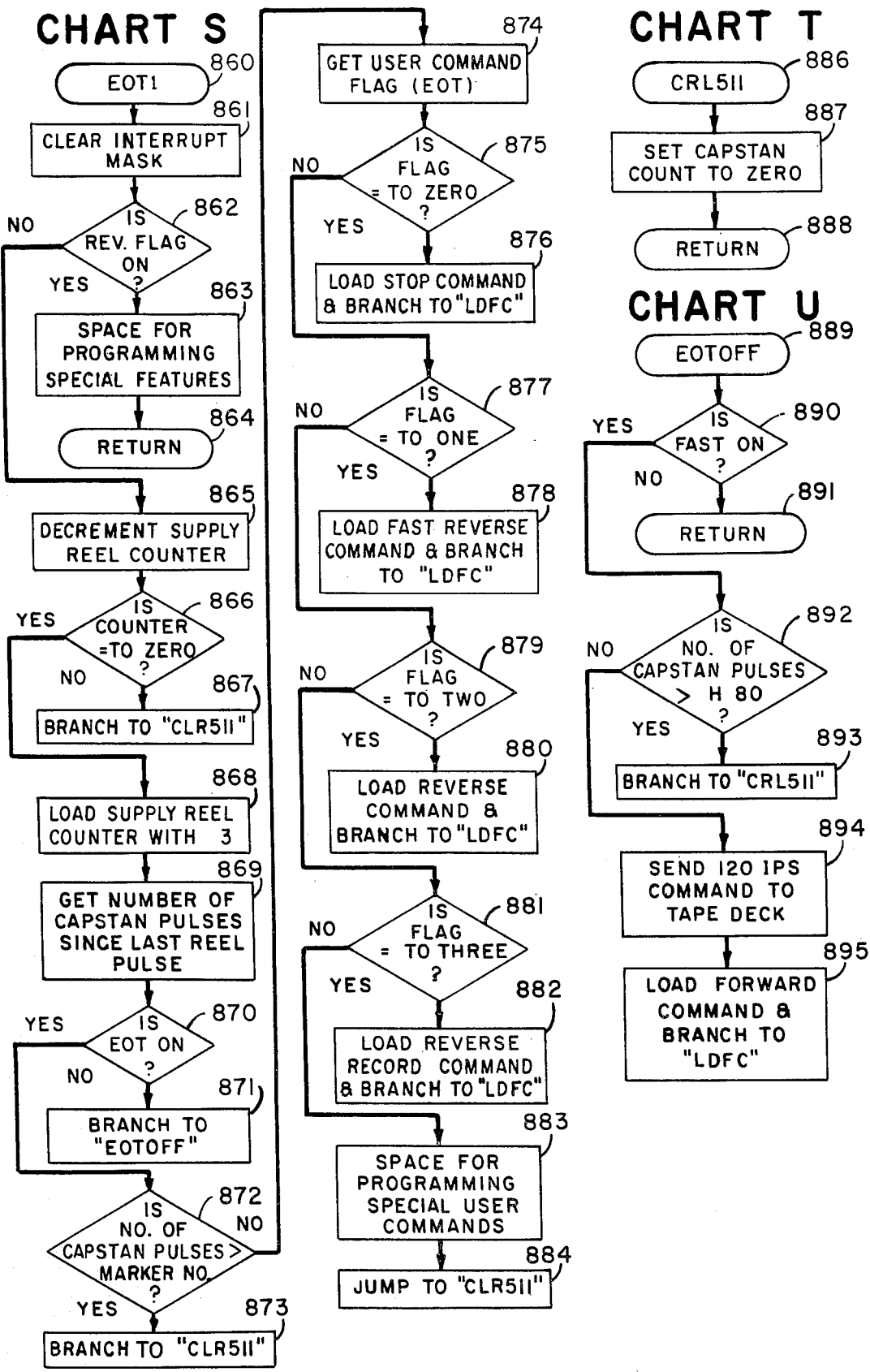

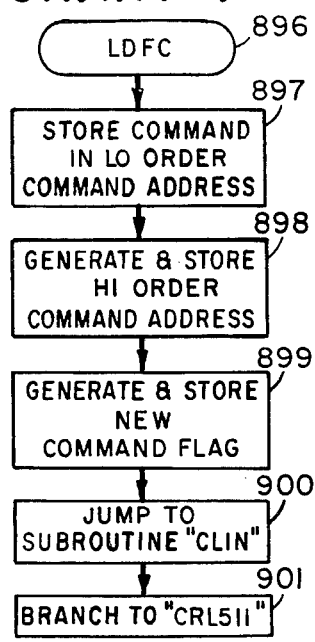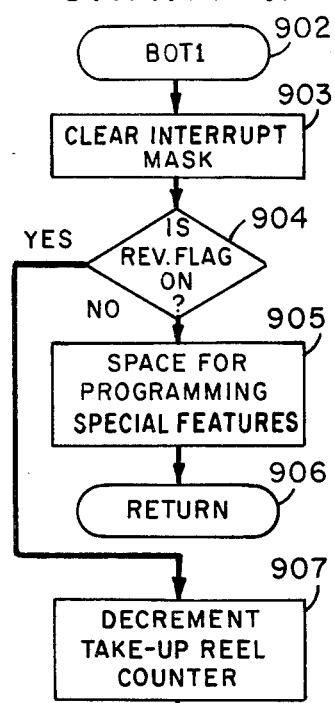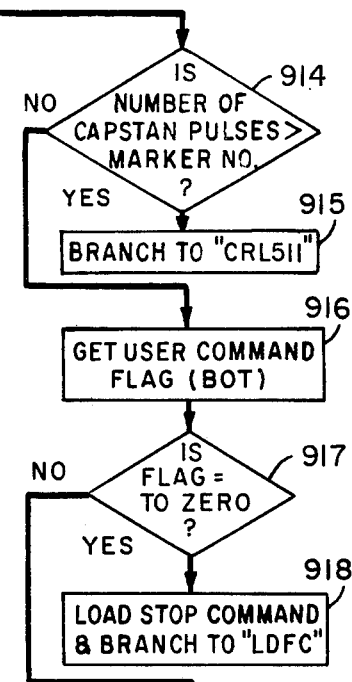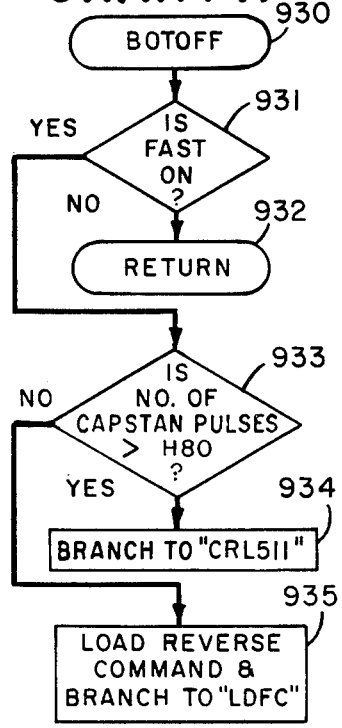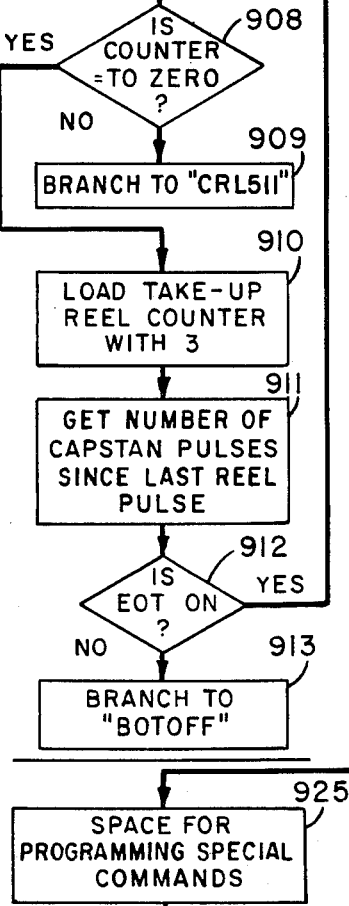

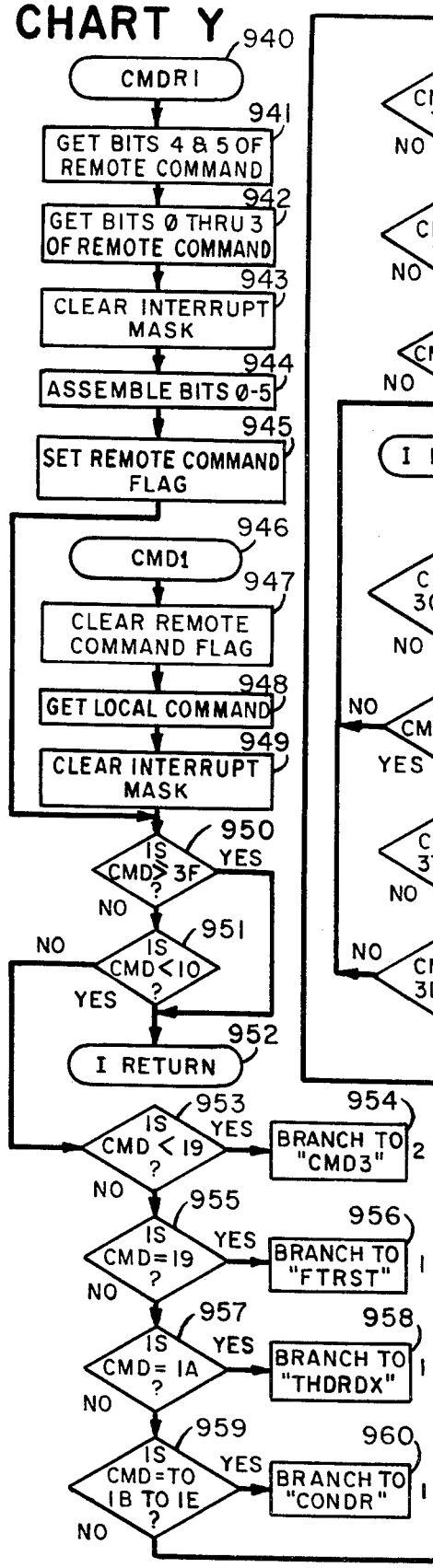
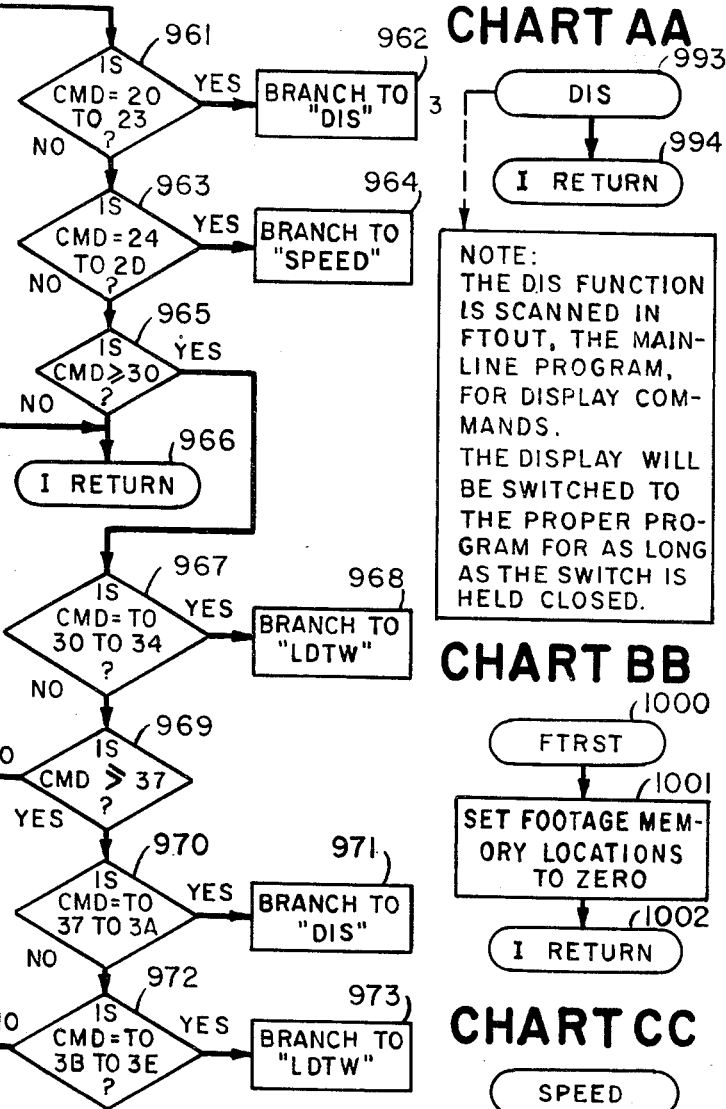
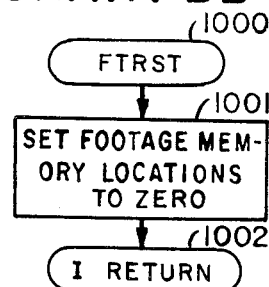
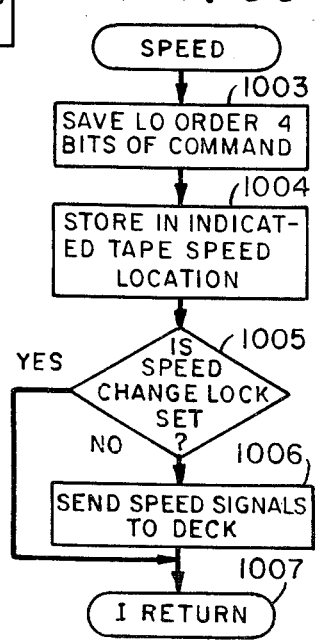

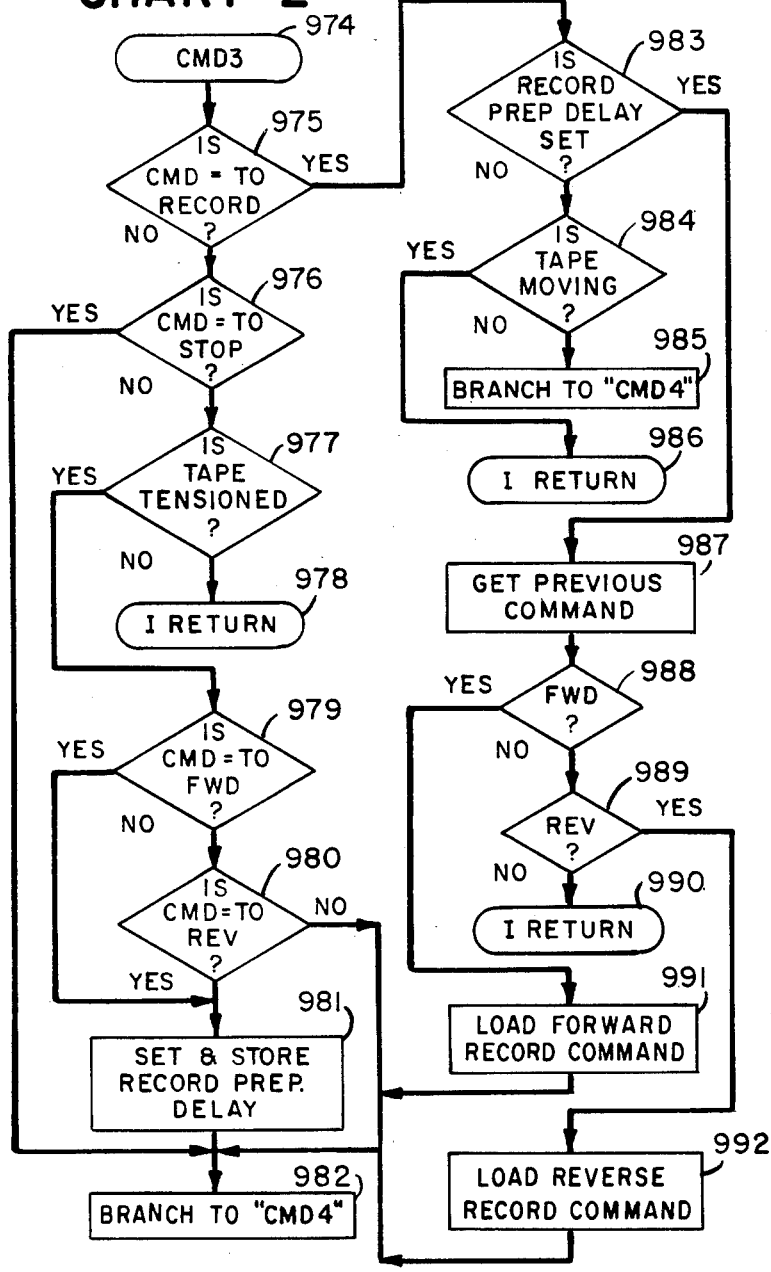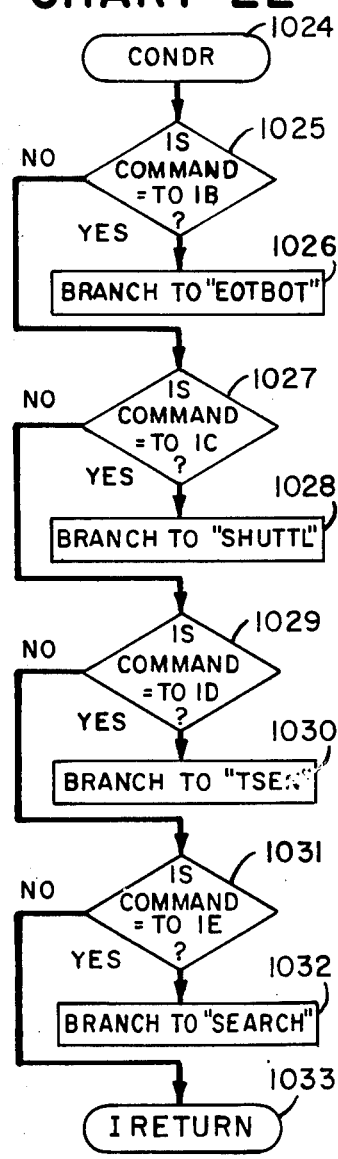

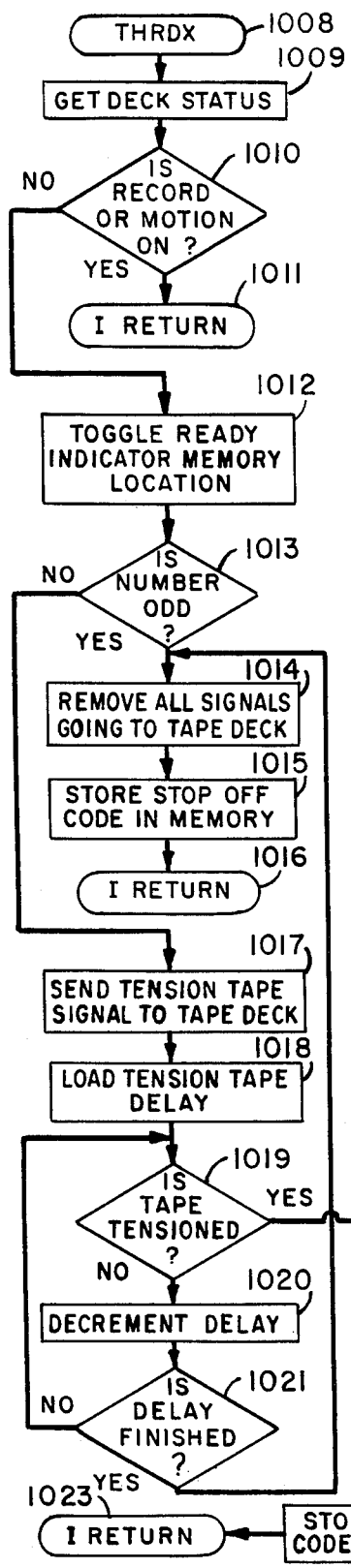
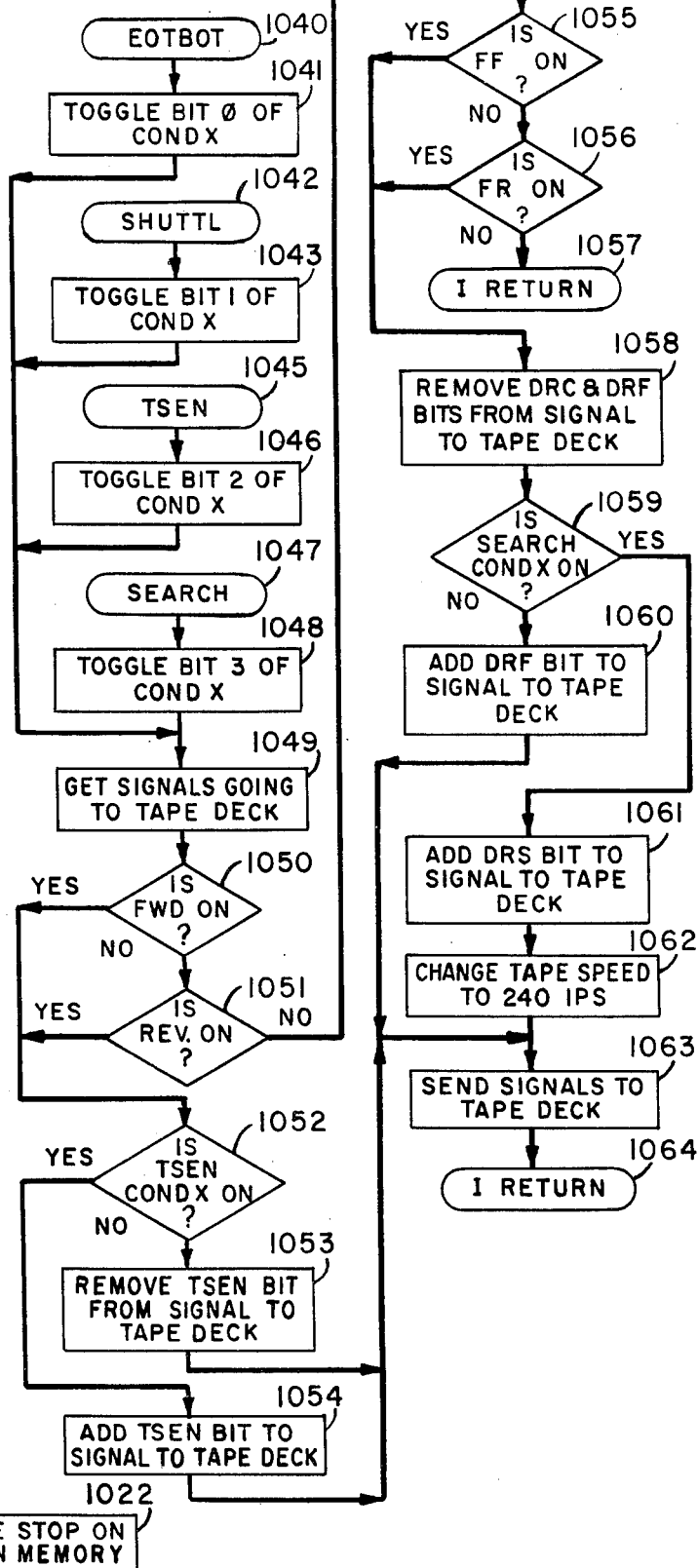

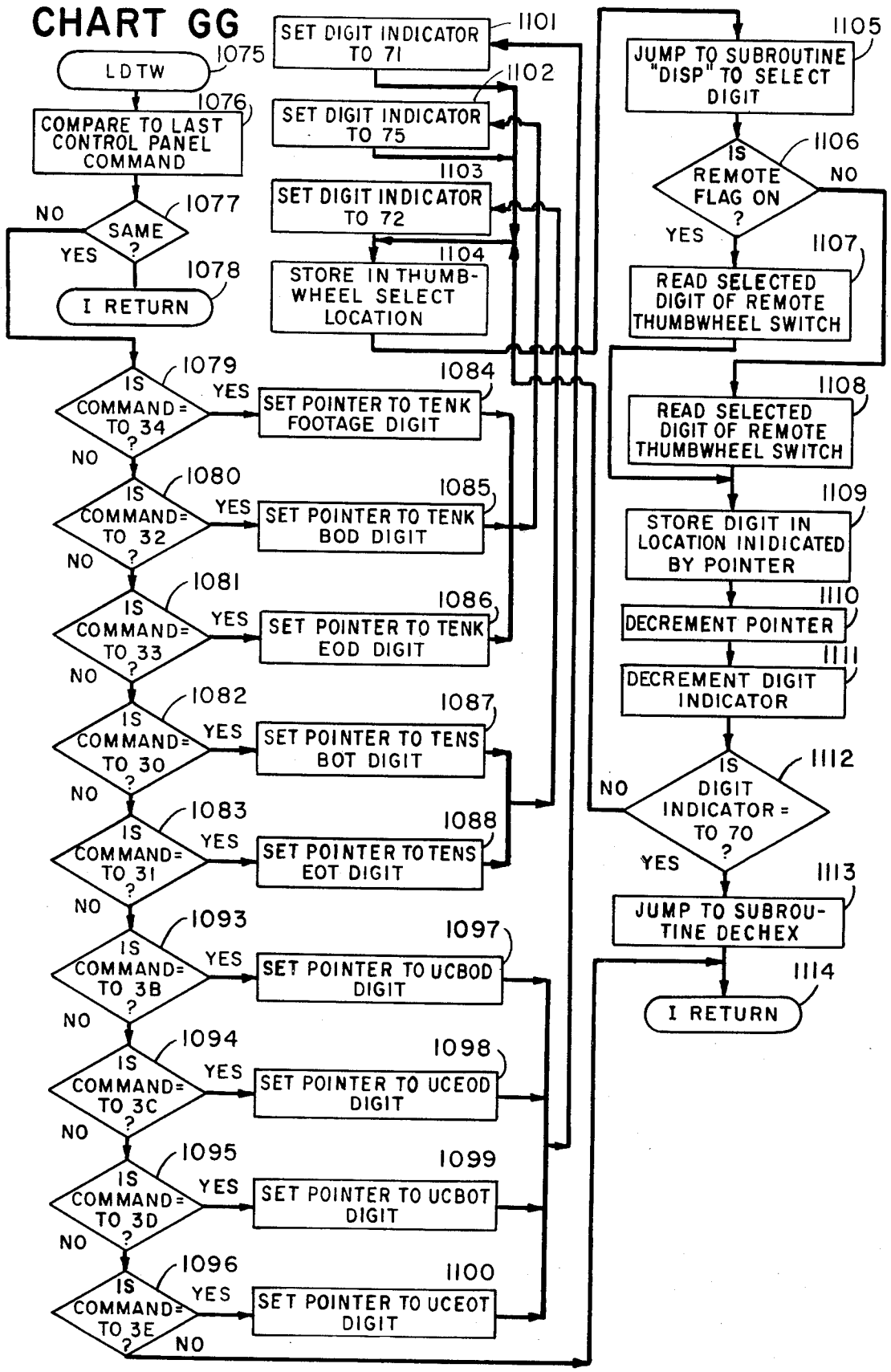

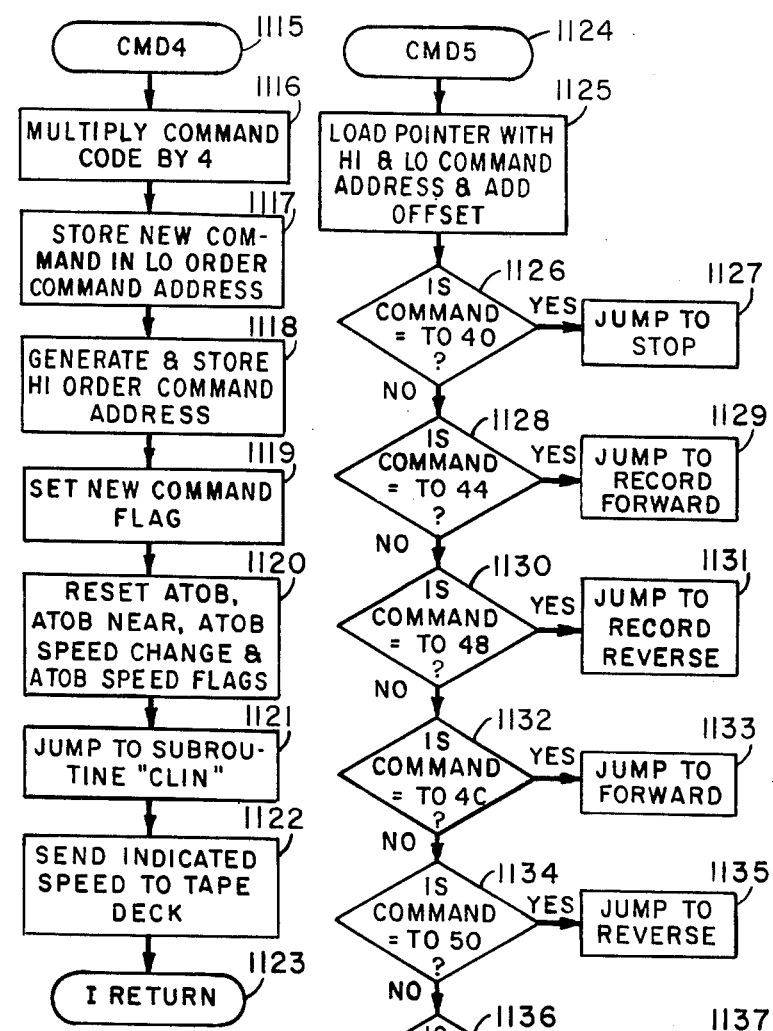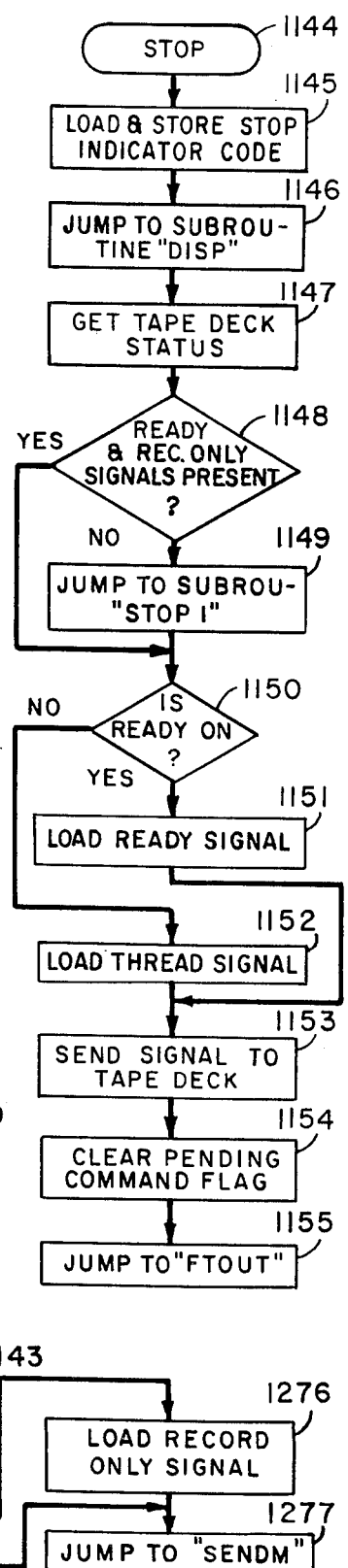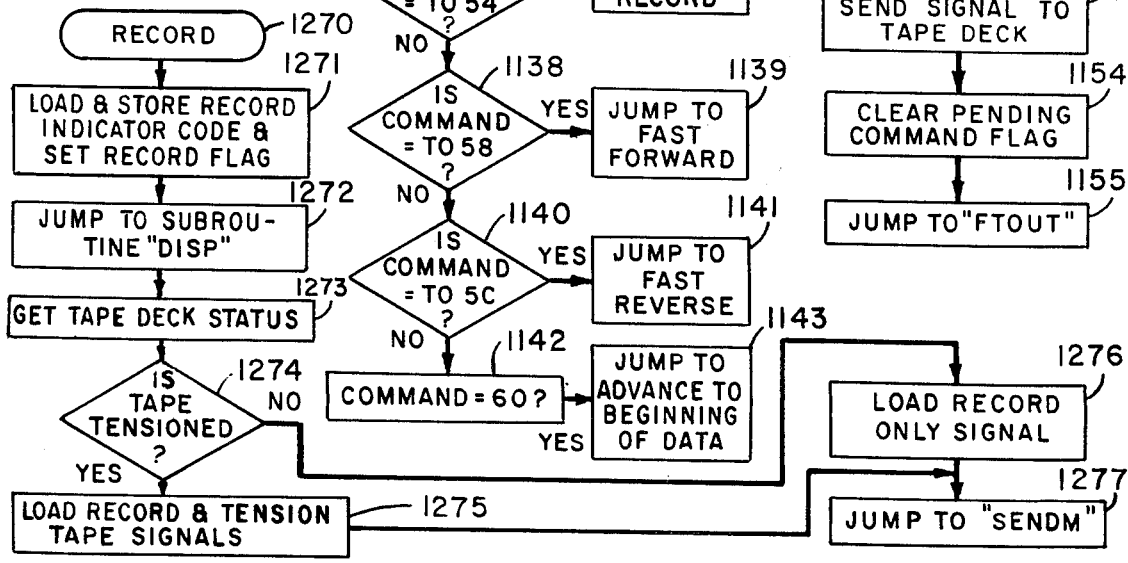

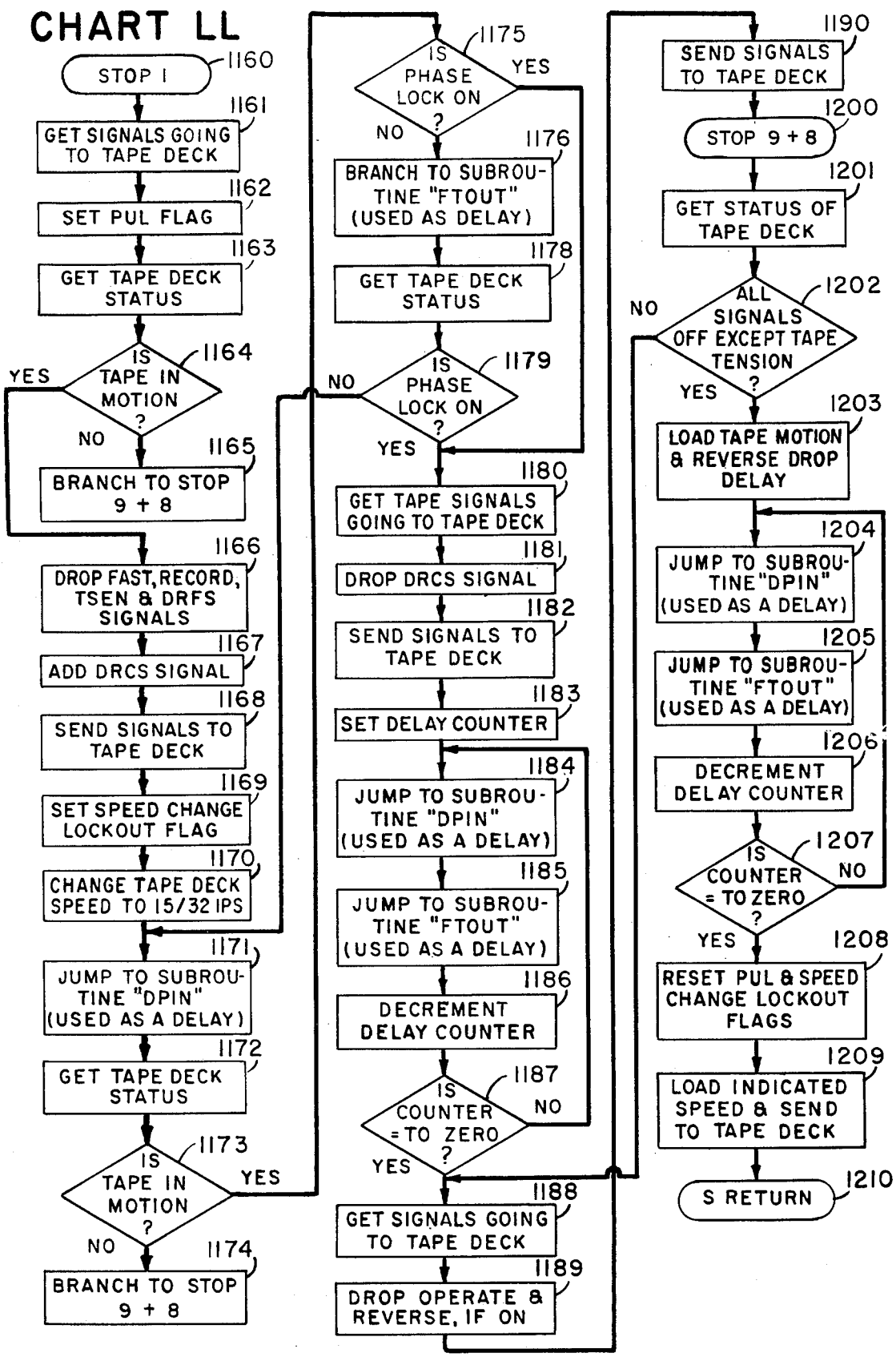

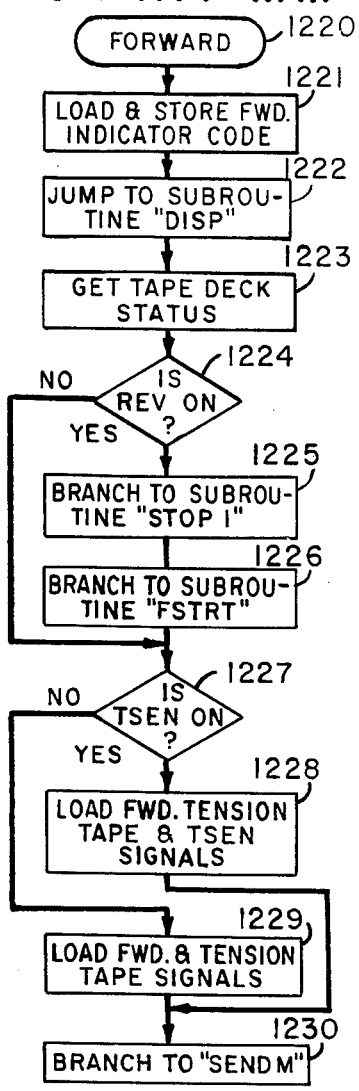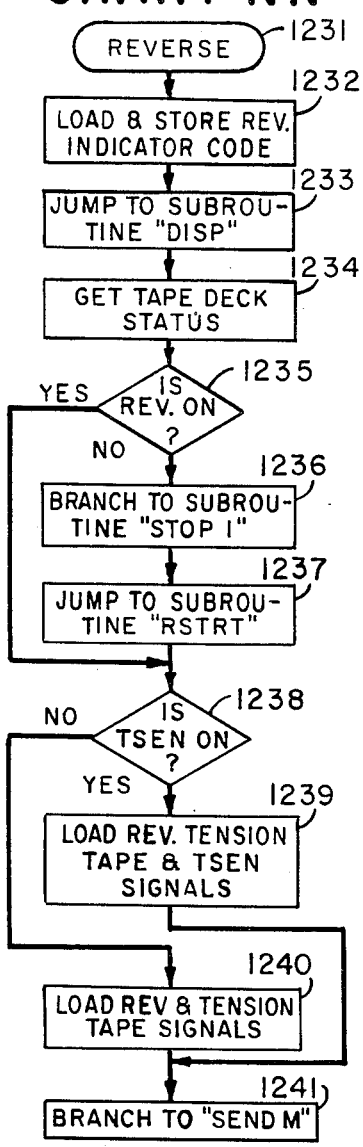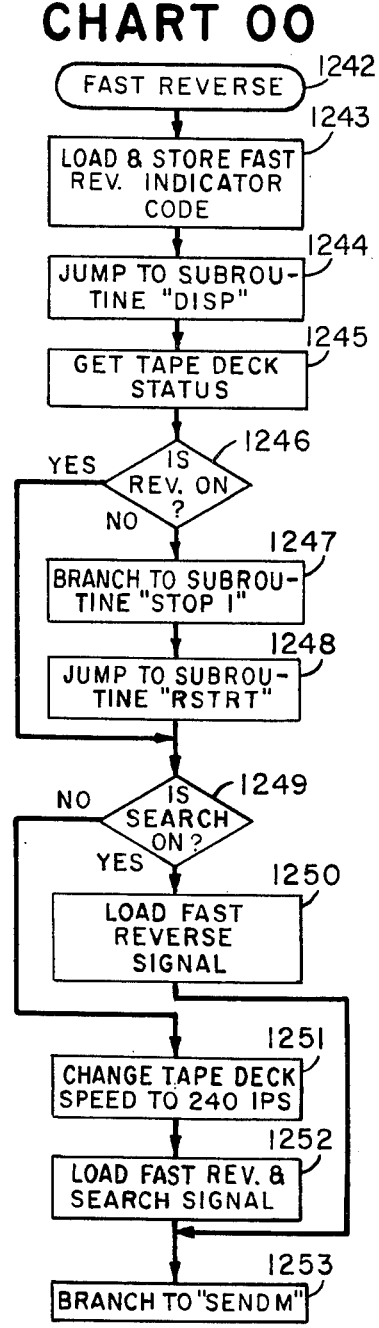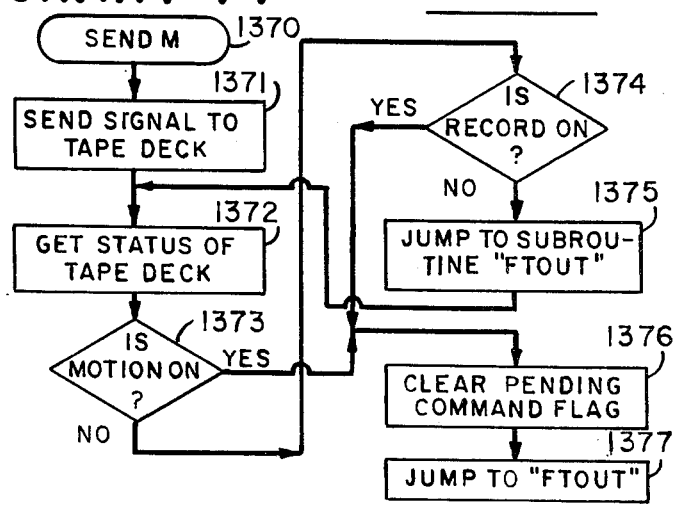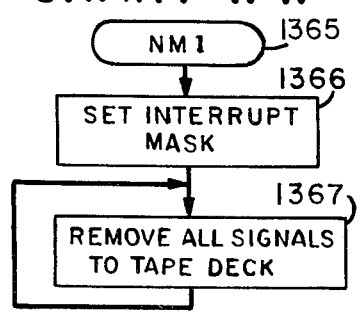

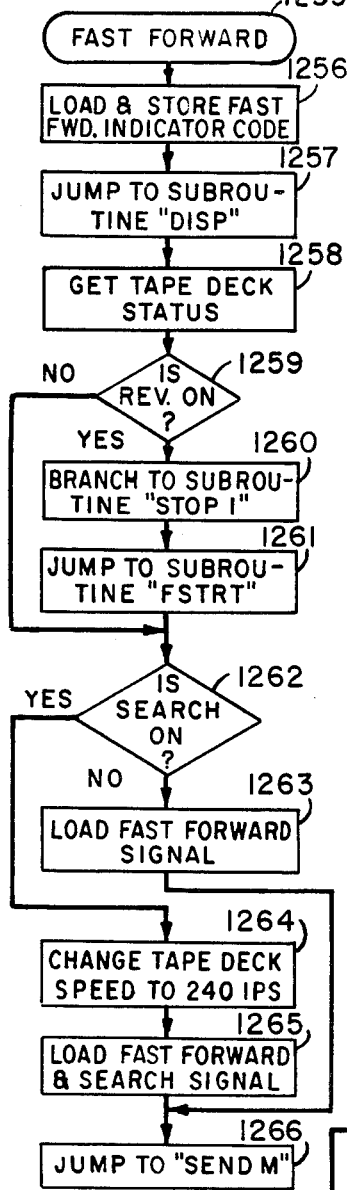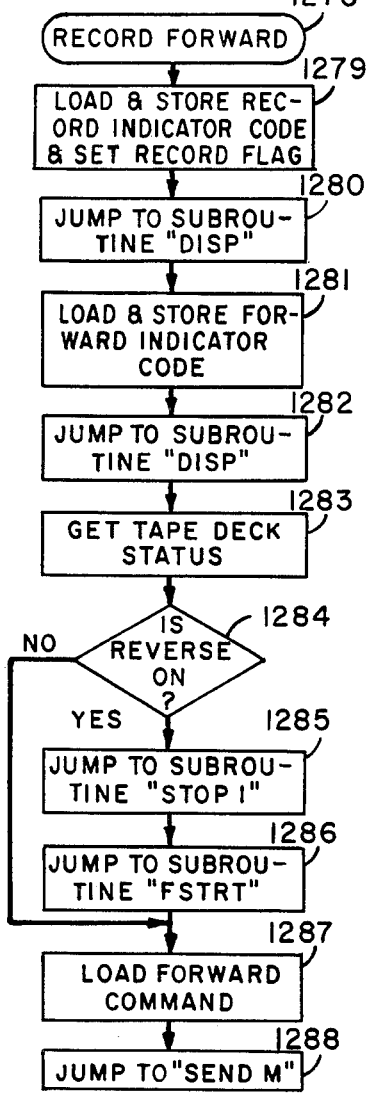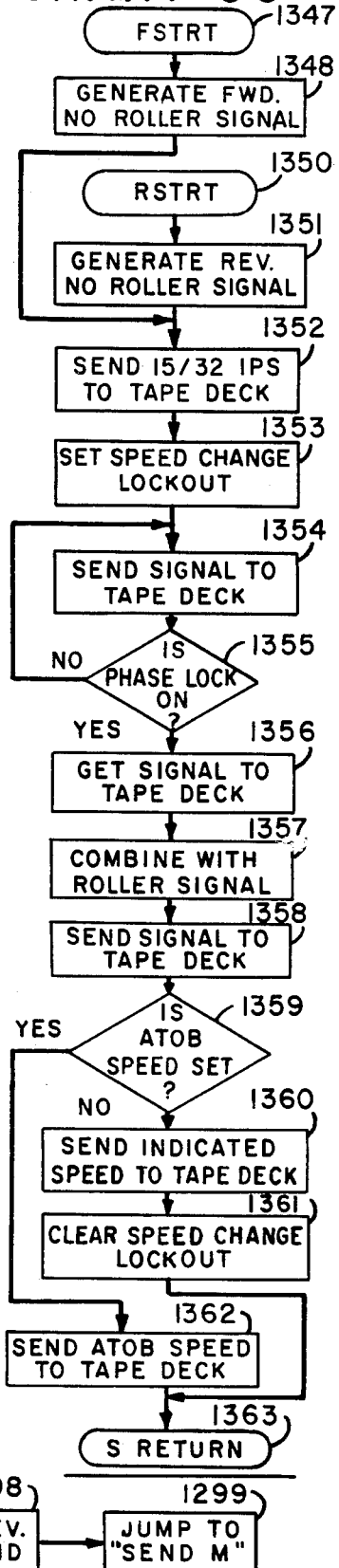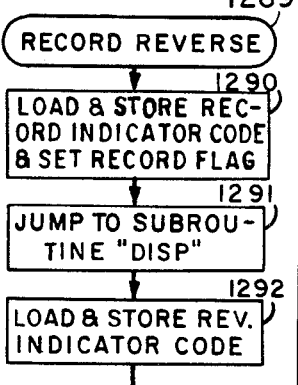

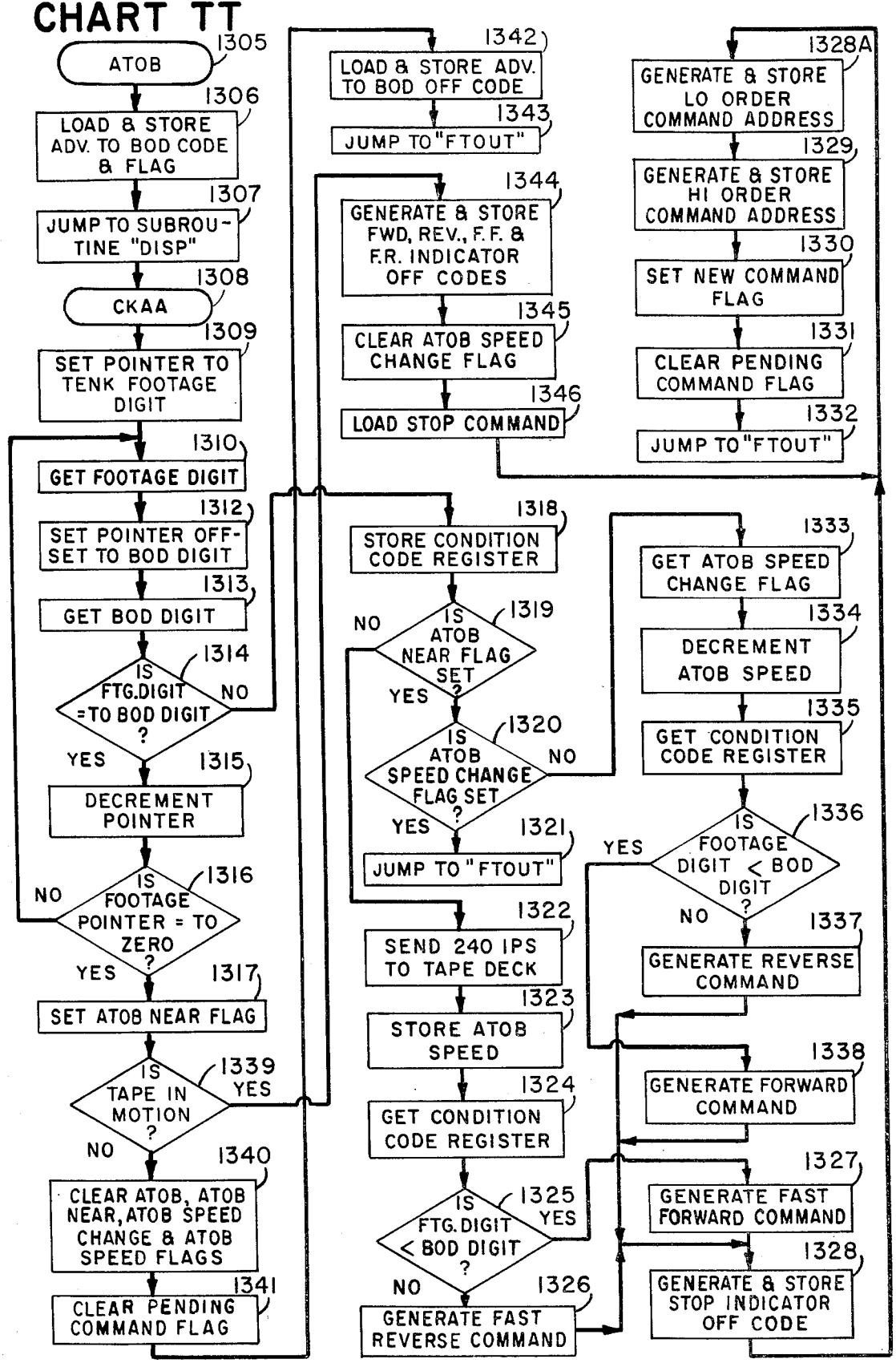

METHOD AND APPARATUS FOR CONTROLLING TAPE RECORDER

REFERENCE TO RELATED APPLICATIONS

This is a division; of application Ser. No. 897,136, July 22, 1980 filed Apr. 17, 1978, now Pat. No. 4,214,284.

FIELD OF THE INVENTION

The present invention relates to tape recorders in general; and more particularly, it relates to apparatus for recording and reproducing electronic signals on magnetic tape of very high quality which is commonly referred to as a laboratory tape recorder. Systems of this type may be used in collecting data from various sources, for example, for subsequent analysis on a computer. Conventional recording techniques may be used with the present invention which is primarily concerned with controlling and executing various functions in the tape transport. A rigid demarcation is not made between the terms "tape recorder" and "tape transport" but in general, a tape transport includes the mechanism which handles and moves the tape, controls its speed and tensions it, whereas the recorder also includes the electronic recording and playback circuits.

BACKGROUND AND SUMMARY

In conventional tape recorders, a signal of interest is recorded on the tape as the tape is moved by the tape transport from a supply reel to a takeup reel. Some means is normally included to indicate to the operator the location of tape (commonly referred to as "footage") which is adjacent the read/record heads, or simply "transducer". Two particular locations are of interest to the operator concerning the data recorded. These are the Beginning of Data (BOD) and End of Data (EOD) footage locations. Typically, the BOD and EOD locations are recorded either on a voice track on the same tape by an operator during recording, or noted in a written log by the operator. He may note a specific event that occurred along with a notation of the footage indicator at the time the event occurred. Normally, all other events of interest are referenced to a particular noted event. In some systems, the operator may have the option of resetting the footage counter to zero at a particular event, thereby referencing all subsequent events relative to zero footage. There is normally some ambiguity in the actual BOD location thus determined because the operator may actually run a hundred or more feet of tape through the machine before beginning to record. This is done in the case of valuable data to insure that the tape on which the recording is made is not damaged.

During playback or analysis, the operator may not know where the footage counter had been set to zero or recording begun. Rather, he must first recognize and identify the event from which reference is made, and then he can correlate the event either with the written log or a recording on the voice track. In this manner, he knows where other events are located by reference to the footage indicator and log. However, it may be necessary for him to calculate where other data events are located on the same tape. For example, if he knows that a reference event occurs at twenty feet on the recorded tape, and he is looking for an event at four hundred feet, when he loads the tape for playback, and identifies the first event, his footage indicator may indicate forty feet, thereby requiring a calculation before he can locate the event of interest. These calculations can introduce error, and they are always an inconvenience.

One mode of operation using the BOD and EOD points is commonly referred to as "shuttle". Typically, the BOD and EOD locations are identified by conductive or reflective markers, or the locations are specified by advancing the tape of each location and setting an electromechanical counter at the two locations. When the traditional shuttle mode of operation is entered, the transport moves the tape forward at the desired speed reproducing the signal recorded on the tape to the EOD point, and then moves the tape in fast reverse to BOD. This process is repeated until the operator deactuates or stops the transport. As described below, the present invention adds flexibility by permitting the user to enter other commands which will be executed at footage locations such as BOD and EOD.

Two other parameters useful in conventional tape recorders are Beginning of Tape (BOT) and End of Tape (EOT). These parameters are normally not defined by specific footage locations, as with BOD and EOD. Rather, mechanical follower arms engaging the tape pack, conductive or reflective markers, transparent leaders, or light source/photodetector combinations are used to keep track of the amount of tape on the reel being emptied by transport motion.

The EOT parameter is used in emptying the source reel when the transport is operating in a forward direction, and BOT is used when rewinding the tape from the takeup reel onto the source reel. One disadvantage of prior tape recorders is that the EOT and BOT parameters are not easily changed or re-set. That is to say, in the case of conductive or reflective spots or transparent leaders, the locations had to be first identified and then changed. If one of these parameters were identified by removing the magnetic coating with solvent, changing is even more difficult. In other systems, mechanical adjustments are required for changing the identification of these parameters.

The control apparatus of the present invention includes a Central Processor Unit (CPU) and a Control Panel having data entry switches, mode selection switches, speed selection switches, a multiposition function select switch, and other controls and a display which communicates with the CPU. The control panel enables the operator to enter commands as well as data into the system. Commands are recognized by the CPU and executed in controlling the tape transport at predetermined footages (such as BOD or EOD) as well as at predetermined parameter definitions (such as at BOT or EOT). In defining BOT and EOT, the CPU accumulates pulses from a capstan transducer representative of linear tape footage for distance that has been transported. At the same time, the CPU uses pulses from a transducer associated with the supply reel motor and the takeup reel motor which are representative of angular displacement of the supply reel and takeup reel respectively. A ratio of capstan pulses to either supply reel or takeup reel pulses is determined. This ratio is a pure number which is representative of the diameter of remaining tape pack. It is independent of operating speed, and it decreases monotonically as a reel is being emptied. A predetermined number is thus used to define BOT and EOT; and it is very easily entered or changed by the operator, using the data entry switches, in combination with the function switch on the control panel.

The present invention also permits the operator to enter commands (referred to as User Commands) at any of the locations BOD, EOD, BOT or EOT. These commands are stored in the CPU and executed when the associated location is reached or parameter defined, to control the transport. Thus, the number of commands are available for entry by the user (again, using the function select switch and data entry switches on the control panel) either at predetermined footage locations on the tape or in accordance with other parameter definitions. Thus, the operator is not limited to the traditional shuttle mode of operation—rather, he can program any number of modes of operation. For example, at EOD, he can program the control mechanism such that the transport will stop, go into a reverse record mode of operation or transfer recording to another machine by entering a single command at the control panel. In the illustrated embodiment, this command is a single digit number. At BOD, he can cause the machine to go into forward record mode of operation—again, by entering a single command at that location. To enter these commands, the tape need not be at the location at which it is desired to execute the command because the command is stored in the CPU, and the CPU keeps an updated and accurate record of footage as well as the ratio of capstan to reel angular displacement described above. Thus, when the particular footage location or parameter definition is identified by the CPU, the command is brought up and executed.

Another advantage of the pesent invention is that the footage counter may be set by the operator to any desired footage indication. In other words, rather than being limited to resetting the footage counter to zero, the operator may, upon identification of a specific event such as that which defines BOD, set the footage counter to the number indicated either on the voice track of the recording or in a written log. This enables the operator during a playback of a tape to obtain exact correlation with the footage indicator during a previous recording. The new indication, because it is stored in memory in the CPU, may be entered through the same data entry switches and function switch which are used for the entry of other data as well as commands.

The operator may set the speed of the transport by depressing any one of ten separate speed control pushbuttons at the control panel. However, actual speed is controlled by the CPU, so that programmed speed control is possible. This is useful, for example, when an operator may be emptying a reel in the slew mode. It may be undesirable to permit the end portion of a tape to pass through the transport at the slew rate. The CPU, recognizing that the transport is operating in the slew mode, will identify EOT and automatically cause the transport to slow down to a lower speed. Further, because of the particular tape transport mechanism with which it is desirable to employ this invention, it is advantageous to program the speed of the capstan during start up and motion reversal. Specifically, as is more fully disclosed in the copending application of Prozzo, et al, Ser. No. 788,443, filed Apr. 18, 1977 for TAPE TRANSPORT, which is co-owned, the transport includes two drums providing tape-carrying surfaces which are closely spaced realtive to the transducer in a short-loop configuration. These drums are surface-driven by a single capstan which has a polyurethane peripheral drive surface. Because this material has "memory", it is undesirable to engage the capstan with the drums while the capstan is stopped. The CPU during start up at a desired speed, first stores the desired speed, and transmits a predetermined or programmed speed to the capstan. After the capstan has achieved this speed, the CPU transmits signals that cause the drums to engage the capstan at either a read position (in which the tape is in operative relation with the transducer) or a transport position (in which the tape does not engage the transducer), and then transmits signals to the transport which are representative of the desired operating speed. Other features and advantages of the present invention accrue in the use of the preferred transport mechanism described in the Prozzo, et al application, identified above.

Thus, the present invention provides a tape control system in which the various functions performed by the tape transport, and the sequencing thereof, are implemented under command from a programmable data processor. This permits great flexibility in changing the response locations on tape or other response parameters, as well as in changing command functions at such locations. It also provides flexibility in the entry of data and the programmed speed control of the transport. Flexibility and adaptability are important characteristics in a laboratory tape recorder because of the wide variety of uses to which such an instrument is put.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 6 is a diagrammatic front view of the tape transport illustrating the positions of the control and slave drums in the read, idle and transport positions, relative to the transducer head;

FIG. 7 is a diagrammatic front view illustrating the relationship of the tape to the crown of a transducer head;

FIG. 10 is a front elevational view of the control panel for the transport of FIG. 2;

CHARTS A–WW are flow charts of the program for the Central Processor unit.

LISTS 1–35 comprise a listing of the instruction code for the Central Processor Unit.

CHARTS

| | | | | |
|---|---|---|---|---|
| A | START | | AA | DIS |
| B | CLIN | | BB | FTRST |
| C | DECHEX | | CC | — |
| D | DISP | | DD | THRDX |
| E | DELAY | | EE | CONDR |
| F | FTOUT (MAINLINE) | | FF | EOTBOT |
| G | FTOUT | | GG | LDTW |
| H | FTOUT | | HH | CMD4 |
| I | — | | II | — |
| J | FTOUT | | JJ | CMD5 |
| K | ALARM | | KK | STOP |
| L | SHUTCK | (check shuttle) | LL | STOP1 |
| M | CKMC | (check machine) | MM | FORWARD |
| N | DPIN | (display indicators) | NN | REVERSE |
| O | CONDX | (display EOT, SEARCH SHTL, TSEN) | OO | FAST REVERSE |
| P | POLL | (interrupt - CAP,SRP,TRT, LOCAL,REMOTE COMMAND) | PP | FAST FORWARD |
| Q | CNTI | (capstan interrupt) | QQ | RECORD |
| R | SHT1 | (shuttle interrupt) | RR | RECORD FORWARD |
| S | EOT1 | (reel pulse comparison) | SS | RECORD REVERSE |
| T | CLR511 | | TT | ATOB |
| U | EOTOFF | | UU | FSTRT |
| V | LOFC | | VV | SEND M |
| W | BOT1 | | | |
| X | BOTOFF | | | |
| Y | CMDR1 | | | |
| Z | CMD3 | | | |

INDEX

I. Overall System
II. Tape Transport Mechanism
III. Control Panel
IV. CPU/Tape Transport Interface
V. CPU/Control Panel Interface
VI. Operation of CPU/Control Panel Interface
VII. Overall System Operation
  A. START UP
  B. SPEED SELECTION
  C. FORWARD/REVERSE
  D. RECORD
  E. FAST FORWARD/FAST REVERSE
  F. ENABLE MODES
    F1. ENABLE SEARCH
    F2. ENABLE TAPE SYNC
    F3. ENABLE BOT-EOT
    F4. ENABLE SHUTTLE
  G. MISCELLANEOUS
    G1. ADVANCE TO BEGINNING OF DATA (TO BOD)
    G2. SRP, TUP
    G3. FOOTAGE
    G4. CALIBRATION
VIII. FLOW CHARTS

DETAILED DESCRIPTION

I. Overall System

Figure 1:
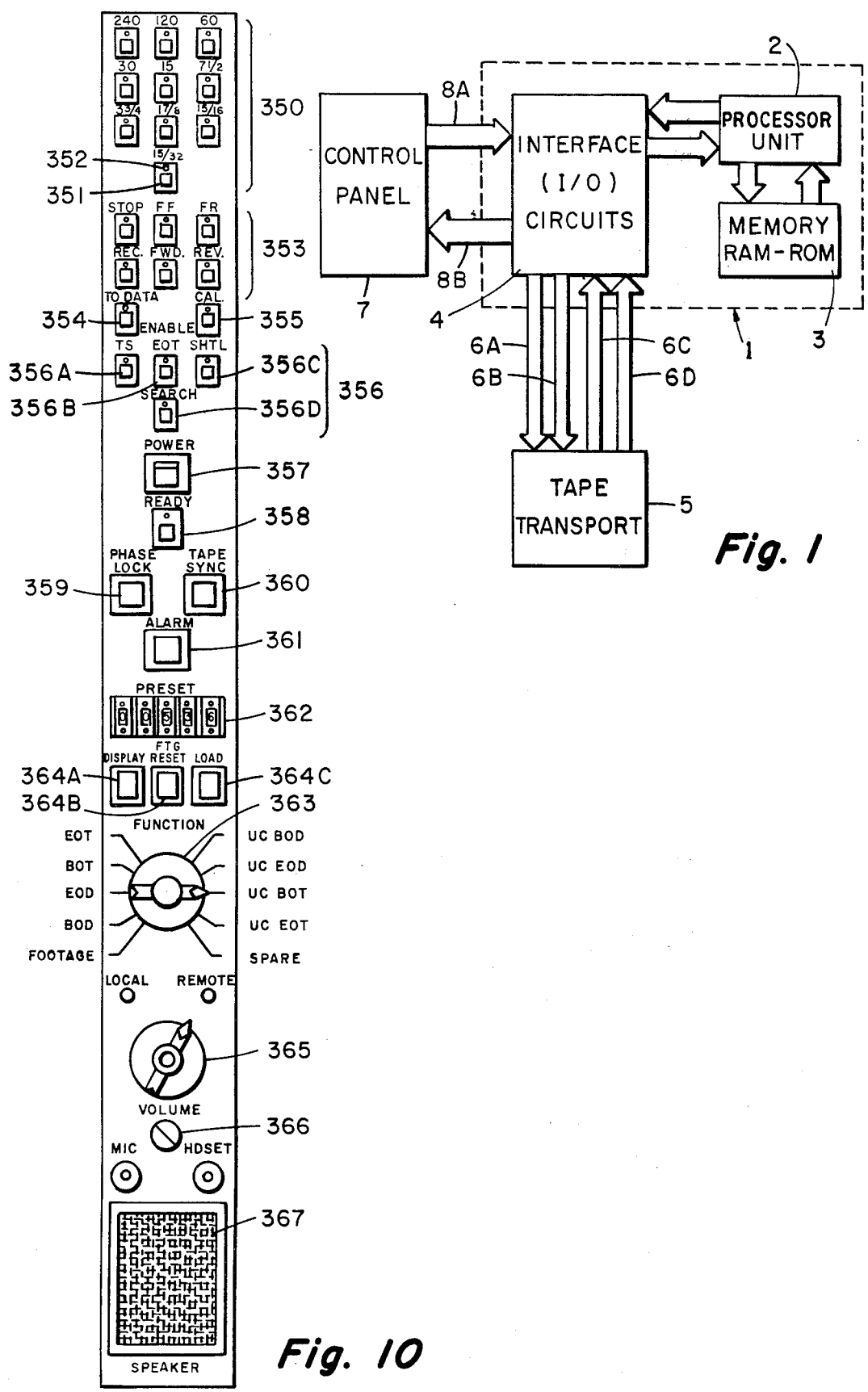
FIG. 1 is a functional block diagram of the overall system according to the present invention.

Referring first to FIG. 1, the circuitry enclosed within the dashed block generally designated 1 comprises a Central Processor Unit (CPU). The CPU includes a processor unit 2, a memory 3 and interface (I/O) circuits 4. The processor unit 2 may be a microprocessor printed circuit board having a microprocessor chip sold under the designation M6800 by Motorola, Inc., and it includes a crystal oscillator providing a clock source as well as buffer circuits. The memory 3 contains three chips of 1,000 bytes of programmable read only memory (ROM), at least one of which is erasable (Part No. 2708 of Intel Corporation), and 128 bytes of random access memory (RAM). CMOS circuitry is preferred for random access memory because of the very low current drain when not being accessed.

The CPU communicates with a tape transport 5 by means of buses 6A, 6B, 6C and 6D. Bus 6A is a control bus comprising eight function control lines. Bus 6B is a speed select bus comprising four lines of parallel data which determine the speed of the tape transport 5. Bus 6C is a monitor bus comprising eight function monitor lines; and bus 6D is an interrupt bus comprising four interrupt lines from the transport to the CPU.

The system is controlled from a control panel 7 which communicates with the CPU by means of two buses designated 8A and 8B. As will be explained in more detail in connection with FIG. 12, bus 8A is a control bus comprising seven lines (six data lines and one "data present" line) from the control panel to the I/O circuits; and bus 8B comprises eight lines (seven data lines and one strobe line) from the CPU to the control panel 7.

A remote control capability can be incorporated into the system by communicating the bus 8B to the remote location, and by introducing a separate bus, similar to bus 8A from the remote location to the interface circuits 4. Since the CPU has interrupt capability, a remote control interrupt is provided in the main line program, the operation and functioning of which is similar to that to be describe for the Control Panel 7. A remote control unit could be enabled or disabled at the Control Panel 7, and a speaker and microphone could also be added for voice commentary, if desired.

II. Tape Transport Mechanism

Figure 2:
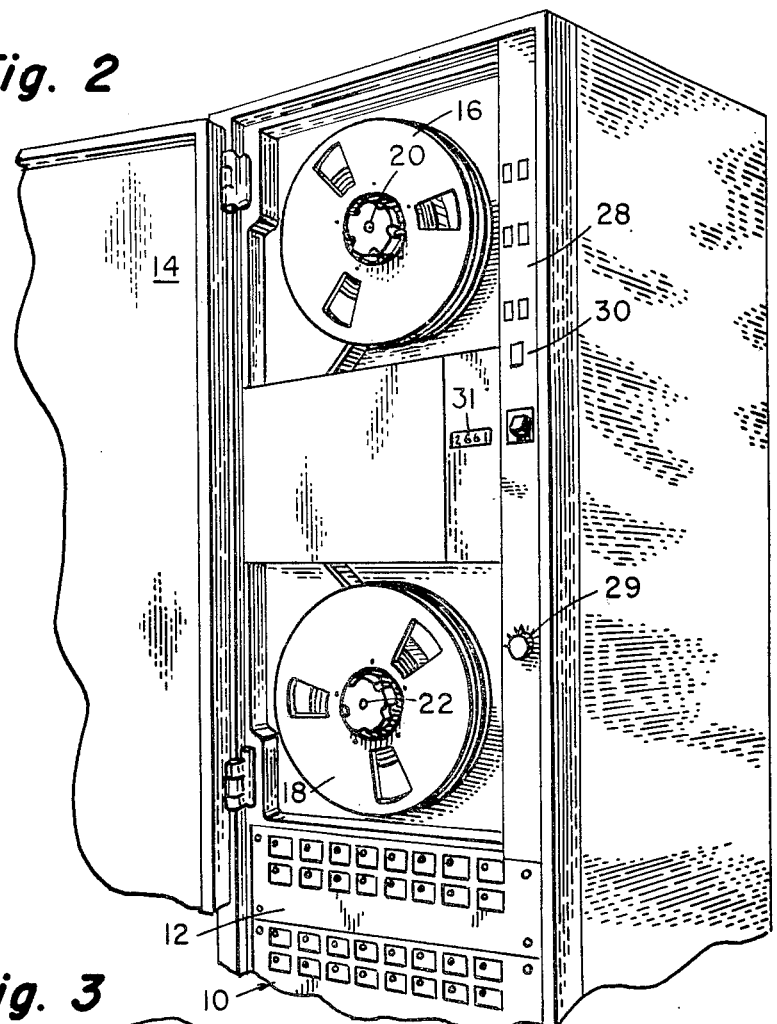
FIG. 2 is a perspective view of a tape transport unit, taken from the front and side.

Referring now to FIG. 2, the tape transport is housed in an upright cabinet 10 having lower front panel 12 and hinged glass front panel door 14 covering a top supply reel 16 and bottom takeup reel 18 mounted on their respective spindles 20 and 22. A transport mechanism 26 (see FIG. 3) is located between the reels. A control panel 28 located on a raised marginal edge of the front of the cabinet 10 includes a function control switch 29 and pushbutton switches 30. These control and function switches will be described in more detail subsequently. A display 31 is used to display information, such as footage or stored commands to the user.

Figure 3:
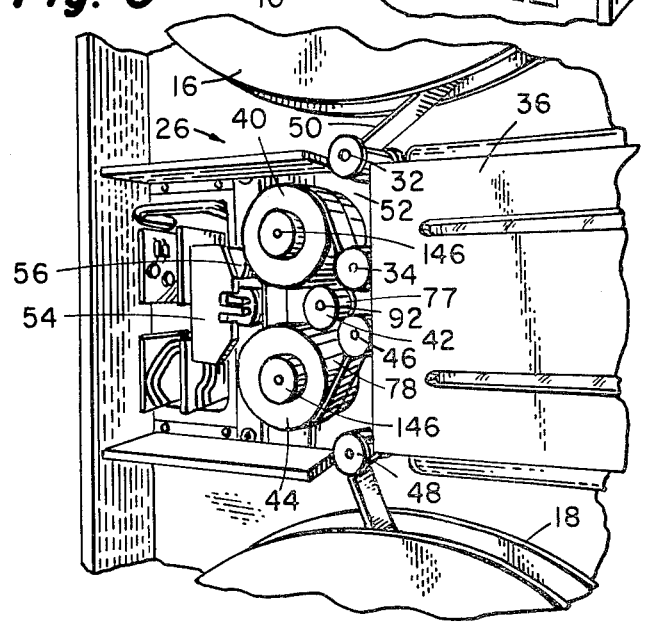
FIG. 3 is a close up fragmentary perspective view of the transport with the cover removed.

In FIG. 3 the transport system 26 includes a pair of guide rollers 32 and 34 spanning the side opening of an upper vacuum chamber (to be described) covered by a hinged side plate 36, a first drum 40, a drive capstan 42, a second drum 44 and a second pair of guide rollers 46 and 48 spanning the side opening of a lower vacuum chamber behind the hinged cover plate 36.

The path of the tape 50 is from the feed or supply reel 16 over the roller 32 into the upper vacuum chamber, from this chamber beneath the roller 34, then around the drums 40 and 44 in major wrapping engagement, over the roller 46, through the second vacuum chamber, over the roller 48 and thence to the takeup reel 18. Because of the relatively close spacing of the drums 40 and 44 with each other and the capstan 42 and the absence of idlers, the transport system is said to be a short-loop configuration. The vacuum chambers perform the functions of tape-guiding, adding tape tension, and providing an indicator in the event the tape becomes tight or loose exceeding certain limits. They also serve as a tape storage element, thereby buffering the capstan block assembly 52 from the reels 16 and 18.

As will be described, the drums 40 and 44 are rotatably mounted on crank shafts carried by precision bearings within the capstan and head mounting block 52 for transport of the tap 50 into operable contact with the transducer assembly 54 (the read/record or simply "read" position), the individual transducers 56 of which perform the necessary record and playback functions, known in this art.

Figure 4:
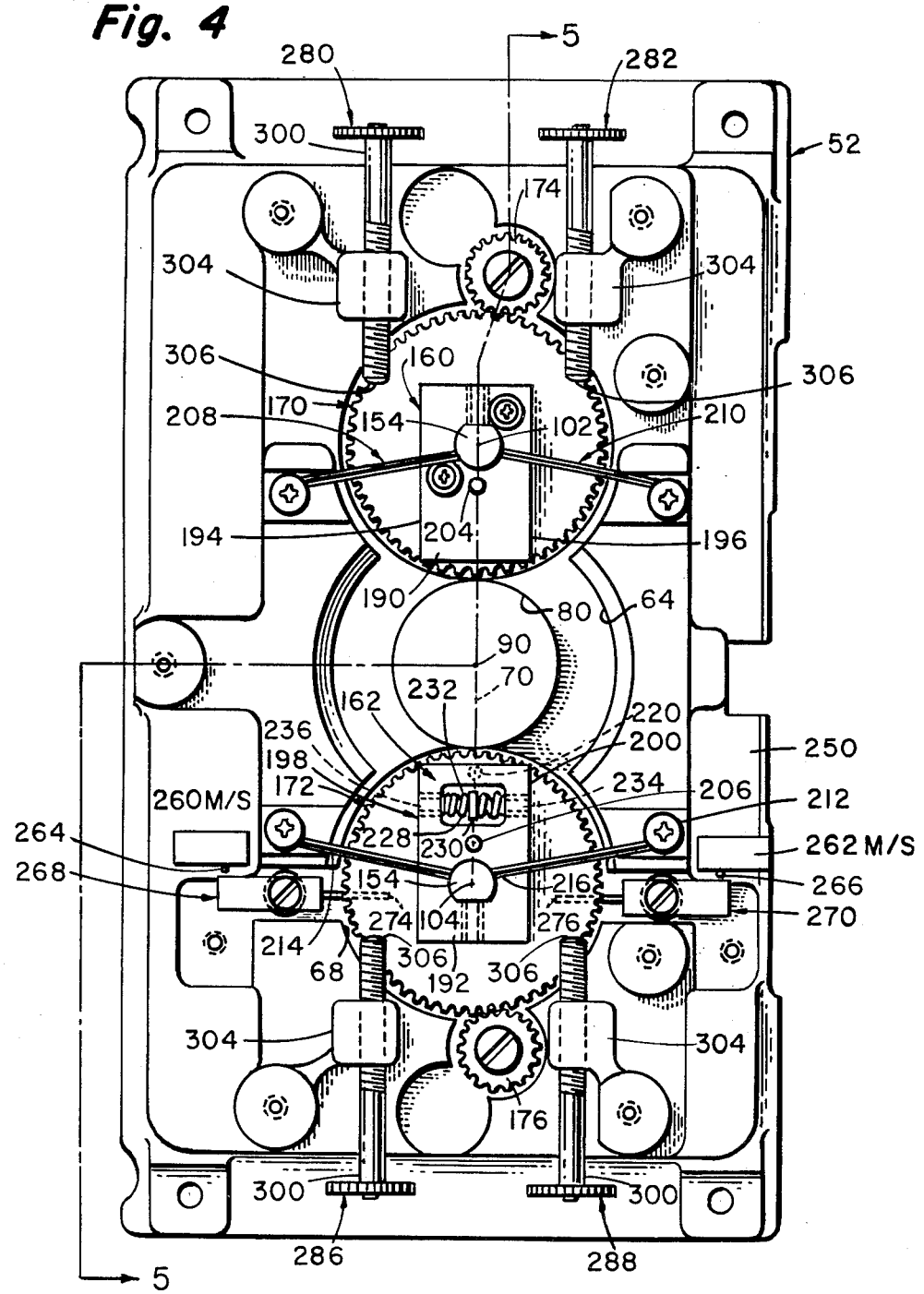
FIG. 4 is an elevational rear view of the transport mechanism.

Referring to FIG. 4, the block 52 has a central circular recess 64 which receives the capstan (not shown in FIG. 4) intersected diametrically by a top circular recess 66 and a bottom circular recess 68. The centers of all three recesses pass through a vertical center line 70.

Figure 5:
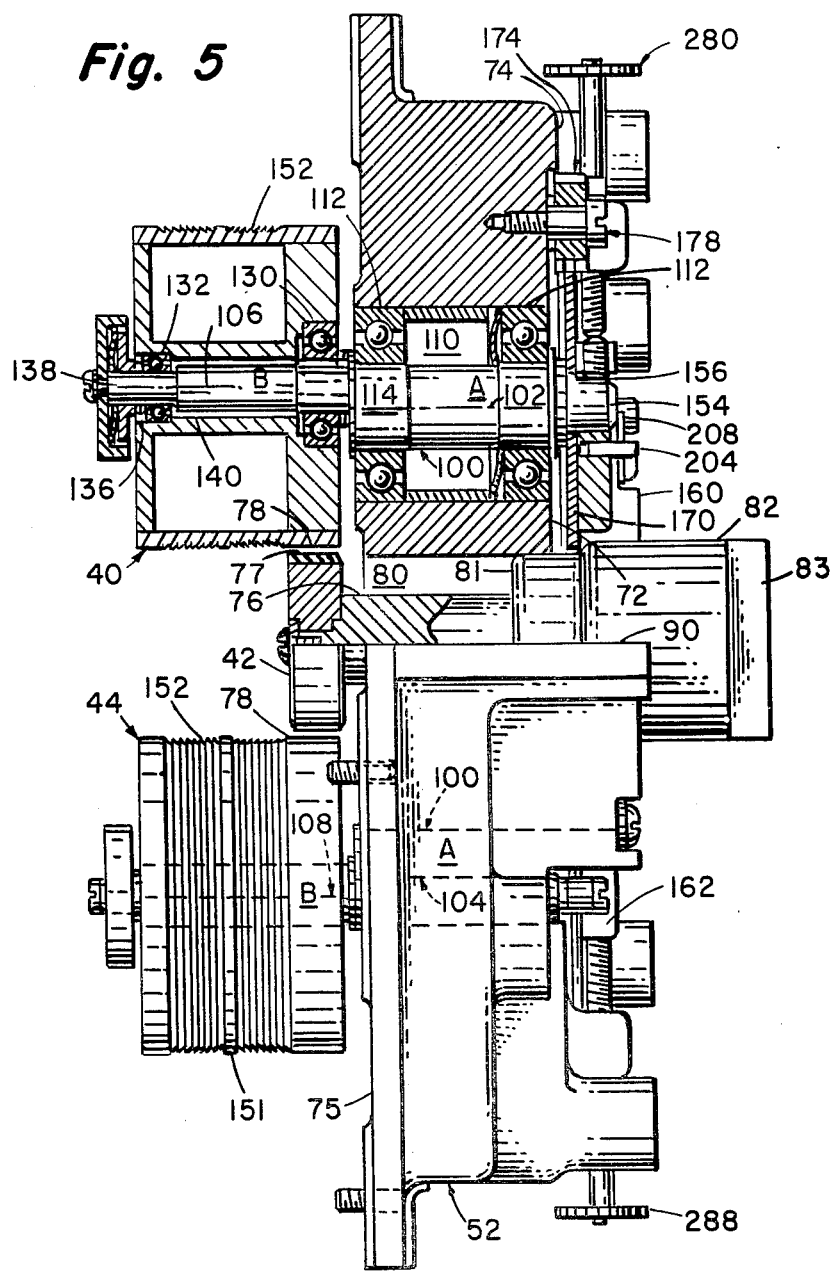
FIG. 5 is a vertical cross-sectional view taken along the sight line 5—5 of FIG. 4.

Referring to FIG. 5, the drive capstan 42 extends from its supporting drive shaft 76 beyond the front surface of the block 52 to a position between the drums 40 and 44 so that its peripheral puck or drive surface 77 is substantially diametrically between and spaced from the peripheral friction drive surfaces 78 of the drums (shown in the idle position in FIG. 5).

The puck 77 is preferably composed of a tough thermoset such as cast liquid polyurethane having high abrasion and impact resistance, and the capstan 42 may be titanium.

An opening 80 in the block 52 houses the shaft 76 which is rotatably carried by the bearing housing 81 and driven by a motor 82 having a tachometer 83 carried at the end. A fixed rotational center 90 of the drive shaft 76 for the capstan 42 is shown in both FIGS. 4 and 5.

Each of the drums 40 and 44 is mounted on an identical shaft 100, shown in cross section in FIG. 5 for the upper drum 40. These shafts each have a fixed axial portion A and a pivoted or movable portion B. The axes of portions A and B are offset. The center lines of rotation are shown at 102 and 104 in FIGS. 4 and 5 for the A portions, and at 106 and 108 for the B portions. The B portions pivot about the same axes as portions A, i.e., axes 102 and 104. The portions B are the rotational axes for drums 40 and 44.

Referring more specifically to FIG. 5, and using the shaft 100 for the drum 40 to illustrate the manner in which these shafts are mounted, it is seen that the housing 52 defines an opening 110 for the pair of precision bearing 112, the inner races of which engage the raised machined and true surfaces 114 of the fixed axial portion A.

The drum 40 is carried on the crank portion (spindle 138, FIG. 5) B of the shaft 100 by means of bearings 130 and 132. The bearing assembly is retained within the central bore 140 of the drum 40.

The outer surfaces of the drums also provide a tape-carrying surface having a plurality of close-spaced circumferential shallow grooves 152 which eliminate air-bearing of the tape to the drums during high speed operations. A middle circumferential section 151 without grooves divides the grooves into two groups so that a 1 inch tape will span all of the grooves in the two portions, but a ½ inch tape will span only the grooves of one portion with an outer edge of the tape running along the smooth section 151.

The other ends of the shafts 100 are reduced at 154 and contain a flat portion 156 for mounting control hubs or blocks 160 and 162. The blocks 160 and 162 hold driven gears 170 and 172 on the respective shafts 100 for limited rotation about the axes 102 and 104, respectively.

Each of the driven gears 170 and 172 has an associated drive gear 174 and 176 meshing therewith. Reversible DC torque drive motors (not shown) are coupled to the drive gears 174, 176.

The control hubs 160 and 162 are mounted off-center to their respective shaft ends 154 of the crank shafts 100 and have swing ends 190 and 192. The oscillations of the gears 170, 172 are little more than 180°, and the drive gears 174 and 176 do not approach the sides 194 and 196 of the top hub 160 or the flat sides 198 and 200 of the bottom hub 162 because of positive stops to be described. The hubs 160, 162 carry pins 204, 206 which extend outwardly in FIG. 4.

A pair of steel return-springs 208 and 210 is provided in relation to the top control hub 160, extending at slight angles to each other for contacting the pin 204. As the gear 170 is rotated about 90° in either direction from its idle position shown in FIG. 4, the pin deflects the springs 208 and 210 and stops when either surface 194 or 196 engages one of the contact stops 306.

The hub also has a pair of return springs 214 and 216. As the hub 162 and the gear 172 are rotated, the springs 214 and 216 act as a cushion, and hub surfaces 198 and 200 contact their associated stop surfaces 306. The springs 208, 210, 214 and 216 return drums 40 and 44 to idle position when torque is removed.

Still referring to FIG. 4, a pin or stake 220 is carried on the underside and near the upper periphery of the lower gear 172. The hub 162 has an opening 228 which receives a spring post 230 extending upwardly from the gear 172. A pair of compression springs 232 are seated on a roll pin secured to the post 230 and by set screws 234 in hub 162 adjacent opening 228. A spring post member 230 is resiliently held by the springs 232 so that the connection between the driven gear 172 and hub 162 and its associated axle 154 is a resilient coupling. As will be apparent from subsequent description, this resilient coupling permits the limit positions of the control drum to be adjusted without affecting the actuation of limit switches 260, 262.

Switches 260 and 262 are normally open limit switches mounted with their actuators 264 and 266 adapted to be engaged by pivotal switch blocks 268 and 270. Switch arms 274 and 276 of these switch blocks are engageable by the pin 220. The switches 260 and 262 control the electrical power to the reversible drive motor for the gear 170 which is referred to as the "slave" gear. The switch 260 is actuated (closed) by the pin 220 rotated in the direction of arrow R (standing for "read" or "record") with its switch arm 274 thereby pivoting the switch block 268 into contact with the actuator 264. The switch 262 is similarly actuated (closed) by the pin 220 as it swings in the direction of the arrow LT (standing for "lift tape" or transport).

FIGS. 4 and 5 show a first pair of adjusting screws 280 and 282 and a second pair of adjusting screws 286 and 288. The shank 300 of each adjusting screw is threaded into a boss 304. As the gears 170 and 172 oscillate through the cycles of record or play ("read") to the fast forward and reverse ("transport") positions, the stop ends 306 of the adjusting screws function as positive limit stops at each end of the swing arc. By adjusting the screws, the stop ends 306 can be finitely adjusted to limit the swing arc of the respective hubs and hence control the distances between the axis 90 of the capstan 42 and the peripheries of the drums 40, 44 along respective radial lines joining the axis 90 with the axes 106, 108 of the drums. When these radial distances are equal constant tangential velocity of the drums is insured (and constant tape speed) because the drums are surface-driven by the same element, namely, the capstan.

Since the hub 160 is affixed to the gear 170 and the drive 174 is in constant engagement when the stops 306 function to stop the hub 160 at the end of its swing, the motor drive stalls. For this purpose a slip clutch or stall motor is used (which latter limits stall torque in stalled condition).

The overall operation of these parts is as follows:

Assume the gear 172 of the control drum is driven in the "read" direction (counterclockwise (CCW), in FIG. 5) from idle position. The gear 172 rotates until the pin 206 contacts the spring 214 causing the spring to deflect. The gear 172 continues to rotate until pin 220 engages the switch arm 274 thereby rotating the block 268 toward the actuator 264 of the switch 260. The gear 172 continues to rotate causing hub 162 to contact the stop 366. This limits rotation of the crank 100 and hence the control drum 44 since the hub 162, crank 100 and drum 44 are all rigidly connected.

At this point, the control drum 44 is in driven engagement with the puck 77. The gear 172 continues to rotate CCW (with the hub 162 against the stop 286) allowed by resilient coupling means, i.e., the springs 232, causing the spring 232 on that side to begin compressing. The gear 172 continues rotating until the switch block 268 contacts the activator 264 causing switch 260 to switch and the slave drum 40 to be driven to its "read" position. Adjustment of set screw 234 determines how much further gear 172 must rotate, after the hub 162 contacts the stop 306, to cause the switch 260 to be activated by the force of the block 258 against the activator 264.

In operation, the switch 260 is activated after the hub 162 strikes against the stop 286. This insures that the control drum 44 is driving the tape 50 before the slave drum 40 disengages the capstan to maintain tension on the tape.

The adjustable means, namely spring biased post 230, controls the point at which the switch 260 is actuated after the drive gear 172 has stopped.

It is apparent that the foregoing factors, movements and adjustments apply in reverse order when the controls are moved to call for the drums to move to the idle position and then to lift tape (LT) or transport position. As the torque on the gear 172 is released, the spring arm 214 causes the drum 44 to move to the idle position, the drive capstan keeps rotating, but the switch 260 opens and the drum 40 is returned to its idle position as the drum 44 stops rotating. Movement of the control drum to the lift tape (transport) position (CCW in FIG. 4) causes the switch 262 to be actuated after the hub 162 strikes against the stop 288, again assuring that the control drum 44 is driving the tape 50 before the slave drum 40 begins rotating.

The relative movement of the eccentric axis 108 of the lower drum 44 to each side of the center 104 or idle position, toward and away from the transducer head assembly 54 and the relative following movement of the eccentric axis 106 of the upper drum 40 to each side of its center 102, toward and away from the transducer head assembly 54, as well as the relationship of the record and play heads 56 to the tape 50, are shown diagrammatically in FIGS. 6 and 7. The tape 50 passes in a short loop from the roller 34 in major wrapping engagement over the drums 40 and 44, past the transducers, back to roller 46 in the record or play mode and in a slightly shorter loop during the transport mode, since the drums 40 and 44 are closer to the rollers 34 and 46.

It is to be observed that the pivot axes 106 and 108 move in a short arc of about 4°13′ in relation to the center of rotation 90 of the capstan 42. Also, as shown in FIG. 7, when the drums are in the read position, the tape 50 enters and leaves the crown 308 of each head 56 with a 2½° wrap and the sections of tape 50, indicated at 309, travel in an essentially straight-line relationship on each side of the points of crown contact.

Figure 8:
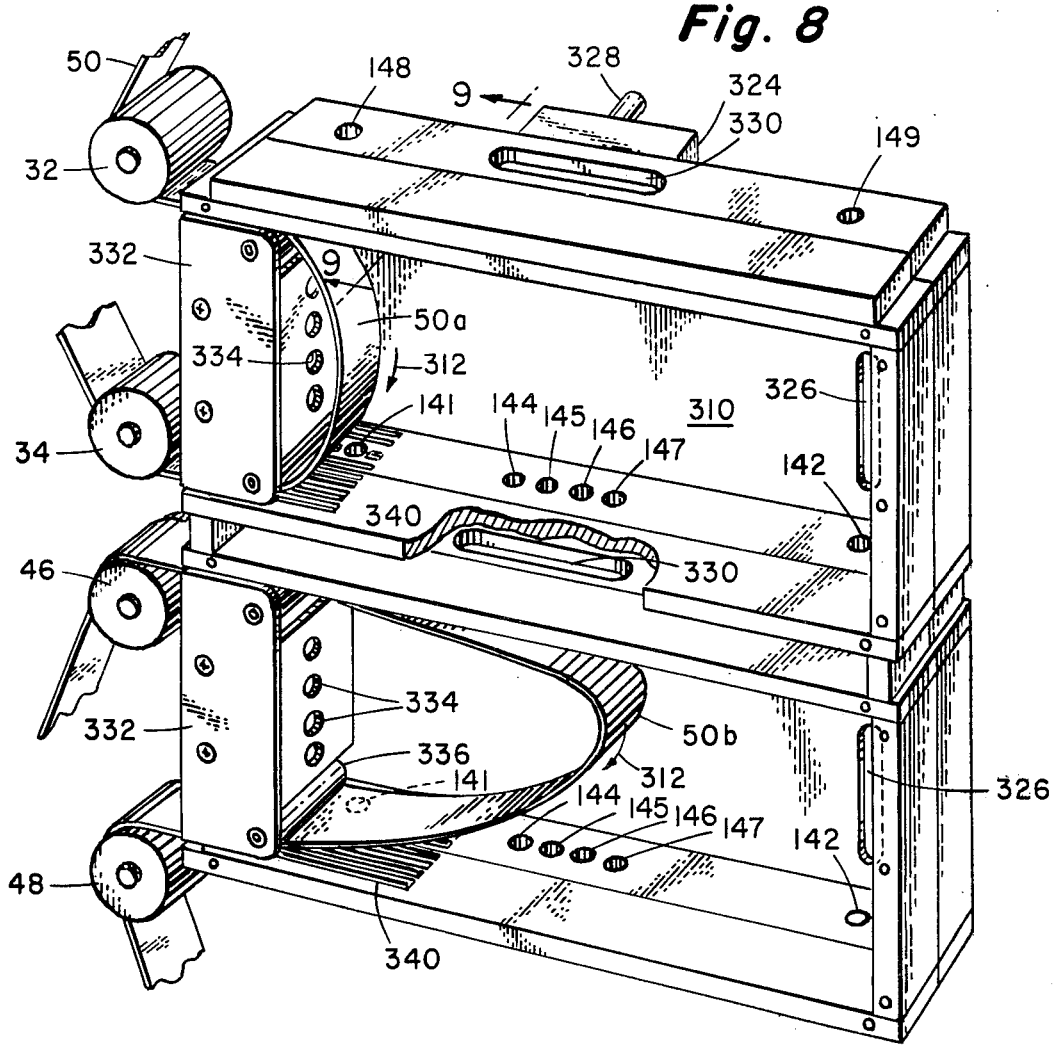
FIG. 8 is a fragmentary perspective view of a portion of the transport including upper and lower vacuum chambers, with the cover removed.
Figure 9:
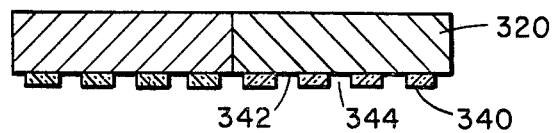
FIG. 9 is a cross-sectional view taken through the sight line 9—9 of FIG. 8 showing an entrance slit for the tape.

The reduction in flutter and skew, and the increase in fidelity is augmented by the close proximity of a pair of vacuum chambers 310, shown in FIG. 8. These chambers are identical in construction. The hinged cover plate 36 has been removed to show their interiors through which the tape 50 passes in the loops 50a and 50b in the direction of the arrows 312.

A pair of slots 326 communicate the interiors of the chambers with a plenum 324 mounted on the back side of the vacuum chamber. The plenum has a nozzle 328 which connects to a common and essentially constant source of partial vacuum, generated by a multistage fan type pump.

The chamber houses a series of light sources 141 and 142 such as light-emitting diodes at their ends and a closely spaced group of light sources labelled 144-145-146-147 (also light-emitting diodes) located intermediate the ends of the chambers 310. The tops for each chamber include photocells 148 and 149 opposite and responsive to the light sources 141 and 142.

The top panels also house a series of interconnected photocells behind appropriate glass panels, the series being indicated by the reference numerals 330. The photo-electric system just described is connected through suitable amplifiers to control the reel drive motors, as will be described.

The vacuum chambers each have an air flow distribution shoe 332 forming a partial closure and guide for the incoming and outgoing tape 50. These shoes have their top and bottom ends closely spaced from the top and bottom panels to provide a slit for entry and exit of the tape 50.

The shoes 332 define a series of uniformly sized and spaced air openings 334 which are open to the atmosphere on the side towards the rollers 32 and 34, and 46 and 48. At the top and bottom of each shoe a transverse roller 336 is provided to facilitate the passage of the tape therearound, especially under conditions of lessened tape tension. The interior surfaces 342 of the panels 318 and 320 are covered with a tape 340, fastened by a pressuresensitive adhesive, to provide a frictionless surface. At the ends of the tops and bottoms of both chambers the tape 340 is cut to form the grooves 344 to augment the flow of air on the outside of the tape to form the loops 50a and 50b.

The tensioning system works as follows: a partial vacuum is drawn at the ducts 326, through the plenum 324, and the reel motors begin to feed and take up the tape; air passes through the holes and also through the slits on each side of the tape at the ends of the shoes 332; the loops 50a and 50b gradually form, due to the in-rush of air; and the tape shuts out the passage of light from the source 141 to the photocell 148 as indicated by the normal operating position of the loop 50b in the lower chamber.

When the system is at the selected speed the ends of each loop will be opposite the light sources 144-147 and the photo detectors 330 will monitor this normal condition. If the loop in either chamber becomes too short, as indicated by the loop 50a in the top chamber, the photo system 144-147 and 330 will give a visual signal and proper adjustment of the speed of the supply reel will take place. In the event the loop assumes the shortened condition of loop 50a, allowing the photocell 148 to be actuated, the recorder shuts off. In the event either loop reaches a point opposite the light sources 142, the photocells 149 are de-energize, and the recorder is again shut off.

III. Control Panel

Referring now to FIG. 10, the various switches, controls and actuators of the control panel 7 of FIG. 1 (shown at 28 on the cabinet of FIG. 2) are illustrated. At the top of the control panel there are ten individual speed selection switches 350. Each switch includes a pushbutton 351 and an LED indicator 352 to indicate the current selected speed. As indicated in the drawing, separate switches are available for selecting speeds of 15/32 ips, 15/16 ips, 1⅞ ips, 3¾ ips, 7½ ips, 15 ips, 30 ips, 60 ips, 120 ips, and 240 ips. The system is also capable of a tape speed of 320 ips slew rate in the Fast Forward and Fast Reverse modes, as will be described.

Beneath the speed selection switches are six Mode Selection Switches, shown at 353. These switches are labeled respectively "STOP", "FF" for fast forward, "FR" for fast reverse, "REC" for record, "FWD" for forward, and "REV" for reverse. Depressing the FWD or REV pushbuttons causes the system to playback recorded data. If the record button is pushed immediately after either the forward or reverse pushbuttons are released, the system will record. Fast forward and fast reverse are used for actuating the drums to the transport mode, and causing the tape to be wound either on the takeup reel or the supply reel at the slew rate of 320 ips.

A switch designated 354, when actuated, causes the tape to move to the footage count stored at the BOD (Beginning of Data) location. This switch is designated "TO DATA". A "CAL" switch 355 is used in conjunction with the data monitoring sub-system to record a calibration signal on the tape. The pushbutton 355 must be depressed continuously for such recording.

Beneath these switches are four "ENABLE" switches generally designated 356 and labeled TS (356A), EOT (356B), SHTL (356C), and SEARCH (356D). The ENABLE TS switch 356A enables a reference timing signal previously recorded on the tape to control the speed of the capstan servo system (to be described) during the reproduce or playback mode. Fluctuations or perturbations of capstan motor speed may be reduced if a reference signal is recorded at the same time as data, and then used during playback. Any fluctuations in capstan speed during record will thus be reproduced accurately during playback, so the recorded signal appears to have been recorded at constant tape speed.

The four ENABLE switches operate as alternate action switches, and if the ENABLE TS switch is off, the reference timing signal on the tape is not used. By "alternate action switches" it is meant that each successive pushing of the switch toggles the function between the on and off states under control of the CPU.

The ENABLE EOT switch 356B is used to cause the system to execute User Commands at End of Tape (EOT) or Beginning of Tape (BOT) if such commands have been previously programmed or entered into the system, as will be described. The ENABLE SHTL (shuttle) switch 356C enables the programmable shuttle feature, to be described, the ENABLE SEARCH switch 356D allows the tape to remain against the transducer heads during a slew mode and changes the tape speed to 240 ips regardless of the speed set by the operator.

Beneath the ENABLE switches 356 is a power switch 357 which applies primary power to the system.

A ready switch 358 is used to command proper positioning and tensioning of the tape when activated prior to initiation of any transport operation, as discussed below in Section 7A. When not activated, it is used to disable the reel drive servos and the vacuum system to facilitate threading tape. It is also an alternate action switch.

Three indicators 359, 360 and 361 are used respectively to indicate that the capstan speed has reached the speed set by the switches 350, that the capstan speed is being controlled by a reference signal recorded on the tape (actuated by the ENABLE TS switch 356A), or that an alarm condition exists.

Manually actuated data entry switch means 362 comprises five individually settable binary coded decimal switches indicating their positions. It is used to load either data or command signals by the operator into a storage location determined by a function switch 363. The data entry switch 362 displays numerical data, but, as will be understood from subsequent description the numerical data may represent a number (data), such as footage, or it may represent a command code, depending upon the position of the function switch 363. For example, if the function switch 363 is in the BOD position, the contents of the data entry switches 362 after storage by the operator in the CPU will be used to define the footage location for Beginning of Data. On the other hand, if the function switch 363 is at the UCBOD (indicating User's Command at Beginning of Data), the numerical information in the data entry switch 362 (lowest order digit only in this case) will be representative of a command which will be stored in the CPU by the operator and be executed by the system when the tape reaches the BOD position.

A display pushbutton 364A causes the contents of a storage location, as selected by the function switch 363, to be displayed in the numerical display 31 adjacent the control panel 28 of FIG. 2.

A load pushbutton 364C causes the contents of data entry switch 362 to be sent to CPU storage locations determined by the function switch 363. A footage reset pushbutton 364 causes the contents of the FOOTAGE memory locations to be set to zero regardless of the position of the function switch 363.

Since the system has the capability of being remotely controlled, a rotary switch 365 is used to select whether the local control panel, a remote control unit, or both are being used to control the system. The control panel also includes a volume control 366 and a speaker 367 over which a voice track on the tape may be produced.

IV. CPU/Tape Transport Interface

Figure 11:
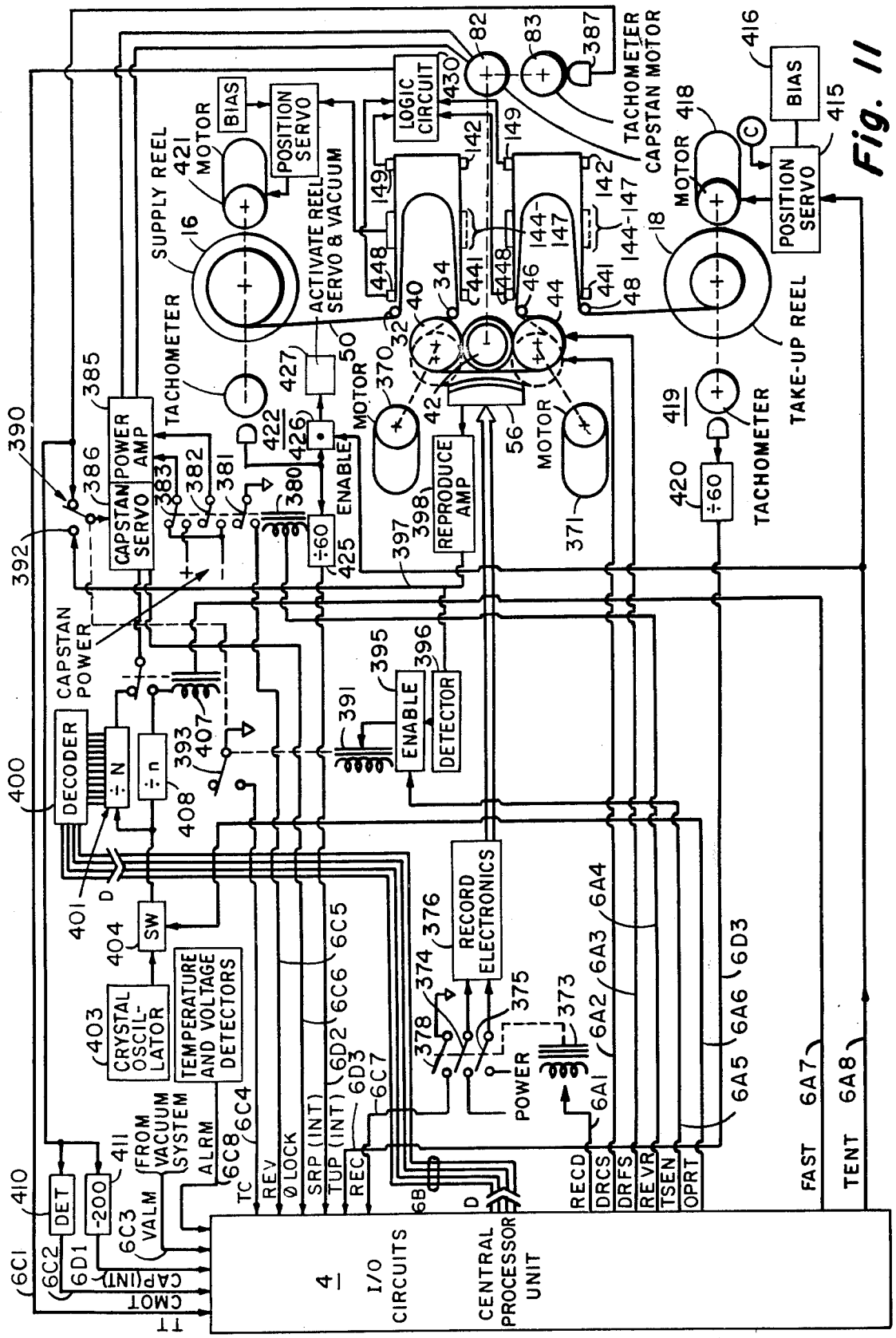
FIG. 11 is a diagrammatic view, partly in functional block form and partly in circuit schematic form, of the principal control elements of the tape transport system and the interface with the Central Processor Unit.

Referring now to FIG. 11, various elements of the tape transport and vacuum systems are shown in diagrammatic form with reference numerals corresponding to the structural elements already disclosed. The tape 50 is shown as trained around the roller 32 into the upper vacuum chamber 310, around the roller 34, and in major wrapping engagement with drums 40, 44. The drums are shown in the two capstan-engaging positions. The tape span between the drums in the transport position is shown in solid line, and for the read position, it is shown in dashed line, being in operative relationship with the transducer 56. The upper drum 40 is positioned by means of a first reversible dc torque motor 370 (which is connected to the previously described crank shaft 100 for that drum) after the position of the control drum 44 is determined by a similar motor 371.

The positioning of the drums in the read or transport positions is determined by the signals DRCS or DRFS respectively which are fed from the I/O circuits 4 (commonly referred to as peripheral interface adapters) of the CPU 1 along the previously described bus 6A. In FIG. 11 these lines are designated respectively 6A2 and 6A3. The signal DRCS actuates the motor 371 to place the control drum 44 in the read position which, in turn, by means of the microswitches 260, 262 described above, causes the motor 370 to place the slave drum 40 in the read position. Similarly, the signal DRFS fed along bus line 6A3 causes the drums to be placed in the transport position. If both signals are absent, the drums are placed in the previously described idle position.

A signal RECD is transmitted from the CPU along a line 6A1 to energize a relay 373 which, through a first pair of normally open contacts 374, 375 couples input power to the record electronics 376, which may comprise conventional circuitry, and has its output coupled to the transducer 56. A third set of contacts 378 closes to supply a ground signal along a bus line 6C7 (corresponding to one line of the previously described bus 6C of FIG. 1) back to the CPU. This monitor signal is designated REC, and, of course, indicates that power is being supplied to the record head drivers.

A slide drawer (behind panel 12) contains thirty-two slots for dual analog direct/FM record amplifiers or digital encoders. Each dual record amplifier is switch-selectable between direct or FM and programmable with switches for IRIG bandwidths including low, intermediate, and wideband group I. Wideband group II may be provided with component changes. Front panel controls and indicators display the status and operation of each active channel. Channel operating controls and indicators include: DIRECT and FM LED indicators, INPUT MONITOR RECORD LEVEL SET, and an alignment LED. The reproduce amplifiers are also located in slide mounted drawers, each containing slots for sixteen channels of analog direct and FM reproduce amplifiers or digital decoders. Each reproduce amplifier contains direct amplitude and phase equalization networks for all ten tape speeds. A FM detector module houses eleven FM filters and contains an IRIG FM density selector necessary for low, intermediate, and wideband group I IRIG bandwidths. The two modules provide for ten speeds of operation for direct and FM signals without manual component changes.

Separate modules contain the head drivers for the record amplifiers and the preamplifier for the reproduce amplifiers. Each head driver is equipped with an on/off bus to provide programming for normal recording, selective voice track, or selective channel recording. Bias is available to each head driver for either direct or voice recordings. A FM carrier/bias record mode is optionally available.

A signal REVR is sent from the CPU along a line 6A4 to energize the coil of a relay 380. The relay 380, through a first set of contacts 381 supplies a ground signal along line 6C5, which signal is designated REV, and is indicative of the transport's operating in the reverse mode. Second and third sets of contacts 382, 383 are actuated when the relay 380 is energized to reverse the polarity of a source of electrical power to a power amplifier 385 which is controlled by a capstan servo 386, and is used to drive the capstan motor 82, which is a high-torque, low inertia DC motor having a speed responsive to the repetition rate of input pulses.

The feedback input pulses of the capstan servo 386 are received from a pickup 387 associated with the tachometer 83 of the capstan motor, and they are coupled to the capstan servo 386 through a set of normally closed relay contacts 390 which are controlled by a relay coil 391. When the relay 391 is energized, the contacts 390 open, and a contact 392 is connected to the feedback input of the capstan servo. The relay 391 also actuates a set of normally open contacts 393 to generate a ground signal along the line 6C4 to the CPU, which signal is designated TC and indicates that the speed of the capstan is being controlled by a reference signal on the tape, as distinguished from the feedback pulses from tachometer 83.

In order to cause the transport to operate in this mode, a signal TSEN (for "Tape Sync Enable") is transmitted from the CPU along a line 6A5 to an input of an enable circuit 395. A second input on the enable circuit 395 is received from a detector 396 which senses whether a reference signal is present on a line 397. The line 397 is fed by a reproduce amplifier 398 from the transducer 56 and is used to reproduce the reference signal from the tape, if it is present. The line 397 is also connected to the normally open contacts 392, and fed to the capstan servo 386 if the relay 391 is energized. Thus, the relay 391 is energized in response to the command signal TSEN, but only if the reproduce amplifier 398 generates a reference signal, as detected by the detector 396.

When the operator desires to set the speed of the tape, he presses one of the speed selection switches 350 (FIG. 10), and the information is communicated to the CPU in a manner to be described. The CPU then sends a coded set of signals along the parallel 4-bit bus 6B to a decoder 400.

The signals fed along the speed select bus 6B are in hexadecimal code, only ten positions of which are used corresponding to the ten predetermined speeds at which an operator is capable of running the transport. The decoded output of decoder 400 is coupled to a Divide by N circuit 401, the input of which is received from a crystal oscillator 403 by means of a switch 404. The switch 404 is actuated by a signal OPRT fed from the CPU along line 6A6.

The oscillator 403 generates a primary clock signal the repetition rate of which is divided by the circuit 401 (if relay 407 is not energized), as determined by the decoded output of the decoder 400. The relay 407 is energized by a signal FAST fed from the CPU along a line 6A7.

If the relay 407 is energized, the output of the crystal oscillator is divided by a smaller number in a circuit designated "Divide by n" and designated 408 which energizes the capstan motor to drive the tape at the slew rate of 320 ips. The output of the wiper arm of the relay 407 is coupled to the reference input of the capstan servo 386 and is used to determine the drive speed of the capstan motor 82. If the signal input from the tachometer pickup 387 (representative of actual capstan speed) is equal to the reference signal input (either from divider 401 or divider 408) a signal $\phi$LOCK appears on line 6C6. This signal, when present, indicates that the capstan motor is operating in a phase locked condition.

In summary, the capstan servo 386 and power amplifier 385 form a velocity servo to control the speed of motor 82 to cause the frequency from the tachometer 83 (or from the reproduce electronics 398) to equal the frequency of the signal generated by "Divide by N" circuit 401 at the operator-selected speed or "Divide by n" circuit 408 at the slew speed. Of course, if switch 404 is not actuated, no pulses are present at the output of circuits 401 or 408 and capstan motor 82 decelerates to stop, at which time no pulses will be received from tachometer 83.

The signal from the tachometer pickup 387 sensing speed of the capstan motor 82 is also coupled directly to a detector circuit 410 and a Divide by 200 circuit 411. The detector circuit 410 senses pulses from the pickup 387 and generates a logic signal designated CMOT along line 6C2 (one line of the monitor bus 6C of FIG. 1) to the CPU. This signal indicates that the capstan is in motion.

The divider circuit 411 generates a pulse for each 1/100 feet of tape travel. These pulses are sent to the CPU as interrupt signals designated CAP along a line designated 6D1, forming part of the previously described Interrupt Bus 6D of FIG. 1.

Turning now to the reel drive systems, a signal TENT is transmitted from the CPU along a line 6A8 to a position servomechanism 415 which receives a bias input 416 and also receives an analog signal from the solar cell photodetector 330 in the lower vacuum chamber. The signal TENT provides an enable signal for the position servomechanism 415 to drive a motor 418, the output shaft of which drives the takeup reel 18.

A tachometer 419 generates pulses representative of the angular velocity of the takeup reel 18 and these pulses, coupled through a Divide by 60 circuit 420 provide interrupt pulses designated TUP to the CPU along the Interrupt Bus line 6D3. A similar closed loop servomechanism drive is provided for the supply reel 16, by means of a separate drive motor 421. A tachometer 422 sensing angular velocity of the supply reel 16 generates a train of output pulses which are coupled through a Divide by 60 circuit 425 to provide an interrupt signal SRP to the CPU along Interrupt Bus line 6D2. The signal TENT, together with the output signal of the supply reel tachometer 422 are coupled to an enable circuit 426, the output of which is used to activate the reel servomechanisms and the vacuum system, as functionally indicated in block 427.

The interrupt signals TUP and SRP contain a pulse for each revolution of the associated reel (take-up or supply). These signals are used, in a manner to be described, for determining the End of Tape positions by comparing them, in the CPU with the pulses CAP on line 6D1 which are representative of capstan angular velocity. As will be described, by comparing these pulses, a ratio can be obtained which is independent of operating speed but which is a true indicator of the diameter of the tape pack remaining on the respective reel. This method permits the operator to change the EOT Position through a simple setting of the data entry switches 362, in combination with the function switch 363 and load pushbutton 364C, and without having to make any mechanical setting or adjustment.

The output signals of the individual photo-detectors 148, 149 for both the upper and lower vacuum chambers are coupled to a logic circuit 430 which generates an output signal TT fed to the CPU along status bus line 6C1 when both tape loops within the respective vacuum chambers are within the prescribed limits defined above—namely, the light path between source 141 and detector 148 is interrupted, and the light path between source 142 and detector 149 is not interrupted. This signal indicates that the tape is properly tensioned.

Another status signal is coupled from the vacuum--generating motors (not shown) along a line 6C3 to the CPU indicating, when present, that the vacuum system is not operating. This signal is designated VALM.

A final status signal (ALRM) generated by various temperature sensors and voltage limit detectors is coupled to the CPU along line 6C8, indicating, when present, that monitored heat sink temperatures are too high or that monitored power supplies are operating outside of previously set limits.

V. Control Panel/CPU Interface

Figure 12:
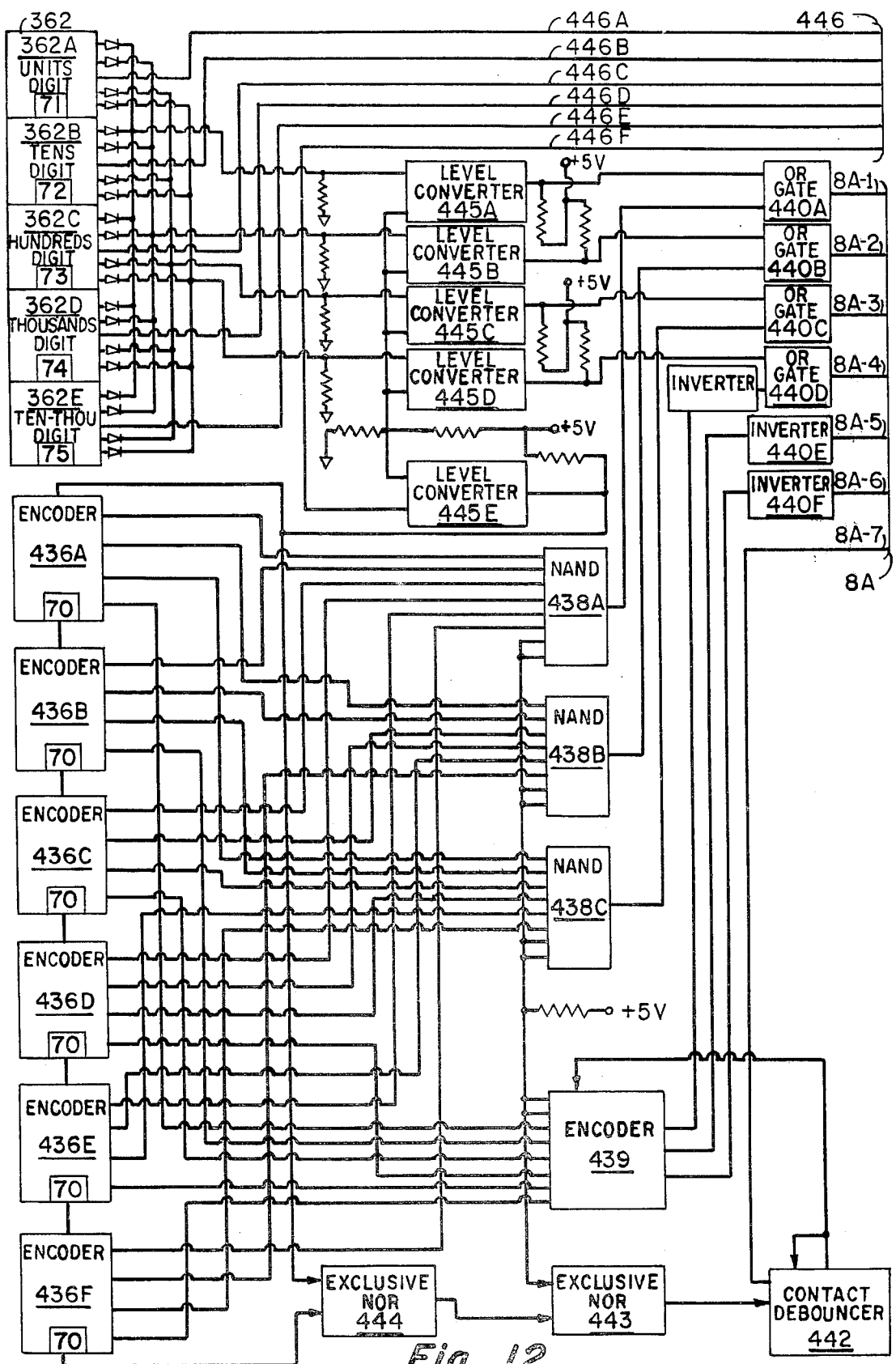
FIG. 12 is a logic schematic diagram of the interface from the Control Panel to the Central Processor unit.
Figure 12A:
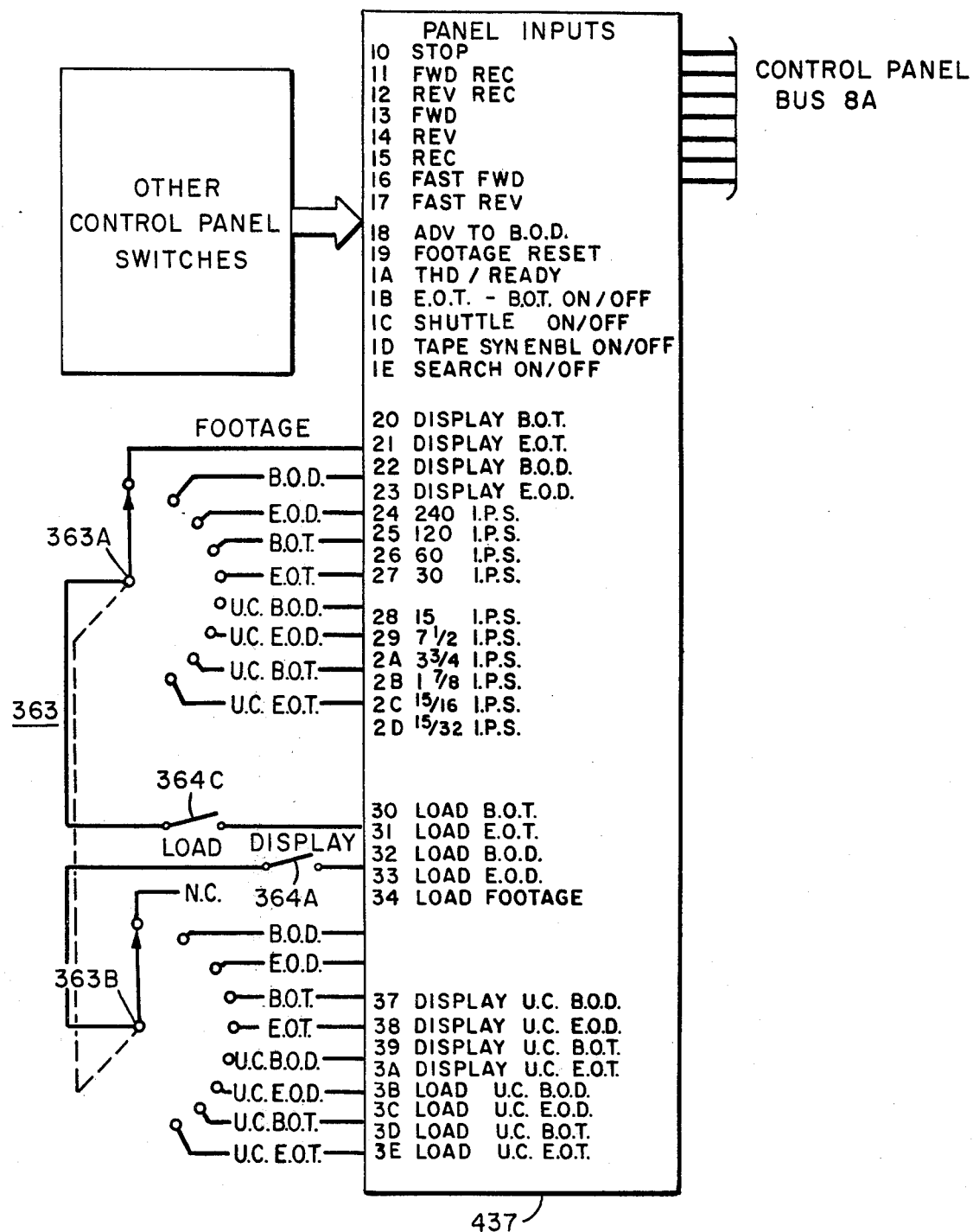
FIG. 12A is a diagrammatic view showing the signals at the Control Panel and the corresponding code transmitted via an Interface Bus.

Referring now to FIG. 12A, the function switch 363 is seen to be a multiposition, rotary selector switch having first and second decks 363A and 363B. The decks are mechanically ganged together, and each deck has at least nine positions, as indicated. The wiper arm of the deck 363A is connected in series with the LOAD switch 364C, and the wiper arm of the deck 363B is connected in series with the DISPLAY switch 364A. The outputs of the function switch (in combination with the LOAD and DISPLAY switches) together with the outputs of the other control panel switches are encoded into the hexadecimal code indicated in block 437. This code is presented to the data lines designated 8A1-8A6

(FIG. 12) of data bus 8A (FIG. 1) as subsequently described.

Each encoder (which may be part number 74LS148 of Texas Instruments) 436–436F has eight inputs connected to a normally open single-pole, single-throw switch arranged to ground its associated input when actuated, except for the inputs connected to the function switch 363 which is arranged to ground a selected input when either the LOAD or DISPLAY switch is actuated. If a specific encoder 436 is enabled (as subsequently described below) a switch actuation on its input will generate a three bit digital code on its output lines and a strobe signal on the fourth output. In addition, a disable signal is generated on the fifth open (last) output line whose function will be described later.

The first four output lines mentioned above assume a logical "1" state and the fifth a logical "0" state if none of the switches associated with the encoder as actuated.

Upon actuation of a switch associated with an encoder, the first three output lines will individually switch to a 0 or remain at a 1 state that is indicative of which of the eight inputs were grounded. The first output line of all encoders is fed to an individual input of NAND gate 483A, the second similarly to NAND gate 438B, and the third similarly to NAND gate 438C. These NAND gates invert each of these three encoder outputs and feed them to three lower inputs of OR gates 440A–440C. The three upper inputs of these OR gates (as will be described later) are set at a logical "0" level; therefore, the three lower inputs are communicated to data lines 8A1–8A3 forming the three least significant bits of code presented to bus 8A.

The fourth output line of encoders 436 is changed from a 1 to a 0 logic, if any switch connected to that encoder's input is activated. All of the fourth outputs are connected to individual inputs of encoder 439. The immediately previously stated logic "0" level on the input of encoder 439 when enabled generates a three-bit code on the three outputs of encoder 439 indicative of which one of the six encoders 436A–436F is generating the three least significant bits of the codes present on lines 8A1–8A3. The first of these outputs if communicated by an inverter to the lower input of OR gate 440D whose upper input is at a "0" logic level, thereby generating a fourth bit of a code on line 8A4. The second and third outputs of inverter 439 are inverted by inverters 440E and 440F respectively, thereby supplying the fifth and sixth bits of code to lines 8A5 and 8A6 respectively.

It should be noted that because of the nature of encoders 436A–436F, multiple simultaneous contact closures on the input of one encoder will yield a code on its output representative of only one of the contact closures, that being the one of higher priority. In addition, as subsequently described, a priority exists among encoders 436.

Contact debouncer 442 provides at one of its outputs an enable signal to encoder 439 after responding at its input to an indication that one of its encoders 436 has been activated. Thus, decoder 439 transfers its encoded output to lines 8A4 to 8A6 only after the contact debouncer 442 has performed its function and eliminated possible errors from spurious contact bounce signals.

Shortly thereafter another output of 442 provides an interrupt signal CPU on line 8A7. The CPU is programmed to read the data present on lines 8A1 through 8A6 on the occurrence of this interrupt signal. Contact debouncer 442 receives its input from EXCLUSIVE NOR gate 443 having one of its inputs at logic 1 (due to its input being tied to +5 volts) and its other input being fed from EXCLUSIVE NOR gate 444.

EXCLUSIVE NOR gate 444 is fed by the output of level converter 445E and encoder 436F. Encoders 436 are connected to each other so that if one has not been actuated it will send the enable signal to the next. More specifically, the output of level converter 445 is connected to encoder 436A. If the latter has not been activated by the operator, it will enable encoder 436B which will perform the same function all the way through the chain of encoders 436F. The output of the latter combined with the output of circuit 445E (which is normally at the same logic level as discussed in further detail below) causes EXCLUSIVE NOR gate 444 to be in a state indicative of no operator initiated encoder activity. Should, however, any of the encoders 436 be activated, the chain of signals if broken and the output of 436F to 444 will change thereby changing the state of EXCLUSIVE NOR gate 444. This change of state is detected by the contact debouncer 442 which then performs the above-described function.

Turning now to the upper left hand corner of FIG. 12, the data entry switches 362 comprise five individual digit switches designated respectively 362A–362E, in order of increasing significance. Each switch may be a pushbutton-controlled switch with a numeric indicator (see FIG. 10) which, when enabled, present on its four output lines, a binary-coded decimal representation of the number to which the associated switch has been preset manually. These switches are strobed sequentially from the highest order switch 362E (representing the ten thousands digit) to the lowest order switch 362A (the units digit). The four outputs of each switch, with corresponding outputs tied together, are connected to the plus inputs of amplifiers used as level converters and designated respectively 445A–445D. The negative inputs of converters 445A–445D are connected to a reference voltage. A fifth level converter 445E has its positive input connected to a reference voltage, and its negative input connected to a line designated 446F, and comprising one line of a six-line bus 446, received from the lower left hand portion of FIG. 13 to be described in more detail presently.

Figure 13:
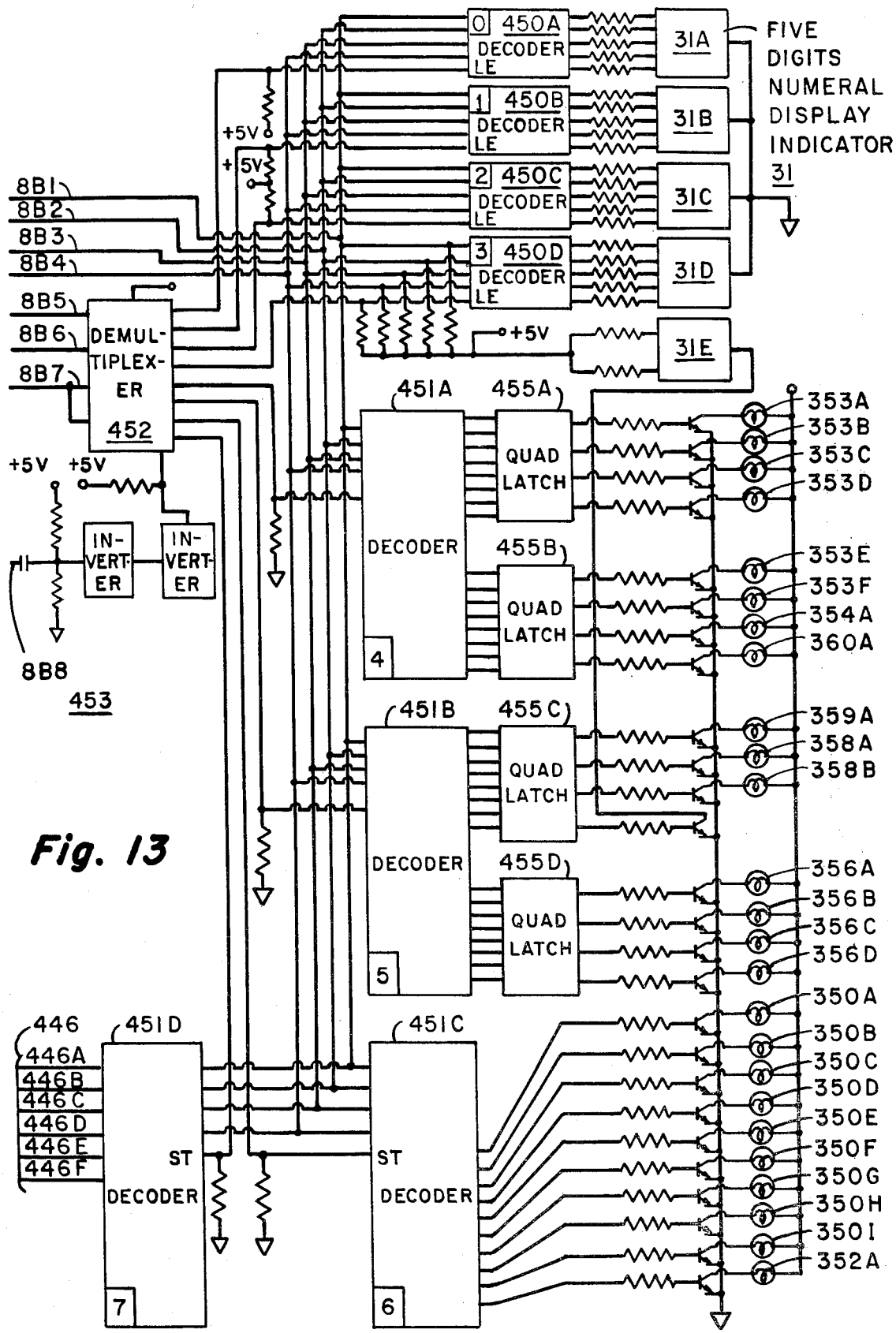
FIG. 13 is a logic schematic diagram of the interface circuitry between the Central Processor Unit and the control panel.

Referring now to FIG. 13, and particularly the upper left hand corner, the command data bus 8B in FIG. 1 from the CPU to the control panel comprises seven data lines designated respectively 8B1–8B7 and one strobe line designated 8B8. The data received from the CPU is in hexadecimal code. The four lines 8B1–8B4 are connected along a common bus to four data inputs of four decoder circuits 450A–450D, as well as to four data inputs of four decoder circuits designated 451A–451D respectively. The decoders are addressed by the data bits on lines 8B5–8B7 which are coupled to a control demultiplexer 452. The decoders 450A–450D may be part No. 14511 of Motorola, Inc.; the decoders 451A–451D may bepart No. 14514 of the same manufacturer; and the demultiplexer 452 may be part No. 14051 of the same manufacturer.

The signal on the strobe line 8B8 is coupled through pulse shaping circuitry generally designated 453 to the control input of the demultiplexer 452.

The decoded outputs of the decoders 450A–450D are connected respectively to the four lower order digits of the previously described five digit numerical display, designated 31 in FIG. 2. The individual display indicators are designated respectively 31A–31E. The ten thousands digit is blanked and unblanked (to display a one only) under program control. The first four decoders 450A–450D are addressed by the first four output lines of the demultiplexer 452 respectively. A "0" signal on the input LE for each of these decoders allows it to accept data on its four input lines; and a "1" causes it to retain the data previously accepted and to ignore further changes on the four input lines. The decoders 451A–451D are, in turn, addressed respectively by the remaining four output lines of the demultiplexer 452.

The outputs of the decoder 451A are coupled through two quad latch circuits 455A and 455B, to lamp drivers, and then to individual indicator lights (preferably LEDs) on the control panel, as designated. Similarly, the outputs of decoder 451B are coupled to actuate individual indicator lights through a second pair of quad latch circuits 455C and 455D. The quad latches may be part No. 14043 of the previously described manufacturer. Ten of the outputs of the decoder 451C are connected respectively to the indicator lamps associated with the ten different speeds at which an operator is capable of running the tape transport. For referencing each of the indicator lights to an associated switch on the control panel, each light is designated with a number representative of the associated pushbutton, followed by a letter designation.

Decoder 451D has six outputs that are used, and these are connected respectively to the bus lines 446A–446F which were described in connection with FIG. 12.

In brief, each of the decoders 450A–450D and 451A–451D is addressed by a decimal number shown in the respective decoder within a block, and representative of the decimal digit corresponding to the three bits on input lines 8B5–8B7, namely, the most significant digit of the hexadecimal code from the CPU.

VI. Operation of CPU/Control Panel Interface

Referring to FIG. 12, the data entry switches 362A–362E are used for the entry data (numerical or command) into the system. The switches are used, together with the function switch 363 to identify what the data is and how it is to be used. The code used by the CPU to address the function switch encoders 436 and the data entry switches is indicated in the associated functional blocks by a number in a smaller block. The hexadecimal digit 7 on address lines 8B5–8B7 of FIG. 13 causes the demultiplexer 452 to enable encoder 451D. The remaining input signals, in this case, are used to address specific locations of the circuitry of FIG. 12. Specifically, the encoders 436 are addressed by hexadecimal code 70 (which transmits a signal along line 446F to level converter 445F, which, in turn, generates an enable signal sent to the encoders 436A–436F and to EXCLUSIVE NOR gate 444). The ten thousands digit switch 362E is addressed by hexadecimal 75, the thousands digit switch 362D is addressed by hexadecimal code 74, and so on as indicated. These address codes are shown within heavy blocks in the associated functional block to which the address relates.

As briefly described above, the signal on line 446F is normally at a logic "1" level. This is inverted by level converter 445E to a "0". Since the signal on line 446F is normally at the same level, encoders 436 are always prepared to detect, encode and output any function selected by the operator on the control panel. However, when data entry switches 362 are being scanned, operator-initiated signal generation at encoders 436 would produce a meaningless or erroneous signal since the encoder output would be combined with the switch 362 output. Consequently, encoders 436 are suppressed during scanning of switches 362 of changing the logic level on 446F from "1" to "0". Once scanning of switches 362 is completed the signal on line 446F is returned to its normal high level.

It will be observed that the operator enters various data, such as the location of Beginning of Data or End of Data or Beginning of Tape or End of Tape using the function switch 363, but he also enters the User Commands for the locations BOD, EOD, BOT and EOT, sometimes designated UCBOD, UCEOD, UCBOT and UCEOT respectively.

Upon the application of power to the recorder, a portion of Random Access Memory is cleared in the CPU. The CPU then clears certain registers and initializes and resets other circuits, as explained more fully in connection with the flow charts.

The CPU then sends hexadecimal code 70 to the control panel via bus 8B. The 7 on the address lines 8B5–8B7 for the address lines 8B5–8B7 selects decoder 451D. The decoded output is transmitted via bus 446 (and in particular, line 446F) to the level converter 445E, the output of which enables EXCLUSIVE NOR gate 444 and the encoders 436A–436F. Normally, after turning the apparatus on, the next operation is to press the "ready" pushbutton. This activates an input of encoder 436B generating a hexadecimal code 1A which is presented to bus 8A on lines 8A1–8A6 and after the contact debounce circuit 442 has presented a "data present" signal on line 8A7, the CPU actuates the vacuum system and the tape tensioning mechanism, described above.

Assuming that the operator wishes to enter data using the data entry switches 362, the function switch 363 will be set to the desired position, for example, Beginning of Data. By placing the function switch 363 in the BOD position and pressing the load switch 364C, hexadecimal code 32 is generated in block 437 and presented to the bus 8A as previously described.

The microprocessor decodes the information and, under program control, interprets the function code and then generates a hexadecimal code 75. This code is transmitted via bus 8B and decoder 451D to enable the digit switch 362E representing the ten thousands digit. This information, previously set by the operator, is then transmitted through the level converters 445A–445D to the OR gates 440A–440D, and to the CPU.

The code in the "load" signal from pushbutton 364C identifies for the CPU which of the five digit data signals has to be obtained from the data entry switches 362. A five digit number is used in loading footage, BOD or EOD. A two digit number is used in loading EOT and BOT. A single digit is used in loading any of the User Commands UCEOT, UCEOD, UCBOD, and UCBOT.

Specific storage locations in memory of the CPU are set aside for data from the control panel. This will be apparent from subsequent flow charts and specific code listings. However, by way of example, the speed control information from the control panel is stored in RAM location 20. ENABLE EOT, ENABLE TS, ENABLE SHUT, and ENABLE SEARCH function codes are stored in RAM location 21.

In this manner, the addressed data entry switches are scanned in order of decreasing significance. After the lowest order switch 362A is read by the CPU, a hexadecimal code 70 is again transmitted to re-enable the function switch encoders 436.

It will be observed that six data lines 8A1–8A6 and "data present" line 8A7 are used to transmit the outputs of the encoders 436, but only four lines 8A1–8A4 are used to transmit the information from the data entry switches.

In summary, the circuitry of FIG. 12 is used for interrogating the Data Entry Switches by the CPU and for encoding this data, transmitting it to the CPU, and for encoding and transmitting information from the function switches to the CPU. In the latter case, the strobe pulse is used on the "data present" line to interrupt the mainline program and indicate to the CPU that data is available.

Returning now to FIG. 13, as indicated above, the information on bus lines 8B5–8B7 is decoded in the demultiplexer 452 to address the decoders 450A–450D and 451A–451D. The decoders 450A–450D are BCD to seven-segment latches for displaying the numerical data. The outputs of the decoders 451A and 451B are also fed to latches 455A–455D. These latches are used to maintain an indicator in the illuminated state even though an adjacent indicator may be illuminated by the same decoder. An indicator is de-energized by sending the next higher hexadecimal number from the CPU. Several indicators associated with a single decoder may have to be illuminated simultaneously, thereby requiring latches 455. This is not true, however, for the indicators representing tape speed, so the decoder 451C does not have to feed latch circuits.

The numeric display indicator 31 is normally fed with information indicating footage by the CPU. If, however, the DISPLAY switch 364A is actuated on the control panel, it, in combination with a selected function switch position (such as EOT), will display stored information representative of End of Tape. In this way, the operator can retrieve information indicative of the BOD, EOD, etc. locations, as well as the Users Codes at these various locations. In these situations, the "data present" interrupt on line 8A7 will cause the CPU to react to the corresponding code by addressing the storage location (EOT, for example) rather than the "footage" storage location and then transmit the coded numeric information to the display units 31A–31E.

VII. Overall System Operation

Reference will now be made particularly to FIG. 11 and to other figures as will facilitate an explanation of system operation.

A. START UP

After the tape has been trained from the supply reel around the roller 32, through the entrance and exit slots of the upper vacuum chamber 310 and the roller 34, it is placed around the tape-carrying surfaces of the drums 40, 44, and thence around the roller 46 through the entrance and exit slots of the lower vacuum chamber, around the roller 48, and under the takeup reel 18. The tape is normally tight in the vacuum chambers (that is, the photodetector 148 is illuminated). In this condition, signal TT is not present.

The operator then pushes the READY pushbutton 358 (FIG. 10). An interrupt signal is present on the bus line 8A7 (FIG. 12), and the CPU is interrupted and reads the code present on lines 8A1–8A6. The CPU then generates the signal TENT on line 6A8 of FIG. 11. At this time, the supply reel is not driven by the motor 421 because the gate 426 is not enabled (due to the fact that no pulses are being sensed by the supply reel tachometer 422).

The takeup reel motor 418 is driven open loop until the tape is drawn out of the vacuum chamber 310 and from the supply reel 16. As soon as the supply reel begins to move, its tachometer 422 generates a pulse, thereby enabling gate 426 which, in turn, couples the TENT signal to actuate the reel servos and vacuum system, block 427.

When the vacuum system is operated and the supply reel servo system is energized, it is possible for the supply reel 16 to meter tape into the vacuum chambers until the proper loop length is attained. All of this occurs with the drum positioning motors 370, 371 de-energized and the drums 40, 44 in the idle position. When the tape loops are such that the position detectors 330 indicate the loops are in the desired position, the logic circuit 430 generates the signal TT which is transmitted back to the CPU via line 6C1.

If the signal TT is not received by the CPU within a predetermined time (six seconds), as defined by a program delay, TENT signal is removed. The initial procedure may be repeated.

When the CPU detects the presence of TT, it illuminates the indicator associated with the "READY" pushbutton 358, and it also illuminates the indicator associated with the "STOP" pushbutton, one of the group designated 353. The STOP indicator is turned off whenever tape motion is called for.

In summary, when the operator presses the READY pushbutton, the CPU detects a coded signal on bus 8A (FIG. 12) and sends the signal TENT (along bus 6A, FIG. 11) to tension the tape. The CPU then initiates a six-second delay between the generation of TENT and the time in which the signal TT (which indicates proper tensioning of the tape) is expected to be received. If the system has not achieved proper tension within the programmed delay time, TENT signal is removed, and the READY indicator is not illuminated.

B. SPEED SELECTION

Assuming now that the operator selects a tape speed by pushing one of the pushbuttons 350, the CPU receives the information by means of the circuitry of FIG. 12 and stores in memory location 20 the desired speed and sends it to the transport provided the speed change lock is not set. After a direction is also specified (forward or reverse), the CPU then transmits a code along bus 6B (FIG. 11) representative of a programmed speed of 15/32 ips. These signals are fed to the decoder 400 and thence to the Divide by N circuit 401. At the same time, the CPU transmits the signal OPRT along line 6A6 to the switch 404, thereby communicating the oscillaotr 403 with the Divide by N circuit 401. The output of the Divide by N circuit 401 is coupled to the capstan servo 386 which causes the capstan 42 to be driven at the programmed speed prior to the time that the drums are in driving engagement with the capstan.

The reason for driving the capstan at a programmed, low speed prior to engaging the drums is that the preferred puck surface 77 (FIG. 5) of the capstan is a high friction, polyurethane resin. If the drums are brought into driving engagement with the capstan while the capstan is not in motion, a "flat" may be formed on the polyurethane puck surface. Since this type of material has "memory", even though the "flat" may last for only one hundred inches or so of tape motion before it is eliminated, it may nevertheless cause flutter.

In summary, the present system causes the capstan to be driven at a programmed slow speed before the drums are engaged, and the programmed speed is independent of the speed selected by the operator. This is under program control by the CPU.

When the capstan has reached the programmed speed, the signal φLOCK is transmitted from the capstan servo (the signal is internally generated) along bus line 6C6 to the CPU. The CPU, in turn, then transmits either signal DRCS or DRFS along lines 6A2 or 6A3 respectively to cause the drum positioning motor 371 for the control drum 44 to place the control drum in driving engagement with the capstan 42, by means of the crank shaft 100, described in connection with FIGS. 4–6. The transport mechansim, as described above, causes the slave drum 40 to follow the control drum after the control drum is in operative engagement (specifically, after the hub 192 has engaged either adjustable stop 286 or adjustable stop 288, and microswitch 260 or 262 has been actuated).

Commencing with the generation of signal DRCS or DRFS, a program delay is initiated by the CPU sufficient to enable both drums 40, 44 to be brought into driving engagement with the capstan 42 as just described. Following the program delay, the CPU transmits the desired speed select data along speed select bus 6B to the decoder 400. The capstan servo 386 will thereupon cause the capstan motor 82 to accelerate until the repetition rate of the signal at tachometer 387 again equals the repetition rate of the divided crystal oscillator signal, at which time the capstan servo will again generate the signal φLOCK and transmit it along line 6C6 to the CPU.

C. FORWARD/REVERSE

When the REVERSE pushbutton is actuated, (as will be more completely explained in connection with Flow Chart NN), the system first checks to see whether the tape transport is already operating in the reverse mode; and if it is not it goes to a subroutine STOP (Flow Chart KK), which subroutine is also entered if the STOP pushbutton had been actuated or if the FORWARD pushbutton had been actuated and the transport were operating in the REVERSE mode. This subroutine disables any of the following signals that may be present: FAST, RECD, TSEN, and DRCS (FIG. 11).

If the capstan had been operating in the FORWARD mode, the CPU transmits the programmed speed (15/32 ips) to the tape transport along the bus 6B to slow down the drums and the tape, and the signal DRCS to position the tape against the heads. The CPU then initiates a delay so that the current phase lock "ON" condition does not effect operation. When the signal φLOCK for the programmed speed is received by the CPU, the signal DRCS is disabled. This removes torque from the crank shaft motors 370, 371 and permits the drums to move to the idle position in which they are disengaged from the capstan 42. As indicated in connection with FIGS. 4 and 5, the crank shafts and drums are normally biased to the idle position by the springs 208, 210, 214 and 216.

After a suitable programmed delay, to insure the drums are no longer in contact with the capstan surface, the signals REVR (if on) and OPRT are disabled, thereby permitting the drums and capstan to come to a complete stop. The CPU checks to see whether the capstan is in motion (signal CMOT), and if it is, a further delay is induced by the CPU. If the capstan is not in motion and the system is at a complete stop, in the case of entering the REVERSE mode, the CPU transmits the signal REVR to energize the reverse relay 380 which, by means of the contacts 382, 383, reverses the polarity of power to the power amplifier 385 driving the capstan motor, thereby causing the capstan motor to operate in the reverse direction. At the same time, the CPU transmits the OPRT signal on bus 6A and data along the speed select bus 6B commanding operation at the programmed speed (15/32 ips).

The relay 380 also causes contacts 381 to transmit the signal REV to the CPU indicating that the transport is operating in the REVERSE mode. The signal REVR may also be used, if necessary, to adjust the supply voltages to the two reel drive motors 421, 418 to equalize the required output torque depending upon whether the system is operating in the FORWARD or REVERSE mode. That is to say, more output torque may be required on the reel drive motor that is taking up the tape than is required on the motor that is metering it out. The supply voltage may be made greater on the motor taking up the tape by means of the signal REVR, and the supply voltage on the motor that is metering out the tape may be correspondingly reduced.

In order to bring the tape transport to the desired speed in the REVERSE mode, the CPU transmits the programmed speed along the speed select bus 6B, and when the signal φLOCK is received on line 6C6, the CPU transmits the desired speed set by the operator, again using bus 6B. The capstan motor is then accelerated in the reverse direction until it achieves the set speed, and the signal φLOCK is again transmitted to the CPU.

D. RECORD

In the RECORD mode, the operator would have pushed either the FORWARD or REVERSE pushbutton, then the RECORD pushbutton (all within the group 353 on FIG. 10). After the capstan reaches synchronous operation (φLOCK) at the programmed speed (15/32 ips), the CPU transmits the signals DRCS to engage the drums with the capstan in the read position. The CPU then transmits the data representative of desired operating speed along the bus 6B as described above, and after accelerating the capstan and drums, and achieving synchronized operation again, the CPU generates a signal RECD and transmits it to the tape transport along line 6A1. This signal energizes the record relay 373 which energizes the record electronics 376, and at the same time, transmits the signal REC along line 6D7 back to the CPU indicating that the system is in the record mode.

It will be observed that the RECORD operation may be effected independently of the direction of tape movement (forward or reverse).

During acceleration to the desired speed in forward or reverse record, the CPU generates a signal to turn on and turn off the RECORD indicator causing it to blink until phase φLOCK has been received by the CPU at which time the CPU causes the record indicator to remain illuminated.

E. FAST FORWARD/FAST REVERSE

It will be observed that there are four mode selector switches 353 corresponding to FAST FORWARD, FAST REVERSE, FORWARD and REVERSE. However, there are only three control signals sent from the CPU to the transport to achieve these controls—namely, OPRT, REVR (the absence of which causes forward capstan motion), and FAST.

To achieve operation in the FAST FORWARD mode, the CPU determines in which direction the capstan is currently operated. If the capstan motion has to be reversed, the capstan is first brought down to the programmed speed as indicated above, the drums are disengaged and placed in the idle position, and then the capstan is stopped. The subroutine STOP1 (Chart LL) is used in this mode as well as other modes to reverse the direction of the capstan.

After the capstan is stopped, the polarity of voltage to the capstan motor is reversed, and the capstan is brought up to the programmed speed in the desired direction. When phase lock is achieved, the FAST signal is transmitted from the CPU on line 6A7 to energize the fast relay 407 to cause the output repetition rate of the oscillator 403 to be divided by n, which fixes the capstan speed at 320 ips.

The FAST REVERSE mode is entered in a similar manner. That is, the CPU determines the present direction of the capstan motion and if it has to be reversed, brings the capstan to a stop as indicated above, then brings it up to the programmed speed in the desired direction, and, after a programmed delay, transmits the FAST signal.

If the capstan does not have to be reversed, the CPU, after determining this, simply transmits the signal FAST.

F. ENABLE MODES

F1. ENABLE SEARCH

When the ENABLE SEARCH pushbutton 356A is depressed, the CPU generates signals (in BCD format) and transmits them along the bus 6B which will cause the capstan to drive the tape in motion at 240 ips with the tape in a playback position (signal DRCS). This mode is entered only if the FAST FORWARD or FAST REVERSE pushbuttons are also actuated. The CPU recognizes the ENABLE SEARCH mode, and disables the FAST signal. If the operator had actuated the FORWARD or REVERSE pushbuttons only, the system would not enter the SEARCH mode because the speed set by the operator would govern.

F2. ENABLE TAPE SYNC

The ENABLE TAPE SYNC signal (TSEN) is communicated from the CPU on line 6A5 when it is desired to control the speed of the tape from a reference signal recorded on the tape. As indicated above, this has the advantage that any perturbation in actual speed of the transport during recording will be reflected on the record of the reference signal which, in turn, may then be used to drive the tape during playback so that the same perturbation will be reflected in the drive of the transport, and thereby reduce the affects of any speed perturbation that may have occurred during recording.

The signal TSEN is fed to the enable circuit 395 which, if a signal is present from the detector 396 indicating that a reference signal is in fact recorded on the tape and being picked up by reproduce amplifier 398, energizes relay 391. Relay 391, in turn, actuates switch 390 and couples the output of the reproduce amplifier 398 directly to the capstan servo 386, causing the capstan servo to be controlled by the reference track on the tape, rather than the capstan tachometer 83. At the same time, contacts 393 return signal TC to the CPU.

F3. ENABLE END OF TAPE

If the ENABLE EOT mode is entered (sometimes referred to as ENABLE BOT/EOT since either parameter is continuously updated by the CPU depending on the direction of tape motion), the system will execute any User Command associated with EOT or BOT. If the mode is enabled and no User Command had been entered, the CPU will execute the Zero Command—i.e. STOP—as seen in Table I.

TABLE I

| USER COMMAND NUMBER | FUNCTION VS COMMAND NUMBER | | | |
|---|---|---|---|---|
| | SHUTTLE ENABLE ON | | EOT ENABLE ON | |
| | UCBOD | UCEOD | UCBOT | UCEOT |
| 0 | FORWARD | FAST REVERSE | STOP | STOP |
| 1 | FAST FORWARD | STOP | FAST FORWARD | FAST REVERSE |
| 2 | STOP | REVERSE | FORWARD | REVERSE |
| 3 | FORWARD RECORD | REVERSE RECORD | FORWARD RECORD | REVERSE RECORD |
| 4 | SPARE | SPARE | SPARE | SPARE |
| 5 | SPARE | SPARE | SPARE | SPARE |
| 6 | SPARE | SPARE | SPARE | SPARE |
| 7 | SPARE | SPARE | SPARE | SPARE |
| 8 | SPARE | SPARE | SPARE | SPARE |
| 9 | SPARE | SPARE | SPARE | SPARE |

If the ENABLE EOT pushbutton 356B is not actuated and the transport is operating in either the forward or reverse direction, the tape transport will empty a reel. This may be desired either in the FORWARD mode (some tape reels are merely kept in archives without rewinding) or in the REVERSE mode. However, as explained above, if ENABLE EOT is not actuated and the tape is in FAST FORWARD or FAST REVERSE, the CPU will disable the FAST signal at either BOT or EOT when that point is reached and send speed select signals to slow the tape to 120 ips so that the tape is passing through the transport at a lower speed when the supply of tape is almost exhausted.

The EOT signal is generated in the CPU by comparing the ratio of angular velocity of the reel being emptied (supply reel 16 in the FORWARD mode and takeup reel 18 in the REVERSE mode) to the angular velocity of the capstan motor. This is accomplished by comparing the output pulses from their associated tachometers. It will be observed that there are more capstan pulses from tachometer 83 than there are pulses from the reels. This is because the capstan has a smaller diameter. However, the repetition rate in all three cases is reduced by a divider circuit, as explained above.

The pulses from the capstan tachometer, divided by 200 in circuit 11 (namely the pulses CAP), are stored in a register in the CPU; and this register is reset each time a pulse is received from the reel being emptied (SRP or TUP respectively). Thus, the total number of pulses accumulated in the register at the time of reset is representative of the ratio of the angular velocity of the capstan to the angular velocity of the reel being emptied. This ratio is a number which is representative of the diameter of the tape pack on the reel being emptied. It will be appreciated that the signal is not a true representation of the linear feet of tape remaining because different tapes have different thicknesses. However, it is a representation of the diameter of tape pack remaining; and the present system has the advantage that the EOT position can very easily be reset under operator control, using the data entry switches 362 and the function switch 363. Prior methods of accomplishing this have required either the placing of a reflective material on the tape, removing the oxide on the tape with a solvent, or adjusting a light source-photodetector combination.

Although the program resets the register just referred to for each received SRP or TUP pulse, the CPU reads the ratio only every third resetting of the register. For reference, the register being referred to is designated register 51 on sheet S3 of line 113 of the program.

As indicated, if the EOT signal is on, and there is a User Command entered in the CPU, that command is executed. In this sense, EOT is a generic indicator to define either the End of Tape or Beginning of Tape locations, depending upon whether the supply reel or the takeup reel is being emptied. Execution of a User Command at either location will be discussed presently.

As also explained above, a User Command is a single digit number associated with BOT or EOT which may be entered using the function switch 363 (at UCBOT or UCEOT positions), the data entry switch 362 (least significant digit only) and the LOAD pushbutton 364C.

Referring now to Table I, the relationship between the User Command number that is entered by the operator and the specific function performed by the system in response thereto is shown for both modes of "ENABLE SHUTTLE" and "ENABLE EOT". For example, in the case of UCEOT, if the User Command number "0" is entered at EOT in the CPU, then the system will stop if the ENABLE EOT switch 356B is actuated and tape has reached the EOT value. As seen in the right hand column of Table I, additional functions such as "FAST REVERSE", "REVERSE", and "REVERSE RECORD" can be performed depending upon the User Command entered at EOT. The positions indicated as "spare" are capable of being used for other functions. For example, if recording electronics were used that permitted recording in the reverse direction, the user could record on one track in the forward direction, use a separate command at EOD, switch to another track and record in the reverse direction. As another example, the user could actuate a second recording system at EOD, and then stop recording on the first system at EOT, thereby providing overlap for the final portion of the recording. Further, the user could transfer recording to a second system and then run the tape off the reel on the first recorder, or operate it in fast reverse to rewind the tape.

Unless the system is placed in the ENABLE SHUTTLE or ENABLE EOT modes, the User Commands are not implemented when the tape reaches BOT or BOD in the forward direction, or when it reaches EOT or EOD in the reverse direction.

F4. ENABLE SHUTTLE

Referring to columns 2 and 3 of Table I, the flexibility of the ENABLE SHUTTLE mode will be appreciated since four User Commands are programmed at each of these locations, with the possibility of others.

The "0" User Command at BOD and EOD defines the conventional "SHUTTLE" mode of operation. That is, when BOD is reached, the system normally moves in the forward playback mode, and when EOD is reached, the system moves in a FAST REVERSE mode. If the other User Commands are employed, when BOD is reached, the system may either be run in a FAST FORWARD (User Command 1), STOP (User Command 2), or FORWARD RECORD (User Command 3).

If no other command is selected by the user and the ENABLE SHUTTLE switch is actuated, the "0" commands are used so that the system operates in the normal SHUTTLE mode.

Thus, when the "ENABLE SHUTTLE" switch 356 is depressed, the CPU continuously updates the footage count as signals are received via the interrupt signal CAP (one pulse per each 1/100 foot of tape travel). When the actual footage reaches the locations defined by the user as BOD or EOD, the CPU retrieves the User Command which the operator has indicated is to be executed, for that particular position (EOD or BOD), sets a flag indicating that a new command has been received, and proceeds to execute that command. That command is executed just as though it were received from the control panel. Specifically, the CPU generates an instruction code which is identical to the code that would have been generated if the command has been implemented at the control panel. This instruction code is used to execute the commands.

G. MISCELLANEOUS MODES

G1. ADVANCE TO BEGINNING OF DATA (TO BOD)

When the "TO DATA" switch 354 is depressed, the CPU determines whether it has to implement a FORWARD or REVERSE command (always at the fast speed) depending upon whether the footage indicated for the present location is greater than or less than the footage for BOD. The Flow Chart TT explains the operation in more detail, as will be discussed, but briefly, each time the location defined as BOD is crossed, the motion of the tape is reversed and the speed is reduced incrementally, the increments being defined by the permissible speed of the speed selector switches 350 (see the control panel of FIG. 10). Thus, if BOD is crossed in the REVERSE mode at 120 ips, the transport is caused to operate in the FORWARD mode at 60 ips, and this hunting for BOD continues until eventually the tape has stopped at the indicated position.

G2. SRP, TUP

The signals SRP and TUP, as explained above, are interrupt signals transmitted to the CUP on lines 6D2 and 6D3 respectively (FIG. 11) from the tachometers for the reel motors 421, 418. Each interrupt indicates one complete revolution of the respective reel. These signals, in combination with the contents of register 51 in the CPU (which is defined in the program listing) determine the ratio of angular displacement between the capstan motor and the reel motor. These signals are used to define End of Tape and Beginning of Tape positions.

The End of Tape and Beginning of Tape positions can be changed by the entry of a two-digit number of means of the control panel. Specifically, the data entry switches 362 (two lowest order switches), the function switch 363, and the load switch 364C are used to enter BOT and EOT locations. These locations, as explained above, are ratios which are not dependent on motor speed and which define tape pack diameter for the reel being emptied, rather than linear footage remaining.

G3. FOOTAGE

The numerical display indicator 31 normally displays footage locations, and is continuously updated by the CPU which receives an interrupt signal (CAP in FIG. 11) for each 1/100 foot of tape displacement from the capstan motor tachometer 387. The footage data can be reset to zero by pressing the pushbutton 364B, regardless of the setting on the Data Entry switches or the position of the function switch. Further, the operator may, at any location, enter a footage representation using the function selector switch 363 (set to the position labelled FOOTAGE), entering the desired footage in the data entry switches 362, depressing the LOAD pushbutton 364C. The CPU will store the new footage indicator in the footage storage location, aand thereafter, the CPU will update this number. Hence, all subsequent footage indications will be reference to the new setting. Thus, other events of interest can be made to occur at the footage indications given in a written log or indicated on an accompanying voice track, thereby eliminating footage displacement calculations. This is considered an important advantage of the present invention.

G4. CALIBRATION

By pushing the CAL pushbutton 355, a calibration signal is recorded on the tape, provided the tape recorder is in the RECORD mode. The length of calibration burst is controlled by the length of time the switch is operated. As with other switches, a visual indicator is also provided.

VIII. Flow Charts

Referring first to Chart A, block 501, the peripheral interface adapters of the I/O circuitry are initialized. The memory is cleared in block 502. In block 503, a code is stored which turns off the indicator for ENABLE END OF TAPE, ENABLE SHUTTLE, ENABLE SEARCH and ENABLE TAPE SYNC indicators. In block 504, the indicator memory locations are cleared in a sub-routing CLIN, to be discussed presently. Blocks 505 and 506 load "READY OFF" and "ALARM OFF" in their respective memory locations. In block 507, a check is made for a valid speed code. If the speed code is valid, it is sent directly to the transport in block 509. If the speed code is invalid, the CPU loads a predetermined speed of 7.5 ips and it is sent to the machine in block 509. In block 510, the program jumps to sub-routine DECHEX for converting the Beginning of Tape and End of Tape locations (entered by the user via the Data Entry Switches, Function Switch and Load Switch described above) from decimal to hex-idecimal notation, this sub-routine will also be described presently.

In block 511 the supply reel decrementer and the take-up reel decrementer are loaded in memory. In block 512, the interrupt mask is cleared so that the CPU is now permitted to be interrupted (by TUP or SRP, for example.)

In block 513, there is a jump to the main program FTOUT, and the initialization routine is then exited in block 514.

In Chart B, a subroutine CLIN clears the visual indicators. Specifically, the indicators for Stop, Forward, Reverse, Fast Forward, Fast Reverse, Record, Advance To Beginning Of Data, Tape Sync and Phase Lock are cleared. In addition, this subroutine clears the RECORD flag. Blocks 516–621 disclose a loop for sequentially clearing the indicators. In block 523, the program is returned to the program location that called the subroutine via exit block 24.

Chart C describes a subroutine DECHEX which converts "unpacked" BCD numbers of "packed" BCD notation, and then to hexidecimal notation. It then adds hexidecimal 80 and stores the result in location HEX 34. The subroutine does the same for numbers in locations HEX 12 and 13 and stores the result in HEX 35. These numbers are used in End of Tape and Beginning of Tape sections of the program. Referring now to Chart D, it is a flow chart which is used to activate the indicator lamps. It does this by sending the code in accumulator A of the CPU to the Control Panel or the respective receiving location.

Chart E is subroutine DELAY which provides the required delay in the subroutine DISP of the Chart D, as called for in blocks 548 and 550.

Turning now to Chart F, the mainline program FTOUT is shown, This program normally outputs signals representative of information stored in the footage counter memory locations and it calls ALARM, I/O, SHUTCK, CKMC and DPIN subroutines, to be discussed below. The mainline program also checks the "record prep" delay, the "new command" flag, "pending command" flag, "Advance to BOD" flag and "remote display" flag. It may, on command, also display other data such as BOD or EOD footage, BOT or EOT set points (values), and User Commands at these various points. Sometimes, this program is used as a subroutine to provide a delay. This re-entrant program and its subroutines are interrupted as required by other functions.

Returning to Chart F, block 575 through 578 retrieve the contents of the memory locations for footage (that is, the quantity or amount of footage between the location at which the footage counter had been reset as arbitrarily determined by the operator and the location currently defined by accumulation of the CAP pulses). Specifically, this portion of the program retrieves the contents of the storage locations in which FOOTAGE is stored, using the subroutine DISP, and, via blocks 588–599, displays the footage digits in order of decreasing significance and blanking the first digit if it is a 0.

Beginning in block 600, the program checks to see whether the record prep delay is equal to zero. If it is not, it is decremented in 601 and the program jumps to the subroutine ALARM in 602. If the record prep delay is equal to zero, the program jumps directly to the subroutine ALARM to see whether an alarm is present. Next, the program checks to see whether a "new command" flag is set in 604. Assuming that it is not, the program proceeds the block 605 (Chart H) to determine whether the "command present" is set. If it is not, the program jumps to subroutine SCHTCK and checks to see whether the ENABLE SHUTTLE mode is operative. Following that, the program jumps to the subroutine CKMC in block 607 to check the tape deck conditions. Next, in block 608, the program jumps to subroutine DPIN for actuating the control indicators on the display panel according to the information in memory. In block 609, the program clears the last command from the control panel if there were one. In block 610 a check is made to see whether the "Advance to BOD" flag is set, if not, in block 611 the program checks to see whether a REMOTE flag is set. If one is not, the program branches to LOCALD, in Chart I. If the REMOTE flag set is set, the program jumps to block 613 in Chart I and reads and assembles the remote display command (thereby providing for remote control).

If, in block 612 the program had proceeded to block 514, it continues to read the local display command if any is present in block 615. Next, in blocks 616–624, the program checks to see whether any of the indicated displays, such as BOT, EOT, etc., have to be displayed. If so, an appropriate subroutine is called for that purpose. If not, in block 624, the program loops back to block 575 and repeats itself.

As an example, if in block 618 the program had determined that BOD should be displayed the program branches in block 625 to block 577 in Chart F. Subsequently, via blocks 578–599, the system displays the data stored in the Beginning of Data footage locations in a manner similar to that described above, in which it displayed cummulative footage.

Block 626 in Chart J branches to block 579 in Chart F. Blocks 620–623 are single digit displays, (as in User Commands) and so they all branch via block 631 to subroutine OUT1, designated by block 635 in Chart F. This subroutine blanks all of the higher order digits except for the lowest order digit, retrieves the information stored in the memory for the lowest order digit and displays it.

In the case of a two-digit display (BOT, EOT), the program branches at block 634 to block 648 in Chart F, and in a similar manner, displays the memory contents associated with the two lowest digits.

After all of the displays mentioned above, the program resumes at block 604 to determine whether a "new command" flag has been set, as indicated above. If one has been set, the program branches to block 659 in Chart G.

Referring then to Chart G, in block 660, the program determines whether a "pending command" flag is set. If it is not, it sets the "pending command" flag in 667. If it has been set, it pulls the "pending command" flag address from the stack, and decides whether the "pull" flag is set. If it is not, the program proceeds to block 667 as described. If the "pull" flag is set, in block 663, the program pulls STOP1 return address from the stack and resets the "pull" flag in 665. Following setting of the "command" flag, the program sets the reel revolution counters (it will be recalled the setting is 3), and jumps to CMD5 in block 669. If the "pull" flag is set, as determined in block 662, the program pulls STOP1 return address from the stack and resets the "pull" flag in block 665, preceding block 667 described above.

Returning to Chart H, if in block 610 it was determined that the "Advance to BOD" flag is set, the program jumps to the subroutine CKAA in the "Advance to BOD" program, as indicated in block 670.

Referring now to Chart K, the subroutine ALARM is shown. This subroutine is called by the mainline program FTOUT. It checks the status of the master and vacuum alarm lines (lines 6C3 and 6C8 in FIG. 11) and flashes an alarm indicator if needed.

Referring now to Chart L, in block 696 this subroutine checks to see if the "shuttle check" flag is set. If it is not, it returns to the mainline program. If the flag is set, a check is made to see whether the shuttle switch is on, and if it is, the program branches to the subroutine SHUT1, in block 700. If the shuttle switch is not on, the program clears the "shuttle check" flag in block 698 and returns to the mainline program.

Referring now to Chart M, there is shown a flow chart for the subroutine CKMC which checks the status of signals of the tape deck and changes codes in the indicator memory locations or changes control signals fed to the tape deck. This flow chart is self-explanatory.

Referring now to Chart N, subroutine DPIN controls the front panel displays except for the numeric indicator display 31. Turning now to Chart O, subroutine CONDX controls display for EOT, SEARCH, SHUTTLE, and TSEN.

Chart P is a flow chart for subroutine POLL which determines what the system does in the event of an interrupt. This subroutine determines the source of the interrupt (in block 762, 764, 766, 768 and 770 respectively), and depending upon the source branches to the appropriate subroutine as indicated.

Referring now to Chart Q, this subroutine is entered as a capstan interrupt. Capstan pulse interrupts (CAP, FIG. 11) occur at the rate of 100 pulses per foot of tape motion, resulting from the output of the division circuit from the capstan tachometer described above. The subroutine checks the direction of tape motion, then either increments or decrements the footage number stored in memory. In addition, it increments the EOT/BOT pulse counter until it reaches 255 pulses and once each foot of tape passes, it sets the "shuttle check" flag. The footage placed in memory is displayed by the mainline program FTOUT. RETURN block 809 sends the program back to the next instruction after the one completed before the interrupt was recognized. This returns control to the mainline program.

Referring now to Chart R, the flow chart for the subroutine SHUT1 is disclosed. In blocks 811-818, the information stored in the footage memory location is compared to the information stored in the EOT memory location. If they are not equal, there is a branch to SHUT in block 836, to be discussed later.

If these two quantities are equal, the program Sets the "User Command" flag at EOD in block 819, and, in blocks 820-827 decodes the User Command retrieved (called the "flag" in the flow chart) and after it is decoded, proceeds to LDSC, block 831. This portion of the program stores the command in the command address and generates and stores the "new command" flag. The program then jumps to the subroutine CLIN and resets the "shuttle check" flag in block 829, and then returns to the mainline program in block 830. Referring now to block 836, this portion of the subroutine acts in a manner similar to that just described in connection with checking for End of Data, to determine whether the tape is at Beginning of Data. If it is, then the User Command that is stored is decoded and action is taken as disclosed in blocks 842-853. If the program determines that the tape is neither at End of Data nor at Beginning of Data, it proceeds via block 841 to block 829 to reset the "shuttle check" flag and return to the main line program. It will be recalled that the program proceeded to the subroutine SHUT1 only if the "shuttle check" flag was set (block 696 in Chart L) and the shuttle switch was on, in block 697.

Referring now to Chart S, the subroutine EOT1 is entered each time the program goes through "footage out". In blocks 861-872, the program determines wheterh the tape is at the EOT position. If the tape is at EOT and the EOT switch is turned on (block 870), then the program proceeds to decode the User Command that is entered at EOT, this occurs in blocks 875-883, and appropriate action is taken depending upon the User Command that had been entered into memory by the operator.

If EOT was on, referring to Chart V, after the User Command is decoded, the program jumps to LDFC and stores the command and the command address, generates and stores a "new command" flag, and jumps to subroutine CLIN, and branches to CLRI11, block 886 in Chart T, thereby setting the capstan count to 0 in block 887, and returns to the mainline program.

Turning now to Chart U, if EOT were determined to be OFF, in block 870, the system (block 894) sends a command of 240 IPS to the tape deck if FAST were on (block 890) and, in block 895 loads the FORWARD command and branches to LDFC, described above. This portion of the program just described is useful in setting an upper limit of tape speed for the exit speed fo the trailing portion of the tape in emptying a reel. If FAST were not on as a command, the tape speed would not change from that set by the operator after EOT (or BOT) were sensed.

Referring now to Chart W, the subroutine BOT1 operates in a manner similar to the previously described subroutine EOT1 (Chart S), except that in this case, the takeup reel rather than the source reel is being emptied. It will be observed that if a User Command is detected, the subroutine brances to LDFC in Chart V as described in connection with Chart S.

Turning now to Chart X, the subroutine BOTOFF is similar to the subroutine EOTOFF described above in connection with Chart U, but again, it is used when the take-up reel, rather than the source reel is being emptied. Referring now to Chart Y, this portion of the program is entered at block 940 if a remote command has been entered and at block 946 if a command was entered at the Control Panel of the system. The flow chart discloses in detail how the particular command is decoded, and depending upon that decoding, branches to the appropriate subroutine.

Referring now to the particular branches to which the program proceeds depending upon which command is being executed, the commands are handled in three basic manners. The first type of command [which includes FTRST, block 956 (fottage reset), THDRDX, block 958 (thread ready), CONDR, block 960 (condition of alternate action switch register), SPEED, block 964 (a speed setting command), LTDW, blocks 968 and 933 (load data switches)], is executed immediately if possible. The subroutines for these various commands are shown in Charts BB, DD, CC, EE, and GG.

If the command detected is a second type of command, as indicated in block 954, the program branches to CMD3, block 974 in Chart Z. This subroutine then stores the command in the command address and sets the "new command" flag. During normal operation of the mainline program FTOUT it will be detected that the "new command" flag has been set and program control is then transferred to CMD5 which has already been described.

A third type of command (for instance, those listed in block 962 and block 971) causes the program to branch to the routine DIS. DIS in Chart AA, block 993 returns the program from the interrupt. The DIS function, however, is scanned in FTOUT, the mainline program, for display commands. The display will be switched to the proper program during each scan for as long as a switch is held closed. This display routine has been previously explained in connection with the FTOUT mainline program.

The LDTW routine as shown in Chart GG, block 1075 will now be described. This was entered as one of the Type 1 commands, previously described, to be immediately executed. This command is compared to the last control panel command. If the command is the same as the last one entered, it is ignored. The command numbers are compared to various fixed numbers in the program in blocks 1079 through 1083 and 1093 through 1096. If a match occurs in blocks 1079 through 1081 a pointer is set to the 10,000 foot digit. It may be the beginning of footage, it may be the Beginning of Data or the End of Data. If the comparison occurs in blocks 1082 or 1083, the pointer is set to the tens digit of either BOT or EOT. If comparison occurred in blocks 1093 through 1096 it is a single digit User Command. If it is a single digit User Command, a digit indicator is set to code 71 and then that number is stored in a selected memory location which corresponds to the units digits in the Data Entry Switch. Similarly if it is a five digit command, a 75 code is stored in that location, and if it is a two digit command code, 72 is stored in that location. The number that is stored in the memory location is a code that allows the CPU to select (address) the proper digit to be read from the Data Entry Switch. This is sent to the control panel via a subroutine display. It is then determined whether the command originated from the remote or local control panel. If it originated from the local control panel the selected digit of the local data entry switch (as shown in block 1108) is read. If the data originated from the remote control panel, the local control panel switch is ignored, the remote data entry switch (or equivalent) is read. The digit, for example the 10K digit read in, is stored in the location indicated by the pointer previously described. The pointer is the decremented and the digit indicator is also decremented.

The program then compares to see if whether the digit indicator is equal to 70. If it is not, the new digit indicator is stored in the data entry switch digit select location and the process is repeated until the digit indicator has been decremented to 70. It will be seen from the above that if the original digit indicator were a 75, five digits would have been read from the manual data entry switches. Similarly if it were a 71, only the units digit would have been read from the manual data entry switches. Then, according to block 1113, there is a jump to the subroutine DEX HEX which converts the decimal digit to a hexidecimal digit and then returns from the interrupt. If a Type three command (as previously described) had been entered, there is a jump to Chart HH, block 1175 labeled CMD4. In this case, the command number is multiplied by four and the new command is stored in a low order command address. A high order command address is generated and stored, and the "new command" flag is set as shown in blocks 1116 through 1119. Various flags are then reset, particularly A to B SPEED FLAGS as shown in block 1120. Next, there is a jump to subroutine CLIN, and after that, to block 1122 to send the indicated speed to the tape deck. The program then returns from the interrupt. The previous multiplication by four spaces commands properly in the jump table when Chart JJ CMD5 block 1124 is entered. The particular command number will cause a jump to occur to the appropriate routine such as STOP, RECORD FORWARD, RECORD REVERSE, etc.

Referring now to Chart KK, STOP block 1144 as with all of the following commands, the command indicator code is loaded and stored. Then, there is a jump to subroutine DISPLAY to display that code as shown in blocks 1145 and 1146. In this particular case, STOP, the status of tape deck is obtained, and there is a check to see whether READY and RECORD are the only commands. If they are not, there is a jump to subroutine STOP 1 to remove all other commands. Assuming READY and RECORD are the only commands present for the moment, the program goes to block 1150 to check that READY is on. If it is on, the READY command is loaded which would remove RECORD had it been on and send that to the tape deck. If it is not on, the thread command is loaded which also removes RECORD if it is set. The program then sends that signal to the tape deck, clears the "pending command" flag, and then jumps to the mainline program FTOUT.

Referring now to Chart LL, block 1160, labeled STOP 1, the stop is entered from the mainline program FTOUT if the "new command" flag is set and the STOP ADDRESS is maintained in the COMMAND ADDRESS. STOP 1 is entered as a subroutine from STOP, FORWARD, FAST FORWARD, REVERSE, FAST REVERSE, RECORD FORWARD and RECORD REVERSE, if required. The only time it would be required to enter STOP 1 is if the new command is going to change the direction of tape travel. It is not required if the new command merely changes speed or other functions.

Returning to Chart LL, block 1160 STOP 1, the program first gets the command signals that are going to the tape deck, sets the "pull" flag and then gets the tape deck status in blocks 61-63. It then checks to see if the tape is in motion in block 1164. If tape is not in motion, it branches to stop 9 and 8 by block 1165. This jumps us to block 1200. In block 1201 the status of the tape deck is again obtained, and a check is made to see that all signals are off except TAPE TENSION. If all signals are not off, the program goes to block 1188 where it obtains the signals from the tape deck again. It drops OPERATE and REVERSE if they are on, and sends the remaining signals back to the tape deck and then again checks to see that all of the signals except TAPE TENSION are off coming from the tape deck.

The program remains in this loop until all status signals from the tape deck are off with the exception of TAPE TENSION. When this is achieved, it goes to block 1203 where it loads the tape motion and reverse drop delay. It then, in block 1204, jumps to subroutine DPIN and uses it as a delay and then jumps to subroutine FTOUT, uses it as a delay, and then decrements a delay counter. If the delay counter is not equal to zero, the program stays in this delay routine jumping to subroutine DPIN and FTOUT until the delay counter has reached zero. When it reaches zero, the program goes to block 1208 and resets the "pull" and "speed change lockout" flags, and then loads the indicated speed and sends it to the tape deck.

The program then returns from this subroutine to the program that called it. Referring back to block 1164, if tape is in motion, the program then drops FAST, RECORD, TSEN, and DRFS signals. In block 1167 it adds the DRCS signal and sends the signals to the tape deck in block 1168. Also, it sets the "speed change lockout" flag in block 1169, and then in 1170, changes the tape deck speed to 15/32 inches per second. The speed indicator 31 on the front panel of the recorder does not change, but remains at the previously set speed. The program is now going to decelerate the tape to a speed of 15/32 inches per second, and when it has achieved phase lock 15/32 ips as determined by block 1175. If phase lock is on, the program will get command signals going to the tape deck and then drop the DRCS signal which disengages the drive rollers from the capstan. In block 1183, it then sets a delay counter to allow sufficient time for this disengagement to occur. It jumps to subroutine DPIN and FTOUT and uses those as delays and decrements the delay counter. In block 1187, a check is made to see whether the delay counter has now been counted down to zero. If it has not been counted down to zero, the program returns to block 1184 and repeats the process in blocks 1184 through 1187 until the counter is zero, at which time the program proceeds to block 1188, gets the signals that are being sent to the tape deck, drops OPERATE and REVERSE if they are on (to cause the capstan to come to a stop) and sends these signals to the tape deck.

The program gets the status of the tape deck and checks to see if all signals are off except TAPE TENSION. The program at this time is in the same routine as was previously described concerning the "STOP 9 plus 8" routine, and the program proceeds from this point as it did previously.

Turning now to Chart MM, block 1120, ROUTINE FORWARD, as with the previous command, the program loads and stores the FORWARD indicator code and then displays it by jumping to subroutine DISPLAY. Upon return, it gets the status of the tape deck and checks to see if REVERSE is on in block 1224. If the REVERSE relay is energized, it branches to subroutine STOP 1 which has already been discussed, and upon return from that, it jumps to subroutine FSTRT, which will be explained shortly. If REVERSE is not on, it immediately goes to block 1227 to check whether the TAPE SYNC ENABLE is on. If TAPE SYNC ENABLE is on, it loads FORWARD TENSION tape and TAPE SYNC ENABLE signals and the branches to SEND M. If it is not on, the program loads FORWARD and TENSION TAPE signals and branches to SEND M, to be explained presently.

Turning now to Chart NN, block 1231, REVERSE, the program again loads and stores the indicator code, jumps to subroutine DISPLAY, gets tape deck status and checks to see if REVERSE is on. In this case, if REVERSE is not on, it branches to subroutine STOP 1 and then jump to subroutine RSTART which will be explained shortly. If REVERSE is on, it checks to see if TAPE SYNC ENABLE is on. If it is on, the program loads REVERSE, TENSION TAPE and TSEN signals. If not on, we load REVERSE and TENSION TAPE signals only and then in both cases branch to SEND M.

Turning now to Chart OO, block 1242, FAST REVERSE, this command is handled similarly to the two just described except that the program eventually gets to block 1249 where it checks to see whether SEARCH is on. If SEARCH is not on, the program loads the FAST REVERSE signal only and branches to SEND M. If SEARCH is on, it changes the tape deck speed to 240 inches per second loads FAST REVERSE and SEARCH signals and then branches to SEND M.

Chart PP is a flow chart for FAST FORWARD. In block 1255, the program proceeds in the same manner as in the immediately preceding one, except that if REVERSE is on, the program takes the path that it took for REVERSE OFF in the previous one.

Chart QQ, starting at block 1270, illustrates the command RECORD. In this case, the program proceeds as previously except it checks to see if the tape is tensioned. If the tape is tensioned, it loads the RECORD and TENSION TAPE signals and then jumps to SEND M, while if it is not, it loads the RECORD signal only and jumps to SEND M.

Chart RR, starting at block 1278 illustrates the command RECORD FORWARD. In this case, the program proceeds in the same manner as in FORWARD except it loads and displays the RECORD indicator and then jumps to SEND M. In addition, it stores the RECORD indicator code.

Chart SS, block 1289 begins RECORD REVERSE. In this case, the program proceeds in the same manner as in the immediately previous case, except that now the Tape is moving in the reverse direction and the program jumps to SEND M.

Chart VV, beginning at block 1370 illustrates SEND M. First the program sends the signal to the tape deck, gets the status of the tape deck, checks to see whether MOTION is on or RECORD is on. If neither are on, it jumps to subroutine FTOUT, then again gets the status of the tape deck and keeps repeating this loop. When finally MOTION comes on in block 1273 or RECORD comes on in block 1274, the program clears the "pending command" flag and then jumps to mainline routine FTOUT in block 1377. With this, a command has now been completely executed.

Chart UU, beginning at block 1347 illustrates the subroutine FSTART. The program generates the FORWARD NO ROLLER command signal. In block 1350 which commences subroutine RSTART, the program generates a REVERSE NO ROLLER signal. In both cases, the program goes to block 1352 and sends speed command signals of 15/32 inches per second to the tape deck. The program then delays and checks to determine whether phase lock comes on, at which time it retrieves the signal that had been sent to the tape deck, combines it with a DRUM DRIVE (DRFS or DRCS) signal, and sends them to the tape deck in block 1358. The program then checks to see whether the ADVANCE TO BEGINNING OF DATA speed is set. If not it sends the indicated speed to the tape deck, clears the "speed change" flag and returns to the program that called this subroutine. If the ADVANCE TO BEGINNING OF DATA speed is set, the program sends the operator-set speed for Advance to BOD to the tape deck and then returns.

Chart TT, commencing at block 1305, illustrates A to B (ADVANCE TO BEGINNING OF DATA). In block 1306, it loads and stores the ADVANCE TO BEGINNING OF DATA code and flag, jumps to subroutine DISPLAY and then sets the pointer to ten thousands digit for FOOTAGE. In blocks 1310 through 1316, the program compares all of the footage digits against the corresponding digits for BEGINNING OF DATA, and if a comparison does not occur, it stores the condition code register temporarily, and checks to see if the "A TO B NEAR" flag is set. If it is set, the program checks to see if the "A TO B SPEED CHANGE" flag is set. If this flag is set, it jumps to FTOUT. It will be recalled that in FTOUT, the program jumped to CKAA from time to time. This is to reenter A TO B at this point and see whether the footage digits on BEGINNING OF DATA are equal to the actual footage digits. If the "A TO BE NEAR" flag (blocks 1318, 1319) is not set, the program sends 240 IPS speed command to the tape deck and stores that speed in memory. The program then gets the condition code register and checks to see if the footage digit is less than the BEGINNING OF DATA digit in block 1325. If it is less than the BEGINNING OF DATA digit, the program generates a FAST FORWARD command. If not, it generates a FAST REVERSE command. In either case, it generates and stores the STOP INDICATOR OFF code, and generates and stores the low order command address and high order command address, sets the "command" flag, clears the "pending command" flag, and jump to FTOUT where this command will be handled as any other command in block 1332.

If the "A TO B SPEED CHANGE" flag was not set in block 1320, the program goes to block 1333, gets the "A TO B SPEED CHANGE" flag, decrements the A TO B speed, gets the contents of the condition code register which was previously stored, and then checks to see if the footage digit is less than the corresponding BOD digit. In this case, in block 1336, if the footage digit is less than the BOD digit, the program generates a FORWARD command. If the footage digit is not less than the BOD digit, the program generates a REVERSE command; and in both cases, it proceeds to block 1328 to generate a STOP INDICATOR OFF code and then to block 1328 to generate command addresses as immediately previously pointed out.

Returning to block 1316, if the footage pointer were not equal to zero, the program loops to block 1310 to obtain the lower order digits of FOOTAGE and BEGINNING OF DATA and compares them. If it is equal to zero, the program to block 1317, sets the "ADVANCE TO BEGINNING OF DATA NEAR" flag as labeled set A TO B NEAR flag, then checks to see whether the tape is in motion. If tape is in motion, the program generates and stores an OFF code for FORWARD REVERSE, FAST FORWARD and FAST REVERSE indicators, clears the "A TO B SPEED CHANGE" flag and loads the STOP command in block 1346. It then goes to block 1328 and generates and stores the command address, as previously described.

Returning to block 1339, the program checks to see whether the tape is in motion as it previously did. If it were not in motion, the program clears a group of flags-namely, "A TO B", "A TO B NEAR", "A TO B SPEED CHANGE", and "A TO B SPEED" flags. The program also clears the "pending command" flag, loads and stores the ADVANCE TO BEGINNING TO DATA OFF code, and jumps to the mainline program FTOUT since command has been completed.

```
00003          *****************************************************
00004          *                                                    *
00005          *                 839127-PL REV A                    *
00006          *                                                    *
00007          *****************************************************

00009          *       SABRE X RECORDER CONTROL PROGRAM BY MUSSATT.

00011
00012
00013
00014
00015
00016
00017
00018

00020 4004                   ORG     $4004        ;THIS PART OF THE PROGRAM ASSIGNS
00021 4004 0001     P1AD     RMB     1            ;ADDRESSES TO THE PERIPHERAL INTER-
00022 4005 0001     P1AC     RMB     1            ;FACE ADAPTERS. P1AD IS PIA#1 A SIDE
00023 4006 0001     P1BD     RMB     1            ;DATA DIRECTION REGISTER UNTIL A 1
00024 4007 0001     P1BC     RMB     1            ;IS LOADED INTO PIA#1 A SIDE CONTROL
00025 4008 0001     P2AD     RMB     1            ;REGISTER BIT 2 AT WHICH TIME P1AD
00026 4009 0001     P2AC     RMB     1            ;BECOMES PIA#1 A SIDE PERIPHERAL
00027 400A 0001     P2BD     RMB     1            ;DATA REGISTER.
00028 400B 0001     P2BC     RMB     1            ;P1AC IS PIA#1 A SIDE CONTROL REGIS-
00029 4010                   ORG     $4010        ;TER. P1BD IS PIA#1 B SIDE DATA
00030 4010 0001     P3AD     RMB     1            ;DIRECTION REGISTER OR PIA#1 B SIDE
00031 4011 0001     P3AC     RMB     1            ;PERIPHERAL DATA REGISTER AS ABOVE.
00032 4012 0001     P3BD     RMB     1            ;P3BC IS PIA#3 B SIDE CONTROL
00033 4013 0001     P3BC     RMB     1            ;REGISTER ETC.

00035 4040                   ORG     $4040        IN ANTICIPATION OF USING ACIA
00036 4040 0001     ACIS     RMB     1            ACIA STATUS OR CONTROL REGISTER
00037 4041 0001     ACID     RMB     1            ACIA DATA REGISTERS
00038                                             ACIA = TTY INTERFACE DEVICE
```

LIST 1

DG16        MOTOROLA M68SAM CROSS-ASSMBLER         PAGE  2
                                                  DATE- MAR 14,'78

```
00040          *PERIPHERAL INTERFACE ADAPTERS ARE SETUP AS FOLLOWS.

00042          *   P1AD    RECEIVES DATA FROM MACHINE AND CAPSTAN PULSES.
00043          *   P1BD    RECEIVES SUPPLY REEL PULSES. AND ALARM SIG.
00044          *   P2AD    RECEIVES SIGNALS FROM CONTROL PANEL(S), TAKE UP
00045          *           REEL PULSES AND LOCAL CONTROL DATA PRESENT SIG.
00046          *   P2BD    SENDS DATA TO CONTROL PANEL(S) & ENABLES MACHINE.
00047          *   P3AD    SENDS COMMANDS TO MACHINE.
00048          *   P3BD    SENDS SPEED LINES TO MACHINE, RECEIVES SIGNALS
00049          *           FROM REMOTE CONTROL PANEL AND ALARM SIGNAL.

00051          *   BIT     0    1    2    3    4    5    6    7    C1   C2

00053          *   P1AD    CMOT REV  REC  BLCK TT   TC   --   --   CAP  --
00054          *   P1BD    --   --   --   --   --   --   VALM ALRM SRP  --
00055          *   P2AD    LCB0 LCB1 LCB2 LCB3 LCB4 LCB5 RCB4 RCB5 TUP  LCDP
00056          *   P2BD    INB0 INB1 INB2 INB3 INB4 INB5 INB6 INB7 --   MACH
00057          *   P3AD    OPRT REVR RECD FAST TENT TSEN DRCS DFFS --   --
00058          *   P3BD    BIT0 BIT1 BIT2 BIT3 RCB0 RCB1 RCB2 RCB3 RCDP --
```

LIST 2

DG16  MOTOROLA M68SAM CROSS-ASSMBLER     PAGE 3
                                         DATE- MAR 14,'78

```
00060       *   LOCATIONS ASSIGNED TO VARIOUS FUNCTIONS IN RAM.
00061       *   MEM     ADD         CONTENTS
00062       *   LABEL   HEX
00063       *   RM      0      TAPE FOOTAGE COUNTER PRF DIGITS.
00064       *   RM+1    1      TAPE FOOTAGE COUNTER FOOTAGE UNITS.
00065       *   RM+2    2      TAPE FOOTAGE COUNTER TENS
00066       *   RM+3    3      TAPE FOOTAGE COUNTER HUND
00067       *   RM+4    4      TAPE FOOTAGE COUNTER THOU
00068       *   RM+5    5      TAPE FOOTAGE COUNTER TENK
00069       *   RM+6    6      BEGINNING OF DATA UNIT
00070       *   RM+7    7      BEGINNING OF DATA TENS
00071       *   RM+8    8      BEGINNING OF DATA HUND
00072       *   RM+9    9      BEGINNING OF DATA THOU
00073       *   RM+10   A      BEGINNING OF DATA TENK
00074       *   RM+11   B      END OF DATA UNIT
00075       *   RM+12   C      END OF DATA TENS
00076       *   RM+13   D      END OF DATA HUND
00077       *   RM+14   E      END OF DATA THOU
00078       *   RM+15   F      END OF DATA TENK
00079       *   RM+16   10     BEGINNING OF TAPE UNIT
00080       *   RM+17   11     BEGINNING OF TAPE TENS
00081       *   RM+18   12     END OF TAPE UNIT
00082       *   RM+19   13     END OF TAPE TENS
00083       *   RM+20   14     INDICATED TAPE SPEED
00084       *   RM+21   15     EOT, TAPE SYNC ENABLE,SHUTTLE & SEARCH
00085       *   RM+22   16     USER COMMAND AT B.O.D.
00086       *   RM+23   17     USER COMMAND AT E.O.D.
00087       *   RM+24   18     USER COMMAND AT B.O.T.
00088       *   RM+25   19     USER COMMAND AT E.O.T.
00089       *   RM+26   1A     CHAR 1
00090       *   RM+27   1B     CHAR 2
00091       *   RM+28   1C     CHAR 3
00092       *   RM+29   1D     CHAR 4
00093       *   RM+30   1E     I/O FLAGS
00094       *   RM+31   1F     INDICATOR STOP
00095       *   RM+32   20     INDICATOR FORWARD ON EVEN, OFF ODD
00096       *   RM+33   21     INDICATOR REVERSE
00097       *   RM+34   22     INDICATOR FAST FORWARD
00098       *   RM+35   23     INDICATOR FAST REVERSE
00099       *   RM+36   24     INDICATOR RECORD
00100       *   RM+37   25     INDICATOR ADVANCE TO BEGINNING OF DATA
00101       *   RM+38   26     INDICATOR TAPE SYNC LOCK
00102       *   RM+39   27     INDICATOR PHASE LOCK
00103       *   RM+40   28     INDICATOR READY
00104       *   RM+41   29     INDICATOR ALARM
00105       *   RM+42   2A     LEADING ZERO BLANKING FLAG
00106       *   RM+43   2B     DIGIT CONTROL 30=THOU, 20=HUND,...0=UNIT.
00107       *   RM+44   2C     INDICATOR FOR RM+21 DATA
00108       *   RM+45   2D     LAST CONTROL PANEL COMMAND
00109       *   RM+46   2E     PENDING COMMAND FLAG
00110       *   RM+47   2F     SHUTTLE CHECK FLAG
00111       *   RM+48   30     DISPLAY DELAY HI ORDER BYTE
00112       *   RM+49   31     DISPLAY DELAY LO ORDER BYTE
00113       *   RM+50   32     REVERSE FLAG FOR BOT/EOT
```

LIST 3

DG16  MOTOROLA M68SAM CROSS-ASSMBLER      PAGE  4
                                         DATE- MAR 14,'78

```
00114        *   RM+51   33   CAPSTAN PULSES FOR BOT/EOT
00115        *   RM+52   34   CAPSTAN PULSE MARKER NO FOR BOT
00116        *   RM+53   35   CAPSTAN PULSE MARKER NO FOR EOT
00117        *   RM+54   36   REEL PULSE DECREMENTER, TAKE UP
00118        *   RM+55   37   REEL PULSE DECREMENTER, SUPPLY
00119        *   RM+56   38   HI ORDER COMMAND ADDRESS
00120        *   RM+57   39   LO ORDER COMMAND ADDRESS
00121        *   RM+58   3A   THUMBWHEEL DIGIT SELECT CODE
00122        *   RM+59   3B   WORKING REGISTER FOR RM+21&RM+44
00123        *   RM+60   3C   RECORD FLAG
00124        *   RM+61   3D   RECORD FLASHER COUNTER
00125        *   RM+62   3E   CONDX ROUTINE COUNTER
00126        *   RM+63   3F   FLAG,ATOB
00127        *   RM+64   40   FLAG NEW COMMAND
00128        *   RM+65   41   FLAG PUL
00129        *   RM+66   42   ALARM FLAG
00130        *   RM+67   43   READY DELAY
00131        *   RM+68   44   REMOTE FLAG
00132        *   RM+69   45   DRIVE ROLLER DROP DELAY
00133        *   RM+70   46   SPEED CHANGE LOCKOUT
00134        *   RM+71   47   ATOB NEAR FLAG
00135        *   RM+72   48   ATOB SPEED CHANGE FLAG
00136        *   RM+73   49   CONDITION CODE REGISTER STORAGE LOCATION
00137        *   RM+74   4A   ATOB SPEED
00138        *   RM+75   4B   RECORD PREP DELAY
00139        *   RM+76   4C   X HI
00140        *   RM+77   4D   X LO
00141        *   RM+78   4E
00142        *   RM+79   4F
```

LIST 4

DG16              MOTOROLA M68SAM CROSS-ASSMBLER           PAGE  5
                                                          DATE- MAR 14,'78

```
00144 0000                    ORG    $00        RESERVE 80 RANDOM MEMORY
00145 0000 0050    RM         RMB    $50        LOCATIONS FOR SCRATCH PAD USE

00147                *                          START OF PROGRAM
00148 8400                    ORG    $8400      ROM START ADDRESS
00149 8400 0F      START      SEI
00150                *           SET UP PIAS 00152 8401 7F 4005            CLR    P1AC       ALLOWS ACCESS TO D.D.R.
00153 8404 7F 4007            CLR    P1BC       ALLOWS ACCESS TO D.D.R.
00154 8407 7F 4009            CLR    P2AC       ALLOWS ACCESS TO D.D.R.
00155 840A 7F 400B            CLR    P2BC       ALLOWS ACCESS TO D.D.R.
00156 840D 7F 4011            CLR    P3AC       ALLOWS ACCESS TO D.D.R.
00157 8410 7F 4013            CLR    P3BC       ALLOWS ACCESS TO D.D.R.
00158 8413 86 FF              LDA A  #$FF
00159 8415 B7 400A            STA A  P2BD       DATA LINES SET AS OUTPUT TO CONTROL P
00160 8418 B7 4010            STA A  P3AD       DATA LINES SET AS OUTPUT TO RECORDER
00161 841B 86 OF              LDA A  #$OF       SETS B0 TO B3 AS SPEED OUTPUTS TO REC
00162 841D B7 4012            STA A  P3BD       AND B4 TO B7 AS INPUTS FROM REMOTE CO
00163 8420 B7 4006            STA A  P1BD
00164 8423 7F 4004            CLR    P1AD       DATA LINES SET AS INPUTS FROM MACHINE
00165 8426 7F 4008            CLR    P2AD       DATA LINES SET AS INPUTS FROM CONTROL
00166 8429 86 05              LDA A  #$05
00167 842B B7 4005            STA A  P1AC       ALLOWS NEG GG INT ON CA1 MASKS CA2
00168 842E B7 4007            STA A  P1BC       ALLOWS NEG GG INT ON CB1 MASKS CB2
00169 8431 B7 4013            STA A  P3BC       ALLOWS NEG GG INT ON CB1 MASKS CB2
00170 8434 4A                 DEC A             MASKS CA1, CB1, CAI, CB2.
00171 8435 B7 4011            STA A  P3AC
00172 8438 86 OD              LDA A  #$OD
00173 843A B7 4009            STA A  P2AC       ALLOWS NEG GG INT ON CA1 OR CA2.
00174 843D 86 34              LDA A  #$34       MASKS CB1 KEEPS CB2 LOW ALLOWS SIGS
00175 843F B7 400B            STA A  P2BC       FROM MICROPROCESSOR TO GO TO RECORDER
00176 8442 7F 4010            CLR    P3AD       REMOVES ANY COMMANDS TO RECORDER 00178 8445 86 03              LDA A  #$03
00179 8447 B7 4040            STA A  ACIS       MASTER RESET FOR ACIA
00180 844A 86 AA              LDA A  #$AA
00181 844C B7 4040            STA A  ACIS       ACIA RIE,TIE,7 BITS, EVEN PARITY
00182                *                          1 STOP BIT DIVIDE CLOCK BY 64

00184                *                          ERASE RAM FROM $15 TO $7F.

00186 844F CE 007F  STRT      LDX    #$7F
00187 8452 6F 00              CLR    ,X
```

LIST 5

```
DG16                MOTOROLA M68SAM CROSS-ASSMBLER           PAGE  6
                                                             DATE- MAR 14,'78

00188 8454 09                  DEX
00189 8455 8C 0000             CPX     #$000C    FOR MEM SAVE USE $14
00190 8458 26 FB               BNE     STRT+3
00191 845A 73 0015             COM     $15
00192 845D 8E 007F             LDS     #$7F      STACK EXTENDS FROM $7F DOWN. IF TOO
00193              *                             MUCH IS LOADED INTO STACK, RAM
00194              *                             LOCATIONS 4F AND LOWER WILL HAVE
00195              *                             THEIR CONTENTS CHANGED.

00197              *CLEARS ALL INDICATORS AND SETS MACHINE IN THREAD MODE.

00199 8460 BD 8B8C             JSR     CLIN
00200 8463 86 53               LDA A   #$53      READY OFF CODE
00201 8465 97 28               STA A   RM+40     READY INDICATOR LOCATION
00202 8467 86 55               LDA A   #$55      ALARM OFF CODE.
00203 8469 97 29               STA A   RM+41     ALARM INDICATOR LOCATION.

00205              *OBTAIN SPEED FROM RM+20 AND SEND IT TO THE
00206              *MACHINE AND CONTROL PANEL INDICATORS.

00208 846B 96 14               LDA A   RM+20     TAPE SPEED VALUE.
00209 846D 81 04                CMP A   #$04      CHECK IF VALID SPEED IS PRESENT
00210 846F 2B 04                BMI     INV       IF SPEED GT 240 IPS GO TO INV
00211 8471 81 0D                CMP A   #$0D
00212 8473 2B 02                BMI     INV+2     IF SPEED BTW 15/32 AND 240 IPS
00213 8475 86 09        INV    LDA A   #$09      INVALID SPEED, LOAD 7.5 IPS
00214 8477 B7 4012             STA A   P2BD      SPEED COMMAND TO MACHINE
00215 847A 97 14               STA A   RM+20
00216 847C BD 8A06             JSR     DFCHEX
00217 847F 0E                  CLI               CLEAR INTERUPT MASK 00219 8480 7E 8777             JMP     FTOUT     MAIN LINE PROGRAM

00221              *COMMAND ROUTINE. THIS SECTION OF THE PROGRAM DETERMINES THE
00222              *ADDRESS OF THE INSTRUCTION REQUIRED BY THE COMMAND THAT WAS
00223              *RECEIVED DURING THE INTERRUPT.

00225 8483 7F 0044  CMD1       CLR     RM+68     REMOTE FLAG
00226 8486 B6 4008             LDA A   P2AD      GET COMMAND
00227 8489 84 3F               AND A   #$3F
```

LIST 6

| | | | | | | |
|---|---|---|---|---|---|---|
| DG16 | | | MOTOROLA M68SAM CROSS-ASSMBLER | | | PAGE 7 |
| | | | | | | DATE- MAR 14, '78 |

```
C0228 848B 0E              CLI              CLEAR INTERRUPT MASK
C0229 848C 81 3F            CMP  A  #$3F
C0230 848E 2A 04            BPL    *+6
C0231 8490 81 10            CMP  A  #$10    IS NR GTE $10
C0232 8492 2A 01            BPL    CMD2     IF NR GTE $10
C0233 8494 3B               RTI             NO
C0234 8495 81 19    CMD2    CMP  A  #$19
C0235 8497 2B 48            BMI    CMD3     IF NR=$1C TO $18
C0236 8499 27 37            BEQ    FTRST    IF NR=$19
C0237 849B 81 1A            CMP  A  #$1A
C0238 849D 27 3F            BEQ    THDRDY   IF NR=$1A
C0239 849F 81 1F            CMP  A  #$1F
C0240 84A1 2B 7C            BMI    CANDR    IF NR=$1B TO $1F
C0241 84A3 81 24            CMP  A  #$24
C0242 84A5 2B 2A            BMI    DIS      IF NR=$20 TO $23
C0243 84A7 81 2E            CMP  A  #$2E
C0244 84A9 2B 1A            BMI    SPEED    IF NR=$24 TO $2D
C0245 84AB 81 30            CMP  A  #$30
C0246 84AD 2A 01            BPL    PLBAD    IF NR GTE $30
C0247 84AF 3B               RTI
C0248 84B0 81 35    PLBAD   CMP  A  #$35
C0249 84B2 2B 0E            BMI    LDT      IF NR=$30 TO $34
C0250 84B4 81 37            CMP  A  #$37
C0251 84B6 2A 01            BPL    PDIS     IF NR GTE $37
C0252 84B8 3B               RTI
C0253 84B9 81 3B    PDIS    CMP  A  #$3B
C0254 84BB 2B 14            BMI    DIS      IF NR =37 TO 3A
C0255 84BD 81 3F            CMP  A  #$3F
C0256 84BF 2B 01            BMI    LDT      IF NR=3B TO 3F
C0257 84C1 3B               RTI
C0258 84C2 7E 85A5  LDT     JMP    LDTW

C0260                       *SPEED SELECT ROUTINE

C0262 84C5 84 0F    SPEED   AND  A  #$0F
C0263 84C7 97 14            STA  A  RM+20
C0264 84C9 7D 0046          TST    RM+70    SPEED CHANGE LOCKOUT
C0265 84CC 26 03            BNE    DIS      BRANCHES IF SPEED IS LOCKED OUT.
C0266 84CE B7 4012          STA  A  P3BD
C0267 84D1 3B       DIS     RTI
C0268                       *
C0269                       *
C0270                       *RESET FOOTAGE COUNTER.
C0271                       *
C0272                       *
C0273 84D2 4F       FTRST   CLR  A
C0274 84D3 97 01            STA  A  $1
C0275 84D5 97 02            STA  A  $2
C0276 84D7 97 03            STA  A  $3
C0277 84D9 97 04            STA  A  $4
```

LIST 7

DG16  MOTOROLA M68SAM CROSS-ASSMBLER  PAGE  8
DATE- MAR 14, '79

```
00278 84DB 97 05           STA A    $5
00279 84DD 3B              RTI 00281 84DE 7E 8CC5  THDRDY JMP      THDRDX    JUMP TO THREAD OR READY 00283 84E1 81 15    CMD3   CMP A    #$15      IS THIS A RECORD COMMAND
00284 84E3 27 1A           BEQ      TPMV      BRA IF RECORD
00285 84E5 81 10           CMP A    #$10      IS THIS A STOP CMD
00286 84E7 27 47           BEQ      CMD4      BRA IF STOP CMD
00287 84E9 F6 4004          LDA B    P1AD      NOT A STOP CMD
00288 84EC C4 10           AND B    #$10      IS TAPE TENSIONED
00289 84EE 26 01           BNE      *+3       BRA IF TENSIONED
00290 84F0 3B              RTI                NOT TENSIONED
00291 84F1 81 13           CMP A    #$13      IS THIS A FWD CMD
00292 84F3 27 C4           BEQ      *+6       BRA IF A FWD CMD
00293 84F5 81 14           CMP A    #$14      IS THIS A REV CMD
00294 84F7 26 37           BNE      CMD4      BRA IF NOT A REV CMD
00295 84F9 C6 FF           LDA B    #$FF      IT WAS A FWD OR REV CMD
00296 84FB D7 4B           STA B    $4B       STORE RECORD PREP DELAY
00297 84FD 20 31           BRA      CMD4
00298 84FF 7D 004B  TPMV   TST      $4B       TEST RECORD PREP DELAY
00299 8502 26 08           BNE      *+10      RECORD PREP DELAY OK
00300 8504 F6 4004         LDA B    P1AD      REC PREP DELAY RAN OUT
00301 8507 C5 01           BIT B    #$01      IS TAPE MOVING
00302 8509 27 25           BEQ      CMD4      TAPE IS NOT MOVING
00303 850B 3B              RTI                TAPE IS MOVING
00304 850C D6 39           LDA B    $39       GET PREVIOUS COMMAND
00305 850E C1 4C           CMP B    #$4C      WAS PREVIOUS CMD FWD
00306 8510 27 05           BEQ      *+7       BRA IF CMD WAS FWD
00307 8512 C1 50           CMP B    #$50      WAS PREVIOUS CMD REV
00308 8514 27 05           BEQ      *+7       BRA IF CMD WAS REV
00309 8516 3B              RTI                CMD WAS NOT FWD OR REV
00310 8517 86 11           LDA A    #$11      LOAD FWD REC CMD
00311 8519 20 15           BRA      CMD4
00312 851B 86 12           LDA A    #$12      LOAD REV REC CMD
00313 851D 20 11           BRA      CMD4
00314                      *
00315                      *
00316                      *EOT, SHUTTLE, TAPE SYNC ENABLE AND SEARCH.
00317                      *
00318                      *
00319 851F 81 1B    CENDR  CMP A    #$1B
00320 8521 27 29           BEQ      EOTBOT    IF=1B GO TO EOTBOT
00321 8523 81 1C           CMP A    #$1C
00322 8525 27 29           BEQ      SHUTTL
00323 8527 81 1D           CMP A    #$1D
00324 8529 27 29           BEQ      TSEN
00325 852B 81 1E           CMP A    #$1E
00326 852D 27 29           BEQ      SEARCH
00327 852F 3B              RTI
```

LIST 8

```
00328 8530 48            CMD4    ASL A
00329 8531 48                    ASL A
00330 8532 97 39                 STA A   RM+57    LO ORDER INDEX ADDRESS
00331 8534 86 85                 LDA A   #$85
00332 8536 97 38                 STA A   RM+56    HI ORDER INDEX ADDRESS
00333 8538 97 40                 STA A   RM+64    NEW COMMAND FLAG
00334 853A 5F                    CLR B
00335 853B D7 3F                 STA B   $3F
00336 853D D7 47                 STA B   $47
00337 853F D7 48                 STA B   $48
00338 8541 D7 4A                 STA B   $4A
00339 8543 BD 8B6C                JSR    CLIN     CLEAR INDICATOR LOCATIONS
00340 8546 D6 14                 LDA B   RM+20    RESTORES INDICATED TAPE SPEED
00341 8548 F7 4012               STA B   P3BD
00342 854B 3B                    RTI
00343                    *
00344                    *CHANGE INFO IN CONDX REGISTER AND COMMANDS TO MACHINE
00345                    *
00346 854C 86 01         EOTBOT  LDA A   #$01
00347 854E 20 0A                 BRA     XORA     CHANGE ZERO BIT
00348 8550 86 02         SHUTTL  LDA A   #$02
00349 8552 20 06                 BRA     XORA     CHANGE ONE BIT
00350 8554 86 04         TSEN    LDA A   #$04
00351 8556 20 02                 BRA     XORA     CHANGE TWO BIT
00352 8558 86 08         SEARCH  LDA A   #$08
00353 855A 98 15         XORA    EOR A   RM+21
00354 855C 97 15                 STA A   RM+21
00355 855E F6 4010               LDA B   P3AD     GET DATA GG TO MACHINE
00356 8561 C4 0F                 AND B   #$0F
00357 8563 C1 01                 CMP B   #$01     FWD
00358 8565 27 0D                 BEQ     CTS
00359 8567 C1 03                 CMP B   #$03     REV
00360 8569 27 09                 BEQ     CTS
00361 856B C1 09                 CMP B   #$09     FF
00362 856D 27 17                 BEQ     FSK
00363 856F C1 0B                 CMP B   #$0B     FR
00364 8571 27 13                 BEQ     FSK
00365 8573 3B                    RTI              NONE OF THE ABOVE
00366 8574 84 04         CTS     AND A   #$04     TSEN
00367 8576 27 07                 BEQ     TSFR
00368 8578 86 20                 LDA A   #$20     NOT ON
00369 857A BA 4010               ORA A   P3AD     OR WITH PRESENT COMMAND
00370 857D 20 22                 BRA     SEND
00371 857F 86 53         TSFR    LDA A   #$53     TSEN IS ON
00372 8581 B4 4010               AND A   P3AD     AND WITH PRESENT COMMAND
00373 8584 20 1B                 BRA     SEND
00374 8586 C6 3B         FSK     LDA B   #$3B
00375 8588 F4 4010               AND B   P3AD     REMOVE BITS 6 OR 7
00376 858B 84 08                 AND A   #$08     SEARCH
00377 858D 27 0A                 BEQ     SPFT
00378 858F 96 14                 LDA A   RM+20
00379 8591 B7 4012               STA A   P3BD
00380 8594 CA 80                 ORA B   #$80     SEARCH OFF ADD BIT 7
00381 8596 17                    TBA
```

LIST 9

```
00382 8597 20 08            BRA    SEND
00383 8599 86 04    SRFT    LDA A  #$04
00384 859B B7 4012          STA A  P3BD
00385 859E CA 40            ORA B  #$40      SEARCH ON ADD BIT 6
00386 85A0 17               TBA
00387 85A1 B7 4010  SEND    STA A  P3AD      CHANGE MACHINE COMMAND
00388 85A4 3B               RTI
00389                *
00390                *
00391                *LOAD INFO FROM THUMBWHEEL SWITCH
00392                *
00393                *
00394 85A5 91 2D    LDTW    CMP A  RM+45
00395 85A7 27 26            BEQ    RET
00396 85A9 97 2D            STA A  RM+45
00397 85AB 81 34            CMP A  #$34
00398 85AD 27 21            BEQ    LDTWA      IF=34 LOAD FOOTAGE VALUE
00399 85AF 81 32            CMP A  #$32
00400 85B1 27 22            BEQ    LDTWA+5    IF=32 LOAD BOD VALUE.
00401 85B3 81 33            CMP A  #$33
00402 85B5 27 23            BEQ    LDTWA+10   IF=33 LOAD EOD VALUE.
00403 85B7 81 30            CMP A  #$30
00404 85B9 27 24            BEQ    LDTWA+15   IF=30 LOAD BOT VALUE.
00405 85BB 81 31            CMP A  #$31
00406 85BD 27 25            BEQ    LDTWA+20   IF=31 LOAD EOT VALUE.
00407 85BF 81 3B            CMP A  #$3B
00408 85C1 27 26            BEQ    LDTWA+25   IF = 3B LOAD USER CMD AT BOD
00409 85C3 81 3C            CMP A  #$3C
00410 85C5 27 27            BEQ    LDTWA+30   IF = 3C LOAD USER CMD AT EOD.
00411 85C7 81 3D            CMP A  #$3D
00412 85C9 27 28            BEQ    LDTWA+35   IF = 3D LOAD USER CMD AT BOT
00413 85CB 81 3E            CMP A  #$3E
00414 85CD 27 29            BEQ    LDTWA+40   IF = 3E LOAD USER CMD AT EOT.
00415 85CF 3B       RET     RTI
00416 85D0 CE 0005  LDTWA   LDX    #$05       LOAD FOOTAGE ADDRESS.
00417 85D3 20 2E            BRA    LDTW5
00418 85D5 CE 000A          LDX    #$0A       LOAD BOD ADDRESS.
00419 85D8 20 29            BRA    LDTW5
00420 85DA CE 000F          LDX    #$0F       LOAD EOD ADDRESS.
00421 85DD 20 24            BRA    LDTW5
00422 85DF CE 0011          LDX    #$11       LOAD BOT ADDRESS.
00423 85E2 20 1B            BRA    LDTW2
00424 85E4 CE 0013          LDX    #$13       LOAD EOT ADDRESS.
00425 85E7 20 16            BRA    LDTW2
00426 85E9 CE 0016          LDX    #$16       LOAD UC AT BOD ADDRESS.
00427 85EC 20 0D            BRA    LDTW1
00428 85EE CE 0017          LDX    #$17       LOAD UC AT EOD ADDRESS.
00429 85F1 20 08            BRA    LDTW1
00430 85F3 CE 0018          LDX    #$18       LOAD UC AT BOT ADDRESS.
00431 85F6 20 03            BRA    LDTW1
00432 85F8 CE 0019          LDX    #$19       LOAD UC AT EOT ADDRESS.
00433 85FB 86 71    LDTW1   LDA A  #$71       LOAD SINGLE DIGIT COMMAND
00434 85FD 20 06            BRA    LDTWJ
00435 85FF 86 72    LDTW2   LDA A  #$72       LOAD TWO DIGIT NUMBER
```

```
00436 8601 20 02              BRA     LDTWJ
00437 8603 86 75    LDTW5     LDA A   #$75        LOAD 5 DIGIT NUMBER.
00438 8605 97 3A    LDTWJ     STA A   RM+58       ADDRESS SELECTED DIGIT OF
00439                 *                           THUMBWHEEL SWITCH.
00440 8607 BD 8851            JSR     DISP
00441 860A 7D 0044            TST     RM+68       REMOTE FLAG
00442 860D 27 0B              BEQ     LOCAL
00443 860F B6 4012            LDA A   P3BD        READ SELECTED DIGIT OF REMOTE
00444 8612 84 F0              AND A   #$F0        THUMBWHEEL SWITCH
00445 8614 44                 LSR A
00446 8615 44                 LSR A
00447 8616 44                 LSR A
00448 8617 44                 LSR A
00449 8618 20 05              BRA     LOCAL+5
00450 861A B6 4008  LOCAL     LDA A   P2AD        READ SELECTED DIGIT OF LOCAL
00451 861D 84 3F              AND A   #$3F        THUMBWHEEL SWITCH.
00452 861F A7 00              STA A   ,X          PLACE DIGIT IN STORAGE.
00453 8621 09                 DEX                 DECREMENT STORAGE ADDRESS.
00454 8622 96 3A              LDA A   RM+58
00455 8624 4A                 DEC A               DECREMENT THUMBWHEEL ADDRESS.
00456 8625 81 71              CMP A   #$71
00457 8627 2A DC              BPL     LDTWJ       IF GTE 71 REPEAT PASS.
00458 8629 BD 8AC6            JSR     DECHEX
00459 862C 3B                 RTI 00461 862D DE 38    CMD5      LDX     RM+56       LOAD COMMAND ADDRESS
00462 862F 6E F1              JMP     $F1,X       GO TO COMMAND ADDRESS.
00463 8631                    ORG     $8631       COMMAND POINTER BEGINNING ADDRESS
00464 8631 7E 8654            JMP     STOP
00465 8634 02                 NOP
00466 8635 7E 8ACC            JMP     RECFWD
00467 8638 02                 NOP
00468 8639 7E 8AEC            JMP     RECREV
00469 863C 02                 NOP
00470 863D 7E 867A            JMP     FWD
00471 8640 02                 NOP
00472 8641 7E 8699            JMP     REV
00473 8644 02                 NOP
00474 8645 7E 8AB3            JMP     REC
00475 8648 02                 NOP
00476 8649 7E 8BCE            JMP     FF
00477 864C 02                 NOP
00478 864D 7E 869A            JMP     FR
00479 8650 02                 NOP
00480 8651 7E 8B9E            JMP     ATOB
00481                 *
00482                 *
00483                 *STOP COMMAND ROUTINE.
00484                 *
00485                 *
00486 8654 86 40    STOP      LDA A   #$40        STOP INDI CODE
00487 8656 97 1F              STA A   $1F         CODE LOCATION
```

LIST 11

DG16  MOTOROLA M68SAM CROSS-ASSMBLER           PAGE 12
                                                DATE- MAR 14, '78

```
00488 8658 BD 8851        JSR   DISP      DISPLAY STOP
00489 865B B6 4004 STOP2  LDA A P1AD      GET MACHINE STATUS
00490 865E 16             TAB
00491 865F 84 EB          AND A #$EB      ARE READY AND OR RECORD ONLY ONES O!
00492 8661 26 12          BNE   STOP5     BRA IF NOT
00493 8663 C4 10          AND B #$10      IS READY ON
00494 8665 27 04          BEQ   STOP3     BRA IF NOT
00495 8667 86 1C          LDA A #$1C      YES. LOAD READY COMMAND
00496 8669 20 01          BRA   STOP4
00497 866B 4F      STOP3  CLR A           NO. LOAD THREAD COMMAND
00498 866C B7 4010 STOP4  STA A P3AD
00499 866F 7F 002E        CLR   RM+46
00500 8672 7E 8777        JMP   FTOUT
00501 8675 BD 86F8 STOP5  JSR   STOP1     OTHER COMMANDS ARE PRESENT
00502 8678 20 F5          BRA   STOP4+3
00503                *
00504                *
00505                *FORWARD COMMAND ROUTINE.
00506                *
00507                *
00508 867A 86 42   FWD    LDA A #$42      FWD INDI CODE
00509 867C 97 20          STA A $20       CODE LOCATION
00510 867E BD 8851        JSR   DISP      DISPLAY FWD
00511 8681 BD 8D45        JSR   LOOK
00512 8684 27 05          BEQ   FWD1
00513 8686 8D 70          BSR   STOP1     YES SO STOP TAPE
00514 8688 BD 8B35        JSR   FSTRT     TO FORWARD START
00515 868B 96 15   FWD1   LDA A $15       NO. IS TSEN ON
00516 868D 84 04          AND A #$04
00517 868F 27 04          BEQ   FWD2
00518 8691 86 71          LDA A #$71      YES. LOAD FWD AND TSEN
00519 8693 20 02          BRA   FWD2+2
00520 8695 86 51   FWD2   LDA A #$51      NO. LOAD FWD ONLY
00521 8697 20 45          BRA   SENDM     SEND CODE TO MACHINE
00522                *
00523                *
00524                *REVERSE COMMAND ROUTINE.
00525                *
00526                *
00527 8699 86 44   REV    LDA A #$44      REV INDI CODE
00528 869B 97 21          STA A $21       CODE LOCATION
00529 869D BD 8851        JSR   DISP      DISPLAY REV
00530 86A0 B6 4004        LDA A P1AD      GET MACHINE STATUS
00531 86A3 84 02          AND A #$02      IS REVERSE ON
00532 86A5 26 05          BNE   REV1
00533 86A7 8D 4F          BSR   STOP1     NO. STOP TAPE
00534 86A9 BD 8B39        JSR   RSTRT     TO REVERSE START
00535 86AC 96 15   REV1   LDA A $15       YES IS TSEN ON
00536 86AE 84 04          AND A #$04
00537 86B0 27 04          BEQ   REV2
00538 86B2 86 73          LDA A #$73      YES. LOAD REV AND TSEN
00539 86B4 20 02          BRA   REV2+2
00540 86B6 86 53   REV2   LDA A #$53      NO. LOAD REV ONLY
00541 86B8 20 24          BRA   SENDM     SEND CODE TO MACHINE
```

LIST 12

```
00542                *
00543                *
00544                *FAST REVERSE ROUTINE
00545                *
00546                *
00547 86BA 86 48  FR      LDA A  #$48      FR INDI CODE
00548 86BC 97 23          STA A  $23       CODE LOCATION
00549 86BE BD 8851         JSR    DISP      DISPLAY FAST REVERSE
00550 86C1 B6 4004         LDA A  P1AD      GET MACHINE STATUS
00551 86C4 84 02           AND A  #$02      IS REVERSE ON
00552 86C6 26 05           BNE    FR1
00553 86C8 8D 2E           BSR    STOF1     NO. STOP TAPE
00554 86CA BD 8B39         JSR    RSTRT     TO REVERSE START
00555 86CD 96 15  FR1     LDA A  RM+21     YES. GET SEARCH FLAG
00556 86CF 84 08           AND A  #$08      IS SEARCH ON
00557 86D1 27 04           BEQ    FR2
00558 86D3 86 BB           LDA A  #$BB      NO. LOAD FAST REVERSE
00559 86D5 20 07           BRA    SENDM
00560 86D7 86 04  FR2     LDA A  #$04
00561 86D9 B7 4012         STA A  P3BD
00562 86DC 86 7B           LDA A  #$7B
00563 86DE B7 4010 SENDM  STA A  P3AD      SEND CODE TO MACHINE
00564 86E1 B6 4004 SENDM2 LDA A  P1AD
00565 86E4 16             TAB
00566 86E5 84 01           AND A  #$01      IS MOTION ON
00567 86E7 26 09           BNE    SENDM1
00568 86E9 C4 04           AND B  #$04      NO. IS RECORD ON
00569 86EB 26 05           BNE    SENDM1
00570 86ED BD 8777         JSR    FTOUT     YES
00571 86F0 20 EF           BRA    SENDM2    CHECK MOTION AGAIN
00572 86F2 7F 002E SENDM1 CLR    RM+46     CLEAR PENDING COMMAND FLAG
00573 86F5 7E 8777         JMP    FTOUT     RETURN TO FTOUT

00575                *STOP1 ROUTINE
00576                *
00577                *
00578 86F8 B6 4010 STOP1  LDA A  P3AD      GET CMD FM MACHINE
00579 86FB 97 41           STA A  RM+65     STORE PUL FLAG
00580 86FD F6 4004         LDA B  P1AD      GET INFO FROM MACHINE
00581 8700 C4 01           AND B  #$01
00582 8702 27 48           BEQ    STOP9+8   BRANCH IF NO TAPE MOTION
00583 8704 84 53           AND A  #$53      DROP FAST, REC, TS, AND DRF
00584 8706 8A 40           ORA A  #$40      ADD DRC
00585 8708 B7 4010         STA A  P3AD      SEND CMD TO MACHINE
00586 870B 97 46           STA A  RM+70     SPEED CHANGE LOCKOUT
00587 870D 86 0D           LDA A  #$0D      15/32 IPS
00588 870F B7 4012         STA A  P3BD      SPEED TO MACHINE
00589 8712 BD 8C2E STOP6  JSR    DPIN      DELAY BEFOR LOOK FOR PHASE LOCK
00590 8715 B6 4004         LDA A  P1AD      GET MACHINE STATUS
00591 8718 16             TAB
00592 8719 C4 01           AND B  #$01      CHECK TAPE MOTION
00593 871B 27 2F           BEQ    STOP9+8   BRANCH IF NO TAPE MOTION
```

DG16  MOTOROLA M68SAM CROSS-ASSMBLER   PAGE 14
                                      DATE- MAR 14,'78

```
00594 871D 84 08            AND A   #$08        LOOK AT PHASE LOCK
00595 871F 26 09            BNE     STOP7       IF ON GO TO STOP7
00596 8721 8D 54            BSR     FTOUT       ADDITIONAL DELAY
00597 8723 B6 4004          LDA A   P1AD        GET MACHINE STATUS
00598 8726 84 08            AND A   #$08        LOOK AT PHASE LOCK
00599 8728 27 E8            BEQ     STOP6       IF OFF RETURN TO STOP6
00600 872A B6 4010 STOP7    LDA A   P3AD        GET CMD FM MACHINE
00601 872D 84 13            AND A   #$13        DROP DRC
00602 872F B7 4010          STA A   P3AD        DROP DRIVE ROLLERS
00603 8732 86 05            LDA A   #$05        DRIVE ROLLER DROP DELAY
00604 8734 97 45            STA A   RM+69       STORE ABOVE
00605 8736 BD 8C2E STOP8    JSR     DPIN        DELAY
00606 8739 BD 8777          JSR     FTOUT       DELAY
00607 873C 7A 0045          DEC     RM+69       DECREMENT DELAY COUNTER
00608 873F 7D 0045          TST     RM+69       DOES RM+69=0
00609 8742 26 F2            BNE     STOP8       IF NOT GO TO STOP8
00610 8744 B6 4010 STOP9    LDA A   P3AD        GET MACHINE COMMANDS
00611 8747 84 10            AND A   #$10        DROP OF AND REV IF ON
00612 8749 B7 4010          STA A   P3AD        SEND COMMANDS TO MACHINE
00613 874C B6 4004          LDA A   P1AD        GET MACHINE STATUS
00614 874F 84 2F            AND A   #$2F        CHECK ALL EXCEPT TAPE TENSION
00615 8751 26 F1            BNE     STOP9       GO TO STOP9 IF ANY ON
00616 8753 86 05            LDA A   #$05        TAPE MOTION AND REVERSE DROP DELAY
00617 8755 97 45            STA A   RM+69       STORE ABOVE
00618 8757 BD 8C2E DL       JSR     DPIN        FOR DELAY
00619 875A BD 8777          JSR     FTOUT       FOR DELAY
00620 875D 7A 0045          DEC     RM+69       DECREMENT DELAY COUNTER
00621 8760 7D 0045          TST     RM+69       TEST FOR ZERO
00622 8763 26 F2            BNE     DL          BRA IF NOT ZERO
00623 8765 7F 0041          CLR     RM+65       CLEAR FULL FLAG
00624 8768 7F 0046          CLR     RM+70       CLEAR SPEED CHANGE LOCKOUT
00625 876B 96 14            LDA A   RM+20       GET INDICATED SPEED
00626 876D B7 4012          STA A   P3BD        SEND SPEED TO MACHINE
00627 8770 86 03            LDA A   #$03
00628 8772 97 36            STA A   RM+54
00629 8774 97 37            STA A   RM+55
00630 8776 39               RTS
00631             *
00632             *
00633             *THIS PART OF THE PROGRAM CONTROLS THE 5 DIGIT 7 SEGMENT
00634             *DISPLAY. IT IS NORMALLY INTERRUPTED BY OTHER PROGRAMS.
00635             *
00636             *
00637 8777 CE 0005 FTOUT    LDX     #$05        TAPE FOOTAGE INFORMATION TO DISPLAY
00638 877A 7E 8853          JMP     OUT5
00639 877D 86 57  OUT1      LDA A   #$57        BLANK TENK DIGIT
00640 877F BD 8851          JSR     DISP
00641 8782 86 3F            LDA A   #$3F        BLANK THOU DIGIT
00642 8784 BD 8851          JSR     DISP
00643 8787 86 2F            LDA A   #$2F        BLANK HUND DIGIT
00644 8789 BD 8851          JSR     DISP
00645 878C 86 1F            LDA A   #$1F        BLANK TENS DIGIT
00646 878E BD 8851          JSR     DISP
00647 8791 A6 00            LDA A   ,X          DISPLAY UNIT DIGIT
```

LIST 14

```
00648 8793 BD 8851           JSR    DISP
00649 8796 20 1F             BRA    DP          DISPLAY OTHER FUNCTIONS
00650 8798 86 57      OUT2   LDA A  #$57        BLANK TENK DIGIT
00651 879A BD 8851           JSR    DISP
00652 879D 86 3F             LDA A  #$3F        BLANK THOU DIGIT.
00653 879F BD 8851           JSR    DISP
00654 87A2 86 2F             LDA A  #$2F        BLANK HUND DIGIT.
00655 87A4 BD 8851           JSR    DISP
00656 87A7 A6 00             LDA A  ,X          GET TENS DIGIT.
00657 87A9 27 08             BEQ    BLNK        BLANK IF = 0
00658 87AB 8A 10             ORA A  #$10        DISPLAY IF NOT = 0.
00659 87AD BD 8851    OUT3   JSR    DISP
00660 87B0 7F 88A4           JMP    OUT8        WILL HANDLE UNITS DIGIT.
00661 87B3 86 1F      BLNK   LDA A  #$1F        BLANK TENS DIGIT.
00662 87B5 20 F6             BRA    OUT3        RETURN FOR UNIT DIGIT.
00663 87B7 96 40      DP     LDA A  RM+64       IS NEW COMMAND FLAG ON
00664 87B9 27 3E             BEQ    PCF         IF NOT BRANCH TO PCF
00665 87BB 7F 0040           CLR    RM+64       NEW COMMAND FLAG IS ON
00666 87BE 96 2E             LDA A  RM+46       IS PENDING COMMAND FLAG ON
00667 87C0 27 CC             BEQ    SETPCF      BRA IF NOT ON
00668 87C2 32              PUL A
00669 87C3 32              PUL A
00670 87C4 7D 0041           TST    RM+65       IS FULL FLAG ON
00671 87C7 27 05             BEQ    SETPCF      BRA IF NOT ON
00672 87C9 32              PUL A
00673 87CA 32              PUL A             REMOVE STOP1 RTS
00674 87CB 7F 0041           CLR    RM+65
00675 87CE 86 0F      SETPCF LDA A  #$0F        SET PENDING COMMAND FLAG
00676 87D0 97 2E             STA A  RM+46       PENDING COMMAND FLAG
00677 87D2 86 03             LDA A  #$03
00678 87D4 97 36             STA A  $36         ABOVE TO TAKE UP REEL DECREMENTER
00679 87D6 97 37             STA A  $37         ABOVE TO SUPPLY REEL DECREMENTER
00680 87D8 7E 862D           JMP    CMD5        ACT ON NEW COMMAND
00681 87DB CE 0011   BOTOUT  LDX    #$11        BEGINNING OF TAPE POINT TO DISPLAY
00682 87DE 20 B8             BRA    OUT2
00683 87E0 CE 0013   EOTOUT  LDX    #$13        END OF TAPE POINT TO DISPLAY
00684 87E3 20 B3             BRA    OUT2
00685 87E5 CE 0016   UCBDO   LDX    #$16        USER COMMAND AT BEGINNING OF DATA TO
00686 87E8 20 93             BRA    OUT1        DISPLAY.
00687 87EA CE 0017   UCEDO   LDX    #$17        USER COMMAND AT END OF DATA TO
00688 87ED 20 8E             BRA    OUT1        DISPLAY.
00689 87EF CE 0018   UCBTO   LDX    #$18        USER COMMAND AT BEGINNING OF TAPE TO
00690 87F2 20 89             BRA    OUT1        DISPLAY.
00691 87F4 CE 0019   UCETO   LDX    #$19        USER COMMAND AT END OF TAPE TO DISP.
00692 87F7 20 84             BRA    OUT1
00693 87F9 96 2E      PCF    LDA A  RM+46       IS PENDING COMMAND FLAG ON
00694 87FB 27 01             BEQ    DP1
00695 87FD 39                RTS                PCF IS ON. ACT ON PENDING COMMAND.
00696 87FE BD 8C49   DP1     JSR    SHUTCK
00697 8801 BD 8A3B           JSR    CKMC
00698 8804 BD 8C2E           JSR    DPIN
00699 8807 7F 002D           CLR    RM+45       LAST COMMAND FROM CONTROL PANEL
00700 880A 96 3F             LDA A  RM+63       ADV TO BOD FLAG
00701 880C 27 03             BEQ    DP2
```

DG16    MOTOROLA M68SAM CROSS-ASSMBLER    PAGE 16
DATE- MAR 14, '78

```
00702 880E 7E 8BA7          JMP    CKAA       CHECK PROGRESS OF ADV TO BOD
00703 8811 7D 0044 DP2       TST    RM+68      REMOTE FLAG
00704 8814 27 13             BEQ    LOCALD
00705 8816 B6 4012           LDA A  P3BD       CHECK IF DISPLAY COMMAND OTHER THAN
00706 8819 84 F0             AND A  #$F0       FOOTAGE IS PRESENT FROM REMOTE
00707 881B F6 4008           LDA B  P2AD       GET BITS 4 & 5 FROM REMOTE
00708 881E C4 C0             AND B  #$C0       MASK OTHER BITS
00709 8820 54                LSR B             SHIFT RIGHT 2 TIMES
00710 8821 54                LSR B
00711 8822 44                LSR A
00712 8823 44                LSR A             SHIFT RIGHT 4 TIMES
00713 8824 44                LSR A
00714 8825 44                LSR A
00715 8826 1B                ABA
00716 8827 20 05             BRA    LOCALD+5
00717 8829 B6 4008 LOCALD    LDA A  P2AD       CHECK IF DISPLAY COMMAND OTHER
00718 882C 84 3F             AND A  #$3F       THAN FOOTAGE IS PRESENT.
00719 882E 81 20             CMP A  #$20
00720 8830 27 A9             BEQ    BOTOUT     IF = '0' BOT DISPLAY COMMAND PRESENT
00721 8832 81 21             CMP A  #$21
00722 8834 27 AA             BEQ    EOTOUT     IF = '0' EOT DISPLAY COMMAND PRESENT
00723 8836 81 22             CMP A  #$22
00724 8838 27 41             BEQ    BODOUT     IF = '0' BOD DISPLAY COMMAND PRESENT
00725 883A 81 23             CMP A  #$23
00726 883C 27 42             BEQ    EODOUT     IF = '0' EOD DISPLAY COMMAND PRESENT
00727 883E 81 37             CMP A  #$37
00728 8840 27 A3             BEQ    UCBDO      IF = '0' USER COMMAND AT BOD PRESENT
00729 8842 81 38             CMP A  #$38
00730 8844 27 A4             BEQ    UCEDO      IF = '0' USER COMMAND AT EOD PRESENT
00731 8846 81 39             CMP A  #$39
00732 8848 27 A5             BEQ    UCBTO      IF = '0' USER COMMAND AT BOT PRESENT
00733 884A 81 3A             CMP A  #$3A
00734 884C 27 A6             BEQ    UCETO      IF = '0' USER COMMAND AT EOT PRESENT
00735 884E 7E 8777           JMP    FTOUT      NONE PRESENT GO TO FTOUT.

00737                   *       DISPLAY ROUTINE 00739 8851 C6 FF    DISP     LDA B  #$FF
00740 8853 F7 400A           STA B  P2BD       RESETS CONTROL PANEL RECEIVER
00741 8856 8D 06             BSR    DELAY
00742 8858 B7 400A           STA A  P2BD       CODE TO CONTROL PANEL RECEIVER.
00743 885B 8D 01             BSR    DELAY
00744 885D 39                RTS
00745                   *
00746                   *DELAY ROUTINE
00747                   *DELAY = 20(B)SQ+54(B)+39 IN MICROSECONDS
00748                   *
00749 885E C6 03    DELAY    LDA B  #$03       DELAY = 381 MICROSECONDS
00750 8860 D7 30             STA B  RM+48      HI ORDER BYTE
00751 8862 D7 31             STA B  RM+49      LO ORDER BYTE
```

LIST 16

DG16          MOTOROLA M68SAM CROSS-ASSMBLER          PAGE 17
                                                     DATE- MAR 14,'78

```
00752 8864 7D 0031 MORE    TST    RM+49
00753 8867 27 05           BEQ    RM48
00754 8869 7A 0031         DEC    RM+49
00755 886C 20 F6           BRA    MORE
00756 886E D7 31   RM48    STA B  RM+49
00757 8870 7D 0030         TST    RM+48
00758 8873 27 05           BEQ    EXIT
00759 8875 7A 0030         DEC    RM+48
00760 8878 20 EA           BRA    MORE
00761 887A 39      EXIT    RTS
```

00763                      *DISPLAY BEGINNING OF DATA POINT*

```
00765 887B CE 000A BODOUT LDX   #$0A       BIGINNING OF DATA POINT TO DISPLAY
00766 887E 20 03          BRA   OUT5
00767 8880 CE 000F EODOUT LDX   #$0F       END OF DATA POINT TO DISPLAY
00768 8883 A6 0C   OUT5   LDA A ,X         GET TENK DIGIT
00769 8885 97 2A          STA A RM+42      STORE FOR LEADING ZERO BLANKING.
00770 8887 27 31          BEQ   BLNK5      BLANK IF = 0.
00771 8889 86 56          LDA A #$56       LOAD TO DISPLAY 1 IN TENK.
00772 888B 8D C4   OUT4   BSR   DISP
00773 888D C6 30          LDA B #$30       THOU DIGIT INDICATER.
00774 888F D7 2B          STA B RM+43      STORE DIGIT INDICATER.
00775 8891 09     OUT7    DEX
00776 8892 A6 00          LDA A ,X         GET NEXT LOWER DIGIT
00777 8894 27 28          BEQ   BLNK3      CHECK FOR BLANKING IF = 0.
00778 8896 97 2A          STA A RM+42      STORE FOR LEADING ZERO BLANKING
00779 8898 9A 2B   OUT6   ORA A RM+43      COMBINE DIGIT AND POSITION INDICATER.
00780 889A 8D 55          BSR   DISP
00781 889C D6 2B          LDA B RM+43      GET POSITION INDICATER.
00782 889E C0 10          SUB B #$10       DECREMENT POSITION INDICATER.
00783 88A0 D7 2B          STA B RM+43      STORE NEW POSITION INDICATOR
00784 88A2 26 ED          BNE   OUT7       IF NOT = 0 GET NEXT DIGIT.
00785 88A4 09     OUT8    DEX              IF = 0 GET AND DISPLAY UNITS DIGIT.
00786 88A5 A6 00          LDA A ,X         GET UNITS DIGIT.
00787 88A7 8D A8          BSR   DISP       DISPLAY UNITS DIGIT.
00788 88A9 7D 004B        TST   $004B      TEST REC PREP DELAY
00789 88AC 27 03          BEQ   *+5        BRA IF = 0
00790 88AE 7A 004B        DEC   $004B      DEC IF NOT = 0
00791 88B1 BD 8D1A        JSR   ALARM      CHECK IF ALARM IS PRESENT
00792 88B4 BD 8D65        JSR   IP         * CHECK FOR ANY SPECIAL COMMANDS
00793 88B7 7E 8787        JMP   DP
00794 88BA 86 57   BLNK5  LDA A #$57       LOAD WITH BLANK TENK.
00795 88BC 20 CD          BRA   OUT4       RETURN TO DISPLAY BLANK IN TENK.
00796 88BE 7D 002A BLNK3  TST   RM+42      TEST FOR PRIOR DIGITS 1 THRU 9.
00797 88C1 26 D5          BNE   OUT6       IF NOT = 0 PRIOR DIGITS HAD A 1 TO 9.
00798 88C3 86 CF          LDA A #$CF       PRIOR DIGITS WERE ALL ZERO. BLANK.
00799 88C5 20 D1          BRA   OUT6       RETURN TO BLANK CURRENT DIGIT.
00800                     *
00801                     *
```

LIST 17

```
                    *THIS PART OF THE PROGRAM DETERMINES THE ORIGIN OF AN
                    *INTERRUPT REQUEST AND TRANSFERS PROGRAM CONTROL TO THE
                    *APPROIATE SUBROUTINE.
                    *
                    *
00807 88C7 B6 4005  POLL  LDA A  P1AC      IF MINUS, CAPSTAN PULSE INTERRUPT
00808 88CA 2B 16          BMI    CNT1
00809 88CC B6 4007        LDA A  P1BC      IF MINUS, SUPPLY REEL INTERRUPT.
00810 88CF 2B 78          BMI    EOT1
00811 88D1 B6 4009        LDA A  P2AC      IF MINUS, TAKE UP REEL INTERRUPT.
00812 88D4 2B 48          BMI    BOT
00813 88D6 48             ASL A            IF MINUS LOCAL COMMAND INTERRUPT.
00814 88D7 2B 6D          BMI    CMD0
00815 88D9 B6 4013        LDA A  P3BC      IF MINUS REMOTE COMMAND INTERRUPT.
00816 88DC 2B 01          BMI    CMDR
00817 88DE 3B             RTI
00818 88DF 7E 8D01 CMDR   JMP    CMDR1

00820               *THIS PART OF THE PROGRAM HANDLES THE FOOTAGE COUNTING JOB.

00822 88E2 B6 4004 CNT1   LDA A  P1AD      CLEARS INTERRUPT REQUEST
00823 88E5 C6 FF          LDA B  #$FF
00824 88E7 D1 33          CMP B  RM+51     $FF - CAPSTAN PULSES
00825 88E9 27 03          BEQ    CNT1+12   BRANCH IF CAPSTAN PULSES =$FF
00826 88EB 7C 0033        INC    RM+51
00827 88EE CE 00C0        LDX    #$0       ADDRESSES FOOTAGE PREDIGITS
00828 88F1 84 02          AND A  #$02      CHECKS TO SEE IF TAPE IS MOVING IN
00829 88F3 97 32          STA A  RM+50     REVERSE. IF = ZERO MOTION IS FORWARD.
00830 88F5 27 2A          BEQ    CNTUP
00831 88F7 A6 00          LDA A  ,X        BEGIN COUNTDOWN ROUTINE FOR REVERSE
00832 88F9 4A             DEC A            TAPE MOTION.
00833 88FA 2E 1F          BGT    PUT       THIS SECTION HANDLES PREDIGITS.
00834 88FC 86 64          LDA A  #$64
00835 88FF 97 2F          STA A  RM+47     SHUTTLE CHECK FLAG
00836 8900 A7 00   CNT2   STA A  ,X        THIS PART HANDLES UNITS THRU THOU
00837 8902 08             INX              ROUTINE DURING COUNTING
00838 8903 A6 00          LDA A  ,X
00839 8905 4A             DEC A
00840 8906 2C 13          BGE    PUT
00841 8908 86 09          LDA A  #$09
00842 890A 8C 0004        CPX    #$04
00843 890D 26 F1          BNE    CNT2
00844 890F A7 00          STA A  ,X        THIS SECTION HANDLES TENK DIGIT.
00845 8911 08             INX
00846 8912 A6 00          LDA A  ,X
00847 8914 4A             DEC A
00848 8915 84 81          AND A  #$81
00849 8917 2C 02          BGE    PUT
00850 8919 86 01          LDA A  #$01
00851 891B A7 00   PUT    STA A  ,X
```

LIST 18

```
DG16                MOTOROLA M68SAM CROSS-ASSMBLER           PAGE 19
                                                             DATE- MAR 14,'78

00852 891D 3B          PUT1    RTI
00853 891E 7E 89B4     BOT     JMP     BOT1
00854 8921 A6 00       CNTUP   LDA A   ,X           THIS PART OF PROGRAM HANDLES COUNT
00855 8923 4C                  INC A                FORWARD IN MANNER TO COUNTDOWN.
00856 8924 81 64               CMP A   #$64
00857 8926 2B F3               BMI     PUT
00858 8928 97 2F               STA A   RM+47        SHUTTLE CHECK FLAG
00859 892A 6F 00       CNT3    CLR     ,X
00860 892C 08                  INX
00861 892D A6 00               LDA A   ,X
00862 892F 4C                  INC A
00863 8930 81 0A               CMP A   #$0A
00864 8932 2B E7               BMI     PUT
00865 8934 8C 00C4              CPX    #$04
00866 8937 26 F1               BNE     CNT3
00867 8939 6F 00               CLR     ,X
00868 893B 08                  INX
00869 893C A6 00               LDA A   ,X
00870 893E 4C                  INC A
00871 893F 81 02               CMP A   #$02
00872 8941 2B D8               BMI     PUT
00873 8943 6F 00               CLR     ,X
00874 8945 3B                  RTI
00875 8946 7E 8483    CMDO     JMP     CMD1

00877                  *END OF TAPE ROUTINE
00878                  *0=STOP 1=FAST REV 2=REV 3=REC 4-9=SPARES 00880 8949 B6 4006     BOT1    LDA A   P1BD         CLEARS INTERRUPT.
00881 894C 7D 0032             TST     RM+50        CHECK IF IN FWD
00882 894F 26 35               BNE     ECODE+3      BRA IF NOT FWD
00883 8951 7A 0037             DEC     RM+55        DEC SUPPLY REFL PULSE
00884 8954 26 4D               BNE     CLR511       BRA IF RM+55 NOT = TO ZERO
00885 8956 86 03               LDA A   #$03
00886 8958 97 37               STA A   RM+55        3 LOADED IN SUPPLY REEL PULSE COUNTER
00887 895A 96 33               LDA A   RM+51        # OF CAPSTAN PULSES
00888 895C D6 15               LDA B   RM+21        EOT ON = EVEN, OFF = ODD
00889 895E C4 01               AND B   #$01         LOOK AT LSBIT
00890 8960 26 2D               BNE     EOTOFF       BRA IF = 1
00891 8962 91 35               CMP A   RM+53        CAPSTAN PULSES - MARKER #
00892 8964 24 3D               BCC     CLR511       BRA IF CAP PULSES GT MARKER #
00893 8966 96 19               LDA A   RM+25        CHECK USER COMMAND FLAG AT BOT
00894 8968 26 04               BNE     UCFR         IF=0 STOP REQD
00895 896A 86 40               LDA A   #$40         STOP COMMAND
00896 896C 20 39               BRA     LDFC         LOAD COMMAND
00897 896E 4A          UCFR    DEC A
00898 896F 26 04               BNE     UCREV        IF + FAST REV NOT REQD
00899 8971 86 5C               LDA A   #$5C         FAST REV COMMAND
00900 8973 20 32               BRA     LDFC
00901 8975 4A          UCREV   DEC A
```

```
DG16              MOTOROLA M68SAM CROSS-ASSMBLER         PAGE 20
                                                         DATE- MAR 14,'78

00902 8976 26 04              BNE     UCRCRV    IF + REV NOT REQD
00903 8978 86 50              LDA A   #$50      REV COMMAND
00904 897A 20 2B              BRA     LDFC
00905 897C 4A       UCRCRV    DEC A
00906 897D 26 04              BNE     ECODE
00907 897F 86 48              LDA A   #$48      REC REV COMMAND
00908 8981 20 24              BRA     LDFC
00909 8983 7E 8D53  ECODE     JMP     EK
00910 8986 7E 8D56            JMP     EK+3
00911 8989 7E 8D59            JMP     EK+6
00912 898C 7E 8D5C            JMP     EK+9

00914                 *IF EOT OFF AND FAST FWD IS ON SPEED IS CHANGED
00915                 *TO 120IPS BEFORE TAPE RUNS OFF THE REEL 00917 898F F6 4010  EOTOFF    LDA B   P3AD
00918 8992 C4 08              AND B   #$08      IS FAST ON
00919 8994 27 10              BEQ     RT
00920 8996 81 80              CMP A   #$80      CAPSTAN PULSES=80
00921 8998 24 09              BCC     CLR511
00922 899A 86 05              LDA A   #$05      120 IPS CODE
00923 899C B7 4012            STA A   P3BD      SEND 120 CODE TO MACHINE
00924 899F 86 4C              LDA A   #$4C      FWD CODE
00925 89A1 20 04              BRA     LDFC
00926 89A3 7F 0033  CLR511    CLR     RM+51     SET CAPSTAN COUNT TO ZERO
00927 89A6 3B       RT        RTI               RETURN FROM INTERRUPT
00928 89A7 97 39    LDFC      STA A   RM+57     LO ORDER COMMAND ADDRESS
00929 89A9 86 85              LDA A   #$85
00930 89AB 97 38              STA A   RM+56     HI ORDER COMMAND ADDRESS
00931 89AD 97 40              STA A   RM+64     NEW COMMAND FLAG
00932 89AF BD 8B8C            JSR     CLIN      CLEAR INDICATOR LOCATIONS
00933 89B2 20 EF              BRA     CLR511

00935                 *BEGINNING OF TAPE ROUTINE SIMULIAR TO END OF TAPE ROUTINE.
00936                 *CODES 0=STOP 1=FAST FWD 2=FWD 3=REC FWD 4-9=SPARES 00938 89B4 B6 4008  BOT1      LDA A   P2AD      CLEARS INT REQUEST LINE.
00939 89B7 7D 0032            TST     RM+50     CHECK IF IN REVERSE
00940 89BA 27 D0              BEQ     ECODE+9   BRA IF NOT REVERSE
00941 89BC 7A 0036            DEC     RM+54     DEC TAKEUP REEL PULSE
00942 89BF 26 E2              BNE     CLR511    BRA IF RM+54 NOT = TO ZERO
00943 89C1 86 03              LDA A   #$03
00944 89C3 97 36              STA A   RM+54     3 LOADED IN TAKEUP REEL PULSE COUNTER
00945 89C5 96 33              LDA A   RM+51     GET # OF CAPSTAN PULSES
00946 89C7 D6 15              LDA B   RM+21     EOT ON = EVEN, OFF = ODD
00947 89C9 C4 01              AND B   #$01      LOOK AT LSBIT
```

LIST 20

```
00948 89CB 26 21              BNE      BOTOFF    BRA IF = 1
00949 89CD 91 34              CMP A    RM+52     CAPSTAN PULSES - MARKER #
00950 89CF 24 D2              BCC      CLR511    BRA IF CAPSTAN PULSES GT MARKER #
00951 89D1 96 18              LDA A    RM+24     CHECK USER COMMAND A EOT
00952 89D3 26 04              BNE      UCFF      IF=0 STOP REQD
00953 89D5 86 40              LDA A    #$40      STOP COMMAND
00954 89D7 20 CE              BRA      LDFC      LOAD COMMAND
00955 89D9 4A         UCFF    DEC A
00956 89DA 26 04              BNE      UCFWD     IF + FAST FWD NOT REQD
00957 89DC 86 58              LDA A    #$58      FAST FWD COMMAND
00958 89DE 20 C7              BRA      LDFC
00959 89E0 4A         UCFWD   DEC A
00960 89E1 26 04              BNE      UCRCFW    IF + FWD NOT REQD
00961 89E3 86 4C              LDA A    #$4C      FWD COMMAND
00962 89E5 20 C0              BRA      LDFC
00963 89E7 4A         UCRCFW  DEC A
00964 89E8 26 9F              BNE      ECODE+6
00965 89EA 86 44              LDA A    #$44      REC FWD COMMAND
00966 89EC 20 B9              BRA      LDFC

00968                         *IF EOT OFF AND FAST REV ON SPEED IS CHANGED
00969                         *TO 120IPS BEFORE TAPE RUNS OFF THE REEL.
00970 89EE F6 4010  BOTOFF    LDA B    P3AD
00971 89F1 C4 08              AND B    #$08      IS FAST ON
00972 89F3 26 01              BNE      BOTOFF+8
00973 89F5 3B                 RTI
00974 89F6 81 80              CMP A    #$80      CAPSTAN PULSES=80
00975 89F8 25 03              BCS      BOTOFF+15 BRA IF CAPSTAN PULSES LT MARKER #
00976 89FA 7E 89A3             JMP      CLR511    JMP IF CAPSTAN PULSES GT MARKER NO
00977 89FD 86 05              LDA A    #$05      120 IPS CODE
00978 89FF B7 4012            STA A    P3BD      SEND TO MACHINE
00979 8A02 86 50              LDA A    #$50      LOAD REVERSE CODE
00980 8AC4 20 A1              BRA      LDFC

00982                         *THIS PART OF THE PROGRAM CONVERTS THE DECIMAL NUMBERS IN
00983                         *RM+16 AND RM+17 TO HEX THEN ADDS HEX 78 AND STORES THE
00984                         *RESULT IN RM+52 FOR THE BOT MARKER. SIMULARLY RM+18 AND
00985                         *AND RM+19 ARE CHANGED AND PLACED IN RM+53 FOR THE EOT.
00986                         *MARKER 00988 8AC6 CE 0010  DECHEX    LDX      #16       ADDRESS OF BOT UNITS.
00989 8AC9 A6 00              LDA A    ,X        1ST PASS BOT UNIT 2ND PASS EOT UNIT.
00990 8ACB 84 0F              AND A    #$0F
00991 8ACD A7 00              STA A    ,X
00992 8ACF A6 01              LDA A    1,X       ADDRESS BOT TENS 1ST PASS, EOT TENS
00993 8A11 48               ASL A               2ND PASS. SHIFT LEAST SIGNIFICANT 4
00994 8A12 48               ASL A               BITS LEFT 4 TIMES TO MOST SIGINIFI-
00995 8A13 48               ASL A               CANT POSITIONS.
```

```
00996 8A14 48              ASL A
00997 8A15 AA 00            ORA A  ,X         NUMBERS NOW IN PACKED BCD FORM.
00998 8A17 0C               CLC               CLEAR CARRY BIT
00999 8A18 16               TAB
01000 8A19 C0 0A            SUB B  #$0A       IS NUMBER LESS THAN 9
01001 8A1B 25 06            BCS    ADJ+6
01002 8A1D 80 06     ADJ    SUB A  #$06       NO, NOT LESS THAN 9.
01003 8A1F C0 10            SUB B  #$10
01004 8A21 24 FA            BCC    ADJ
01005 8A23 8B 80            ADD A  #$80
01006 8A25 8C 0010          CPX    #16        YES, LESS THAN 9
                                              IS THIS BET NUMBER
01007 8A28 26 06            BNE    ST53
01008 8A2A 97 34            STA A  RM+52      YES WAS BET NUMBER.
01009 8A2C 08               INX               ADVANCE INDEX REGISTER
01010 8A2D 08               INX               TO GET EOT UNITS AND TENS.
01011 8A2E 20 D9            BRA    DFCHEX+3
01012 8A30 97 35     ST53   STA A  RM+53      NO, WAS EOT NUMBER.
01013 8A32 86 70            LDA A  #$70       ENABLES PUSHBUTTONS.
01014 8A34 BD 8851          JSR    DISP
01015 8A37 39               RTS
01016                  *
01017                  *
01018                  *CHECK MACHINE SIGNALS FOR CHANGES.
01019                  *
01020                  *
01021 8A38 B6 4004   CKMC   LDA A  P1AD
01022 8A3B 16               TAB
01023 8A3C 84 10            AND A  #$10       IS TAPE TENSIONED.
01024 8A3E 27 41            BEQ    CLRMC      IF=0 NO.
01025 8A40 17        CLRMC2 TBA               YES.
01026 8A41 81 10            CMP A  #$10       IS TAPE TENSIONED THE ONLY SIGNAL.
01027 8A43 27 04            BEQ    ST1        IF=0 YES.
01028 8A45 81 14            CMP A  #$14       ARE TT AND RECORD THE ONLY SIGNALS.
01029 8A47 26 C9            BNE    TS         IF=0 YES.
01030 8A49 96 40     ST1    LDA A  RM+64
01031 8A4B 26 1A            BNE    RT1
01032 8A4D 96 2E            LDA A  RM+46      CHECK PCF
01033 8A4F 26 16            BNE    RT1
01034 8A51 17               TBA
01035 8A52 84 20     TS     AND A  #$20       IS MACHINE IN TAPE SYNC.
01036 8A54 26 3C            BNE    TSYN       IF = 20 YES.
01037 8A56 86 4F            LDA A  #$4F       NO, TAPE SYNC OFF CODE.
01038 8A58 97 26            STA A  RM+38      TAPE SYNC INDICATOR LOCATION
01039 8A5A 17        TSYN1  TBA
01040 8A5B 84 08            AND A  #$08       IS MACHINE IN PHASE LOCK.
01041 8A5D 27 39            BEQ    NOPSLK     IF=0 NO.
01042 8A5F 86 5C            LDA A  #$5C       YES, PHASE LOCK ON CODE.
01043 8A61 97 27            STA A  RM+39      PHASE LOCK INDICATOR LOCATION.
01044 8A63 96 3C            LDA A  RM+60      IS RECORD FLAG ON.
01045 8A65 26 01            BNE    RT1+1
01046 8A67 39        RT1    RTS               NO
01047 8A68 17               TBA               YES.
01048 8A69 84 02            AND A  #$02       IS REVERSE ON.
01049 8A6B 26 0D            BNE    RCRV       IF=02 YES.
```

LIST 22

DG16                    MOTOROLA M68SAM CROSS-ASSMBLER                 PAGE 23
                                                                       DATE- MAR 14,'78

```
01050 8A6D 86 75              LDA A   #$75       NO. FORWARD RECORD CODE.
01051 8A6F B7 4010            STA A   P3AD       SEND CODE TO RECORDER.
01052 8A72 86 4A    CONT1     LDA A   #$4A       RECORD ON CODE.
01053 8A74 97 24              STA A   RM+36      RECORD INDICATOR LOCATION.
01054 8A76 7F 003C            CLR     RM+60      TURN OFF RECORD FLAG.
01055 8A79 39                 RTS
01056 8A7A 86 77    RCRV      LDA A   #$77       REVERSE RECORD CODE.
01057 8A7C B7 4010            STA A   P3AD
01058 8A7F 20 F1              BRA     CONT1
01059 8A81 96 3C    CLRMC     LDA A   RM+60      IS REC FLAG ON
01060 8A83 27 02              BEQ     CP3AD      IF NOT ON
01061 8A85 20 39              BRA     CLRMC2
01062 8A87 7F 4010  CP3AD     CLR     P3AD       TAPE IS NOT TENSIONED
01063 8A8A BD 8B5C            JSR     CLIN
01064 8A8D 86 53              LDA A   #$53       READY OFF CODE.
01065 8A8F 97 28              STA A   RM+40      READY INDICATOR LOCATION.
01066 8A91 39                 RTS
01067 8A92 86 4E    TSYN      LDA A   #$4E       TAPE SYNC ON CODE.
01068 8A94 97 26              STA A   RM+38      TAPE SYNC INDICATOR LOCATION.
01069 8A96 20 C2              BRA     TSYN1
01070 8A98 86 51    NOPSLK    LDA A   #$51       PHASE LOCK NOT ON CODE
01071 8A9A 97 27              STA A   RM+39      PHASE LOCK INDICATOR LOCATION.
01072 8A9C 96 3C              LDA A   RM+60      IS RECORD FLAG ON.
01073 8A9E 26 01              BNE     RCFON
01074 8AA0 39                 RTS
01075 8AA1 96 3D    RCFON     LDA A   RM+61      REC FLAG ON, PHASE LOCK OFF.
01076 8AA3 80 10              SUB A   #$10
01077 8AA5 97 3D              STA A   RM+61
01078 8AA7 84 F0              AND A   #$F0
01079 8AA9 27 01              BEQ     RCFL
01080 8AAB 39                 RTS
01081 8AAC 96 24    RCFL      LDA A   RM+36      FLASH RECORD LAMP, GET CONTENTS OF
01082 8AAE 88 01              EOR A   #$01       RECORD INDI LOCATION, AND CHANGE ITS
01083 8AB0 97 24              STA A   RM+36      STATE AND RETURN TO STORAGE.
01084 8AB2 39                 RTS
01085                         *
01086                         *
01087                         *RECORD ROUTINE
01088                         *
01089                         *
01090 8AB3 86 4B    REC       LDA A   #$4B       REC INDI CODE
01091 8AB5 97 24              STA A   $24        CODE LOCATION
01092 8AB7 97 3C              STA A   RM+60      SET REC FLAG
01093 8AB9 BD 8B5!            JSR     DISP       DISPLAY RECORD
01094 8ABC B6 4004            LDA A   P1AD       GET MACHINE STATUS
01095 8ABF 84 10              AND A   #$10
01096 8AC1 27 04              BEQ     REC1       IS TAPE TENSIONED
01097 8AC3 86 14              LDA A   #$14       YES. LOAD TT AND REC
01098 8AC5 20 02              BRA     REC1+2
01099 8AC7 86 04    REC1      LDA A   #$04       NO. LOAD REC ONLY
01100 8AC9 7E 860E            JMP     SENDM      SEND CODE TO MACHINE
```

LIST 23

DG16                MOTOROLA M68SAM CROSS-ASSMBLER            PAGE 24
                                                              DATE- MAR 14,'78

01102                    *RECORD FORWARD ROUTINE.

```
01104 8ACC 86 4A    RECFWD  LDA A   #$4A    REC INDI CODE
01105 8ACE 97 24            STA A   $24     CODE LOCATION
01106 8AD0 97 3C            STA A   RM+60   SET REC FLAG
01107 8AD2 BD 8851          JSR     DISP    DISPLAY RECORD
01108 8AD5 86 42            LDA A   #$42    FWD INDI CODE
01109 8AD7 97 20            STA A   $20     CODE LOCATION
01110 8AD9 BD 8851          JSR     DISP    DISPLAY FWD
01111 8ADC BD 8D45          JSR     LOOK
01112 8ADF 27 06            BEQ     RF1
01113 8AE1 BD 86F8          JSR     STOP1   YES STOP TAPE
01114 8AE4 BD 8B35          JSR     FSTRT   TO FORWARD START
01115 8AE7 86 51    RF1     LDA A   #$51    LOAD FORWARD COMMAND
01116 8AE9 7E 86DE          JMP     SENDM   SEND CODE TO MACHINE

01118                    *RECORD REVERSE ROUTINE.
01119                    *
01120                    *
01121 8AEC 86 4A    RECREV  LDA A   #$4A    REC INDI CODE
01122 8AEE 97 24            STA A   $24     CODE LOCATION
01123 8AF0 97 3C            STA A   RM+60   SET REC FLAG
01124 8AF2 BD 8851          JSR     DISP    DISPLAY RECORD
01125 8AF5 86 44            LDA A   #$44    REV INDI CODE
01126 8AF7 97 21            STA A   $21     CODE LOCATION
01127 8AF9 BD 8851          JSR     DISP    DISPLAY REVERSE
01128 8AFC B6 4004          LDA A   P1AD    GET MACHINE STATUS
01129 8AFF 84 02            AND A   #$02    IS REVERSE ON
01130 8BC1 26 06            BNE     RR1
01131 8BC3 BD 86F8          JSR     STOP1   NO. STOP TAPE
01132 8BC6 BD 8B39          JSR     RSTRT   TO REVERSE START
01133 8BC9 86 53    RR1     LDA A   #$53    YES. LOAD REVERSE CODE
01134 8BCB 7E 86DE          JMP     SENDM   SEND CODE TO MACHINE
01135                    *
01136                    *
01137                    *FAST FORWARD ROUTINE.
01138                    *
01139                    *
01140 8BCE 86 46    FF      LDA A   #$46    FF INDI CODE
01141 8B10 97 22            STA A   $22     CODE LOCATION
01142 8B12 BD 8851          JSR     DISP    DISPLAY FF.
01143 8B15 BD 8D45          JSR     LOOK
01144 8B18 27 C6            BEQ     FF1
01145 8B1A BD 86F8          JSR     STOP1   YES STOP TAPE
01146 8B1D BD 8B35          JSR     FSTRT   TO FORWARD START
01147 8B20 96 15    FF1     LDA A   RM+21   NO. GET SEARCH FLAG
01148 8B22 84 08            AND A   #$08    IS SEARCH ON
01149 8B24 27 05            BEQ     FF2
01150 8B26 86 59            LDA A   #$39    NO. LOAD FAST FORWARD
01151 8B28 7E 86DE          JMP     SENDM
```

LIST 24

```
01152 8B2B 86 04      FF2     LDA A   #$04
01153 8B2D B7 4012            STA A   P3BD
01154 8B30 86 79              LDA A   #$79            YES. LOAD SEARCH FAST FWD
01155 8B32 7E 86DE            JMP     SENDM           SEND CODE TO MACHINE
01156                 *
01157                 *
01158                 *SLOW START ROUTINE
01159                 *
01160                 *
01161 8B35 86 11      FSTRT   LDA A   #$11            FORWARD NO ROLLER
01162 8B37 20 02              BRA     RSTRT+2
01163 8B39 86 13      RSTRT   LDA A   #$13            REVERSE NO ROLLER
01164 8B3B C6 0D              LDA B   #$0D            15/32 IPS
01165 8B3D 97 46              STA A   RM+70           SPEED CHANGE LOCKOUT
01166 8B3F F7 4012            STA B   P3BD            SPEED TO MACHINE
01167 8B42 B7 4010            STA A   P3AD            COMMAND TO MACHINE
01168 8B45 F6 4004            LDA B   P1AD            GET MACHINE STATUS
01169 8B48 C4 08              AND B   #$08            CHECK PHASE LCK
01170 8B4A 27 F6              BEQ     RSTRT+9         NO PHASE LOCK
01171 8B4C B6 4010            LDA A   P3AD            GET CMD TO MACHINE
01172 8B4F 8A 40              ORA A   #$40            ACTIVATE ROLLER
01173 8B51 B7 4010            STA A   P3AD            SEND CMD TO MACHINE
01174 8B54 96 4A              LDA A   RM+74           A TO B SPEED
01175 8B56 26 09              BNE     R+1
01176 8B58 96 14              LDA A   RM+20
01177 8B5A B7 4012            STA A   P3BD            TO MACHINE
01178 8B5D 7F 0046            CLR     RM+70           CLEAR SPEED CHANGE LOCKOUT
01179 8B6C 39        R        RTS
01180 8B61 B7 4012            STA A   P3BD            A TO B SPEED TO MACHINE
01181 8B64 20 FA              BRA     R
01182                 *
01183                 *
01184                 *OBTAIN DATA FROM RM+21 AND SET UP INDICATORS.
01185                 *
01186                 *
01187 8B66 C6 04      CONDX   LDA B   #$04            COUNTER ALLOWS 4 PASSES THRU LOOP.
01188 8B68 96 15              LDA A   RM+21
01189 8B6A 97 3B              STA A   RM+59
01190 8B6C 86 58              LDA A   #$58            CODE FOR ON INDICATION.
01191 8B6E 97 2C      CDXRD   STA A   RM+44
01192 8B70 7C 002C            INC     RM+44           CODE FOR OFF INDICATION.
01193 8B73 76 003B            ROR     RM+59           PLACE LSB OF WORD IN CARRY.
01194 8B76 D7 3E              STA B   RM+62
01195 8B78 25 0A              BCS     OUTF            IF CARRY SET FUNCTION IS OFF.
01196 8B7A BD 8851            JSR     DISP            CARRY NOT SET FUNCTION IS ON.
01197 8B7D 4C                 INC A                   INCREASE PREVIOUS VALUE
01198 8B7E 4C        CDXRC    INC A                   OF A BY TWO.
01199 8B7F D6 3E              LDA B   RM+62
01200 8B81 5A                 DEC B                   REDUCE PREVIOUS VALUE OF B BY ONE.
01201 8B82 26 EA              BNE     CDXRD           IF NOT = 0 RETURN TO CDXRD.
01202 8B84 39                 RTS
01203 8B85 96 2C      OUTF    LDA A   RM+44           FUNCTION IS OFF.
01204 8B87 BD 8851            JSR     DISP            SEND FUNCTION CODE TO DISPLAY
01205 8B8A 20 F2              BRA     CDXRC           RETURN TO CDXRC.
```

DG16                MOTOROLA M68S  CROSS-ASSMBLER           P  .E 26
                                                            DATE- MAR 14,078

```
01206          *
01207          *
01208 8B8C 86 41    CLIN    LDA A   #$41        CLEAR ALL INDICATOR MEMORY
C1209 8B8E CE 001F          LDX     #31         LOCATIONS (RM+31 THRU RM+39) AND
C1210 8B91 A7 00            STA A   ,X          INDICATORS.
C1211 8B93 4C               INC A
C1212 8B94 4C               INC A
C1213 8B95 08               INX
C1214 8B96 81 53            CMP A   #$53
C1215 8B98 26 F7            BNE     CLIN+5
01216 8B9A 7F 003C          CLR     RM+60
01217 8B9D 39               RTS
01218          *
01219          *
01220          *    ADVANCE TO BEGINNING OF DATA ROUTINE
C1221          *
C1222          *
C1223 8B9E 86 4C    ATOB    LDA A   #$4C        ADV TO ROD CODE
01224 8BA0 97 3F            STA A   RM+63       ADV TO BOD FLAG
C1225 8BA2 97 25            STA A   RM+37       INDICATOR LOCATION
C1226 8BA4 BD 8851          JSR     DISP
C1227 8BA7 CE 0005  CKAA    LDX     #$05        SELECT 10K FT DIGIT
01228 8BAA A6 00            LDA A   ,X          FT DIGIT
01229 8BAC A1 05            CMP A   5,X         BOD DIGIT
C1230 8BAE 26 3A            BNE     GRAB        BRANCH IF NO COMPARE
C1231 8BBC 09               DEX
C1232 8BB1 8C 0000          CPX     #$0C        HAS UNITS DIGIT BEEN COMPARED
C1233 8BB4 26 F4            BNE     CKAA+3      RETURN FOR NEXT LOWER DIGIT
C1234 8BB6 86 0F            LDA A   #$0F
C1235 8BB8 97 47            STA A   $47         SET ATOB NEAR FLAG
01236 8BBA B6 4004          LDA A   P1AD        GET MACHINE STATUS
01237 8BBD 84 01            AND A   #$01        CHECK MOTION
01238 8BBF 27 17            BEQ     STAC        BRANCH IF MOTION OFF
01239 8BC1 86 43            LDA A   #$43        FWD INDI OFF
C1240 8BC3 97 20            STA A   $20         INDICATOR LOCATION
C1241 8BC5 86 45            LDA A   #$45        REV INDI OFF
C1242 8BC7 97 21            STA A   $21         INDICATOR LOCATION
C1243 8BC9 86 47            LDA A   #$47        FF INDI OFF
C1244 8BCB 97 22            STA A   $22         INDICATOR LOCATION
C1245 8BCD 86 49            LDA A   #$49        FR INDI OFF
C1246 8BCF 97 23            STA A   $23         INDICATOR LOCATION
C1247 8BD1 02               NOP
C1248 8BD2 02               NOP
C1249 8BD3 02               NOP
C1250 8BD4 86 40            LDA A   #$40        LOAD STOP COMMAND
01251 8BD6 20 48            BRA     FFAB+6      TO LO ORDER COMMAND ADDRESS
01252 8BD8 4F       STAC    CLR A               CLEAR FLAGS
01253 8BD9 97 3F            STA A   $3F         ATOB FLAG
C1254 8BDB 97 47            STA A   $47         ATOB NEAR FLAG
C1255 8BDD 97 48            STA A   $48         ATOB SPEED CHANGE FLAG
C1256 8BDF 97 4A            STA A   $4A         ATOB SPEED
C1257 8BE1 97 2E            STA A   $2E         PENDING COMMAND FLAG
01258 8BE3 86 4D            LDA A   #$4D        ATOB OFF INDICATOR CODE
01259 8BE5 97 25            STA A   RM+37       INDICATOR LOCATION
```

LIST 26

```
01260 8BE7 7E 8777              JMP    FTOUT
01261 8BEA 07       G0AB        TPA                     CONDITION CODE REGISTER TO A
01262 8BEB 97 49                STA A  $49              STORE CONDITION CODE REGISTER
01263 8BED 7D 0047              TST    RM+71            ATOB NEAR FLAG
01264 8BF0 26 10                BNE    G0AC
01265 8BF2 86 04                LDA A  #$04             2401PS
01266 8BF4 B7 4012              STA A  P3BD             SPEED TO MACHINE
01267 8BF7 97 4A                STA A  $4A              A TO B SPEED
01268 8BF9 96 49                LDA A  RM+73            CCR STORAGE
01269 8BFB 06                   TAP
01270 8BFC 2B 1C                BMI    FFAB             BRANCH IF FT LT BOD
01271 8BFE 86 5C                LDA A  #$5C             FT GT BOD SO FAST REV
01272 8C00 20 1A                BRA    FFAB+2
01273 8C02 96 48   G0AC         LDA A  $48              ATOB SPEED CHANGE INHIBIT FLAG
01274 8C04 26 25                BNE    FFAB+17
01275 8C06 86 0F                LDA A  #$0F
01276 8C08 97 48                STA A  $48              A TO B SPEED CHANGE FLAG
01277 8C0A 7C 004A              INC    $4A              A TO B SPEED
01278 8C0D 96 49                LDA A  RM+73            CCR STORAGE
01279 8C0F 06                   TAP
01280 8C10 2B 04                BMI    FFAB+4           BRA IF FT LT BOD
01281 8C12 86 50                LDA A  #$50             FT GT BOD SO REV
01282 8C14 20 06                BRA    FFAB+2
01283 8C16 86 4C                LDA A  #$4C             FT LT BOD SO FWD
01284 8C18 20 02                BRA    FFAB+2
01285 8C1A 86 58   FFAB         LDA A  #$58             FT LT BOD SO FAST FORWARD
01286 8C1C C6 41                LDA B  #$41             STOP INDICATOR OFF CODE
01287 8C1E D7 1F                STA B  $1F              STOP CODE LOCATION
01288 8C20 97 39                STA A  RM+57            LOW ORDER COMMAND ADDRESS
01289 8C22 86 85                LDA A  #$85             COMMAND POINTER
01290 8C24 97 38                STA A  RM+56            HIGH ORDER COMMAND ADDRESS
01291 8C26 97 40                STA A  RM+64            NEW COMMAND FLAG
01292 8C28 7F 002E              CLR    $2E              CLEAR PCF
01293 8C2B 7E 8777              JMP    FTOUT
01294                           *
01295                           *
01296                           *SEND INFO TO PUSHBUTTON INDICATORS.
01297                           *
01298                           *
01299 8C2E CE 001F  DPIN        LDX    #$1F             ADDRESS OF FIRST INDICATOR.
01300 8C31 A6 00                LDA A  ,X               VALUE IN INDICATOR ADDRESS.
01301 8C33 BD 8851              JSR    DISP
01302 8C36 08                   INX
01303 8C37 8C 002A              CPX    #$2A             ADDRESS OF LAST INDICATOR+1
01304 8C3A 26 F5                BNE    DPIN+3
01305 8C3C BD 8866              JSR    CONDX            CONDX OF SHUTTLE TSFN ETC DISPLAYED
01306 8C3F 96 14                LDA A  RM+20
01307 8C41 84 0F                AND A  #$0F
01308 8C43 8A 60                ORA A  #$60
01309 8C45 BD 8851              JSR    DISP
01310 8C48 39                   RTS
1311                            *
1312                            *
1313                            * SHUTTLE CHECK ROUTINE
```

LIST 27

```
DG16              METORULA M68SAM CROSS-ASSMBLER        PAGE 28
                                                        DATE- MAR 14,'78

C1314                   *
C1315                   *
C1316 8C49 96 2F   SHUTCK LDA A  RM+47      IS SHUTTLE CHECK FLAG SET
C1317 8C4B 26 01          BNE    SHUT       IF = 0 NO.
C1318 8C4D 39             RTS
C1319 8C4E 96 15   SHUT   LDA A  RM+21      YES  IS SHUTTLE MODE ON
C1320 8C50 84 02          AND A  #$02
C1321 8C52 27 04          BEQ    SHUT1
C1322 8C54 7F 002F        CLR    RM+47      NO. CLEARS SHUTTLE CHECK FLAG
C1323 8C57 39             RTS
C1324                   *
C1325                   *
C1326                   * SHUTTLE ROUTINE
C1327                   *
C1328                   *
C1329                   *B0D CODES 0=FWD 1=FF 2=STOP 3=FWD REC 4-9=SPARES
C1330                   *E0D CODES 0=FR 1=STOP 2=REV 3=REV REC 4-9=SPARES
C1331 8C58 CE 0005 SHUT1 LDX    #$05        YES. START COMPARE AT TENK FT DIGIT
C1332 8C5B A6 00          LDA A  ,X
C1333 8C5D A1 0A          CMP A  $A,X       COMPARE FT DIGIT TO E0D DIGIT
C1334 8C5F 26 26          BNE    SHUT2      GO TO B0D COMPARE IF NOT = 0
C1335 8C61 09             DEX
C1336 8C62 8C 0000        CPX    #$00
C1337 8C65 26 F4          BNE    SHUT1+3
C1338 8C67 96 17          LDA A  RM+23      CHECK USER COMMAND AT F0D
C1339 8C69 26 04          BNE    FSTOP
C1340 8C6B 86 5C          LDA A  #$5C       FAST REV COMMAND
C1341 8C6D 20 44          BRA    LDSC
C1342 8C6F 4A      FSTOP  DEC A             NOT FR
C1343 8C70 26 04          BNE    FREV
C1344 8C72 86 40          LDA A  #$40       STOP CODE
C1345 8C74 20 3D          BRA    LDSC
C1346 8C76 4A      FREV   DEC A             NOT STOP
C1347 8C77 26 04          BNE    FRVRC
C1348 8C79 86 50          LDA A  #$50       REV CODE
C1349 8C7B 20 36          BRA    LDSC
C1350 8C7D 4A      FRVRC  DEC A             NOT REV
C1351 8C7E 26 04          BNE    FRVRC+7
C1352 8C80 86 48          LDA A  #$48       REC REV CODE
C1353 8C82 20 2F          BRA    LDSC
C1354 8C84 7E 8D5F        JMP    EK+12      SPARE CODES FOR F0D
C1355 8C87 CE 0005 SHUT2  LDX    #$05       B0D COMPARE
C1356 8C8A A6 00          LDA A  ,X
C1357 8C8C A1 05          CMP A  5,X        COMPARE FT DIGIT TO B0D DIGIT
C1358 8C8E 27 02          BEQ    *+4
C1359 8C90 20 2C          BRA    RST
C1360 8C92 09             DEX               WERE EQUAL
C1361 8C93 8C 0000        CPX    #$00
C1362 8C96 26 F2          BNE    SHUT2+3
C1363 8C98 96 16          LDA A  RM+22      CHECK USER COMMAND AT B0D
C1364 8C9A 26 04          BNE    RFF
C1365 8C9C 86 4C          LDA A  #$4C       FWD COMMAND
C1366 8C9E 20 13          BRA    LDSC
C1367 8CA0 4A      RFF    DEC A             NOT FWD
```

LIST 28

```
DG16              MOTOROLA M68SAM CROSS-ASSMBLER          PAGE 29
                                                          DATE- MAR 14,'78

01368 8CA1 26 04              BNE     RSTBP
01369 8CA3 86 58              LDA A   #$58        FAST FWD CODE
01370 8CA5 20 0C              BRA     LDSC
01371 8CA7 4A      RSTBP      DEC A               NOT FAST FWD
01372 8CA8 26 04              BNE     RFWRC
01373 8CAA 86 40              LDA A   #$40        STOP CODE
01374 8CAC 20 05              BRA     LDSC
01375 8CAE 4A      RFWRC      DEC A               NOT STOP
01376 8CAF 26 11              BNE     RT3         SPARE BCD CODES
01377 8CB1 86 44              LDA A   #$44        FWD REC CODE
01378 8CB3 97 39   LDSC       STA A   RM+57
01379 8CB5 86 85              LDA A   #$85
01380 8CB7 97 38              STA A   RM+56
01381 8CB9 97 40              STA A   RM+64
01382 8CBB BD 8B8C            JSR     CLIN
01383 8CBE 7F 002F  RST       CLR     RM+47
01384 8CC1 39                 RTS
01385 8CC2 7E 8D62  RT3       JMP     EK+15
01386                *
01387                *
01388                *THREAD OR READY
01389                *
01390                *
01391 8CC5 86 4004 THDRDX LDA A  P1AD
01392 8CC8 84 05              AND A   #$05
01393 8CCA 27 01              BEQ     THDY
01394 8CCC 3B                 RTI
01395 8CCD 86 01   THDY       LDA A   #$01
01396 8CCF 98 28              EOR A   RM+40
01397 8CD1 97 28              STA A   RM+40
01398 8CD3 84 C1              AND A   #$01
01399 8CD5 27 08              BEQ     TT
01400 8CD7 7F 4010 TTD        CLR     P3AD
01401 8CDA 86 41              LDA A   #$41        STOP OFF CODE
01402 8CDC 97 1F              STA A   $1F         STORE IT
01403 8CDE 3B                 RTI
01404 8CDF 86 10   TT         LDA A   #$10
01405 8CE1 B7 4010            STA A   P3AD
01406 8CE4 86 06              LDA A   #$06        READY DELAY
01407 8CE6 97 43              STA A   RM+67
01408 8CE8 CE FFFF L          LDX     #$FFFF
01409 8CEB B6 4004 D          LDA A   P1AD
01410 8CEE 84 10              AND A   #$10        IS TAPE TENSIONED
01411 8CF0 27 05              BEQ     D+12        BRANCH IF TAPE NOT TENSIONED
01412 8CF2 86 40              LDA A   #$40        STOP ON CODE
01413 8CF4 97 1F              STA A   $1F         STORE IT
01414 8CF6 3B                 RTI
01415 8CF7 09                 DEX                 D+12
01416 8CF8 26 F1              BNE     D
01417 8CFA 7A 0043            DEC     RM+67
01418 8CFD 26 E9              BNE     L
01419 8CFF 20 D6              BRA     TTD
01420                *
```

LIST 29

```
01422 8D01 F6 4008 CMDR1  LDA B  P2AD
01423 8D04 C4 C0          AND B  #$C0     SAVES BITS 6 AND 7 (4 AND 5 OF REMOTE)
01424 8D06 B6 4012        LDA A  P3BD
01425 8D09 84 F0          AND A  #$F0     SAVES BITS 4 TO 7 (0-3 OF REMOTE).
01426 8DCB 0E             CLI
01427 8DCC 44             LSR A
01428 8DCD 44             LSR A           ASSEMBLES INFO FROM REMOTE.
01429 8DCE 44             LSR A
01430 8DCF 44             LSR A
01431 8D10 54             LSR B
01432 8D11 54             LSR B
01433 8D12 1B             ABA             COMMAND FROM REMOTE ASSEMBLED.
01434 8D13 C6 05          LDA B  #$05
01435 8D15 C7 44          STA B  RM+68    REMOTE COMMAND FLAG.
01436 8D17 7E 848C        JMP    CMD1+9

01438 8D1A B6 4006 ALARM  LDA A  $4006    SCAN ALARM LINES
01439 8D1D 84 C0          AND A  #$C0
01440 8D1F 2B 09          BMI    *+11     BRA IF ALARM ON
01441 8D21 27 1A          BEQ    *+28     BRA IF BOTH ALARMS OFF
01442 8D23 B6 4010        LDA A  $4010    HERE IF VAC ALARM ON
01443 8D26 84 10          AND A  #$10     CHECK FOR TENSIONED TAPE
01444 8D28 27 13          BEQ    *+21     BRA IF TAPE NOT TENSIONED
01445 8D2A 96 42          LDA A  $42      GET ALARM FLAG
01446 8D2C 27 04          BEQ    *+6      BRA IF FLAG = 0
01447 8D2E 4A             DEC A           DECREMENT FLAG NUMBER
01448 8D2F 97 42          STA A  $42      STORE ALARM FLAG
01449 8D31 39             RTS
01450 8D32 86 1F          LDA A  #$1F     SET ALARM FLAG
01451 8D34 97 42          STA A  $42      STORE ALARM FLAG
01452 8D36 96 29          LDA A  $29      GET ALARM INDICATOR
01453 8D38 88 01          EOR A  #$01     CHANGE INDICATOR STATUS
01454 8D3A 97 29          STA A  $29      STORE INDICATOR STATUS
01455 8D3C 39             RTS
01456 8D3D 86 55          LDA A  #$55     ALARM INDICATOR OFF CODE
01457 8D3F 97 29          STA A  $29      STORE INDICATOR STATUS
01458 8D41 7F 0042        CLR    $0042    CLEAR INDICATOR FLAG
01459 8D44 39             RTS
01460 8D45 B6 4004 LOOK   LDA A  P1AD     GET MACHINE STATUS
01461 8D48 84 03          AND A  #$03
01462 8D4A 81 01          CMP A  #$01
01463 8D4C 39             RTS
01464 8D4D 0F       DUMP  SEI
01465 8D4E 7F 4010        CLR    P3AD
01466 8D51 20 FB          BRA    DUMP+1
01467 8D53 7E 89A3 EK     JMP    CLR511   UCPOT GT 3
01468 8D56 3B             RTI             FOT MOTION IS REVERSE
01469 8D57 02             NOP
01470 8D58 02             NOP
01471 8D59 7E 89A3        JMP    CLR511   UCPOT GT 3
01472 8D5C 3B             RTI             BOT MOTION IS FORWARD
01473 8D5D 02             NOP
```

```
DG16                MOTOROLA M6800 CROSS-ASSEMBLER              PAGE 31
                                                                DATE- MAR 14,'78

01474 8D5E 02                    NOP
01475 8D5F 7F 8CBE               JMP    RST       UCFBD GT 3
01476 8D62 7E 8CBE               JMP    RST       UCBBD GT 3
01477 8D65 39          I8        RTS              SCANNED ENTRY POINT FOR SPECIAL
01478 8D66 02                    NOP              CONTROL INPUTS
01479 8D67 02                    NOP
01480 8FF8                       ORG    $8FF8
01481 8FF8 88C7                  FDB    POLL,DUMP,DUMP,START
      8FFA 8D4D
      8FFC 8D4D
      8FFE 8400
01482                            END
```

SYMBOL TABLE

| | | | | | | | | | | |
|---|---|---|---|---|---|---|---|---|---|---|
| P1AD | 4004 | P1AC | 4005 | P1BD | 4006 | P1BC | 4007 | P2AD | 4008 | P2AC | 4009 |
| P2BD | 400A | P2BC | 400B | P3AD | 4010 | P3AC | 4011 | P3BD | 4012 | P3BC | 4013 |
| ACIS | 4040 | ACID | 4041 | RM | 0000 | START | 8400 | STRT | 844F | INV | 8475 |
| CMD1 | 8483 | CMD2 | 8495 | PLBAD | 84B0 | PDIS | 84B9 | LDT | 84C2 | SPEED | 84C5 |
| DIS | 84D1 | FTRST | 84D2 | THRDY | 84DE | CMD3 | 84E1 | TPMV | 84FF | CBNDR | 851F |
| CMD4 | 8530 | EOTBOT | 854C | SHUTTL | 8550 | TSEN | 8554 | SEARCH | 8558 | XBRA | 855A |
| CTS | 8574 | TSFR | 857F | FSK | 8586 | SRFT | 8599 | SEND | 85A1 | LDTW | 85A5 |
| RET | 85CF | LDTWA | 85D0 | LDTW1 | 85FB | LDTX2 | 85FF | LDTX5 | 8603 | LDTWJ | 8605 |
| LOCAL | 861A | CMD5 | 862D | STBP | 8654 | STBP2 | 865B | STBP3 | 8668 | STBP4 | 866C |
| STBP5 | 8675 | FWD | 867A | FWD1 | 868B | FWD2 | 8695 | REV | 8699 | REV1 | 86AC |
| REV2 | 86B6 | FR | 86BA | FR1 | 86CD | FRP | 86D7 | SENDM | 86DE | SENDM2 | 86E1 |
| SENDM1 | 86F2 | STBP1 | 86F8 | STEP6 | 8712 | STBP7 | 872A | STBP8 | 8736 | STBP9 | 8744 |
| DL | 8757 | FTBUT | 8777 | BUT1 | 877D | BUT2 | 8798 | BUT3 | 87AD | BLNK | 87B3 |
| DP | 87B7 | SETPCF | 87CE | BBTBUT | 87DB | EBTBUT | 87E0 | UCBDB | 87E5 | UCEDB | 87EA |
| UCBTB | 87EF | UCETB | 87F4 | PCF | 87F9 | DP1 | 87FE | DP2 | 8811 | LBCALD | 8829 |
| DISP | 8851 | DELAY | 885E | MBRE | 8864 | RM48 | 886E | EXIT | 887A | BBDBUT | 887B |
| EBDBUT | 8880 | BUT5 | 8883 | BUT4 | 888B | BUT7 | 8891 | BUT6 | 8898 | BUT8 | 88A4 |
| BLNK5 | 88BA | BLNK3 | 88BE | POLL | 88C7 | CMDR | 88DF | CNT1 | 88F2 | CNT2 | 8900 |
| PUT | 8918 | PUT1 | 891D | BPT | 891E | CNTUP | 8921 | CNT3 | 892A | CMD0 | 8946 |
| EOT1 | 8949 | UCFR | 896E | UCREV | 8975 | UCRCRV | 897C | ECBDE | 8983 | FLTBFF | 898F |
| CLR511 | 89A3 | RT | 89A6 | LDFC | 8947 | BBT1 | 8984 | UCFF | 89D9 | UCFWD | 89E0 |
| UCRCFW | 89E7 | RBTBFF | 89EE | DECHEX | 8A06 | ADJ | 8A1D | ST5? | 8A30 | CKMC | 8A3B |
| CLRMC2 | 8A40 | STI | 8A49 | TS | 8A52 | TSYN1 | 8A5A | RT1 | 8A67 | CBNT1 | 8A72 |
| RCRV | 8A7A | CLRMC | 8A81 | CPBAD | 8A87 | TSYN | 8A92 | NSPSLK | 8A98 | PCFBN | 8AA1 |
| RCFL | 8AAC | REC | 8AB3 | RFC1 | 8AC7 | RECFWD | 8ACC | RF1 | 8AF7 | RECREV | 8AFC |
| RR1 | 8B09 | FF | 8BCE | FF1 | 8B20 | FF2 | 8B2B | FSTRT | 8B35 | PSTRT | 8B39 |
| R | 8B60 | CBNDX | 8B66 | CDXRD | 8B6E | CDXRC | 8B7E | BJTF | 8B85 | CLIN | 8B8C |
| ATBB | 8B9E | CKAA | 8B47 | STAC | 8BD8 | GBAP | 8BEA | GBAC | 8C02 | FFAB | 8C1A |
| DPIN | 8C2E | SHUTCK | 8C49 | SHUT | 8C4E | SHUT1 | 8C58 | FSTBP | 8C6F | FREV | 8C76 |
| FRVRC | 8C7D | SHUT2 | 8C87 | RFF | 8CAC | RSTBP | 8CA7 | RFWRC | 8CAE | LDSC | 8C93 |
| RST | 8CBE | RT3 | 8CC2 | THRDX | 8CC5 | THRY | 8CCD | TTD | 8CD7 | TT | 8CDF |
| L | 8CE5 | D | 8CEB | CMDR1 | 8D01 | ALARM | 8D1A | LBBK | 8D45 | DUMP | 8D4D |
| EK | 8D53 | I8 | 8D65 | | | | | | | | |

ALPHA SYMBOL TABLE

LIST 31

DG16  MOTOROLA 68SAM CROSS-ASSEMBLER  PAGE 32
DATE- MAR 14,'78

| Symbol | Addr | Symbol | Addr | Symbol | Addr | Symbol | Addr | Symbol | Addr | Symbol | Addr |
|---|---|---|---|---|---|---|---|---|---|---|---|
| ACID | 4041 | ACIS | 4040 | ADJ | 8A1D | ALARM | 8D1A | ATBR | 8B9E | BLNK | 8783 |
| BLNK3 | 88BE | BLNK5 | 889A | BRDOUT | 827B | BRT | 891E | BRT1 | 89R4 | BRTOFF | 89EE |
| BRTBUT | 87DB | CDXRC | 887E | CDXRD | 8B6E | CKAA | 8BA7 | CK1C | 8A38 | CLIN | 8BBC |
| CLR511 | 89A3 | CLRMC | 8AB1 | CLRMC2 | 8A40 | CMDC | 8946 | CMD1 | 8483 | CMD2 | 8495 |
| CMD3 | 84E1 | CMD4 | 853C | CMD5 | 862D | CMDR | 8BDF | CMDR1 | 8D01 | CNT1 | 8BE2 |
| CNT2 | 8900 | CNT3 | 892A | CNTUP | 8921 | CONDR | 851F | CONDX | 8B66 | CONT1 | 8A72 |
| CP2AD | 8A87 | CTS | 8574 | D | 8CEB | DECHEX | 8A06 | DELAY | 8B5E | DIS | 84D1 |
| DISF | 8851 | DL | 8757 | DP | 8787 | DP1 | 87FE | DP2 | 8811 | DPIN | 8C2E |
| DUMP | 8D4D | ECADE | 8983 | FK | 8D53 | F9DOUT | 8880 | E9T1 | 8949 | FATBAT | 854C |
| EBTOFF | 89RF | EBTOUT | 87E0 | EXIT | 827A | FF | 8BCE | FF1 | 8B20 | FF2 | 8B2B |
| FFAB | 8C1A | FR | 86BA | FR1 | 86CD | FR2 | 86D7 | FREV | 8C76 | FRVRC | 8C7D |
| FSK | 8586 | FSTOP | 8C6F | FSTRT | 8935 | FTOUT | 8777 | FIRST | 84D2 | FWD | 867A |
| FWD1 | 868B | FWD2 | 8695 | GOAB | 8BEA | G9AC | 8CC2 | INV | 8475 | IR | 8D65 |
| L | 8CE8 | LDFC | 89A7 | LDSC | 8CB3 | LDT | 84C2 | LDTW | 85A5 | LDTW1 | 85FB |
| LDTW2 | 85FF | LDTW5 | 8603 | LDTWA | 850C | LDTKJ | 8605 | LECAL | 861A | LPCALD | 8829 |
| LOOK | 8D45 | MORE | 8864 | NAPSLK | 8A98 | OUT1 | 877D | OUT2 | 8798 | OUT3 | 87AD |
| OUT4 | 8888 | OUT5 | 8883 | OUT6 | 8898 | OUT7 | 8891 | OUT8 | 88A4 | OUTF | 88B5 |
| P1AC | 4005 | P1AD | 4004 | P1BC | 4007 | P1BD | 4006 | P2AC | 4009 | P2AD | 4008 |
| P2BC | 400B | P2BD | 400A | P3AC | 4011 | P3AD | 4010 | P3BC | 4013 | P3BD | 4012 |
| PCF | 87F9 | PDIS | 8489 | PLOAD | 8480 | POLL | 88C7 | PUT | 891B | PUT1 | 891D |
| R | 8B60 | RCFL | 8AAC | RCFON | 8AA1 | RCRV | 8A7A | REC | 8AB3 | RFC1 | 8AC7 |
| RECFWD | 8ACC | RECREV | 8AEC | RET | 85CF | RFWRC | 8CAF | REV | 8699 | REV1 | 86AC | REV2 | 86B6 |
| RF1 | 8AE7 | RFF | 8CA0 | RFWRC | 8CAF | RM | C0C0 | R14R | 886F | RR1 | 8909 |
| RST | 8CBE | RSTOP | 8CA7 | RSTRT | 8B39 | RT | 89A6 | RT1 | 8A67 | RT3 | 8CC2 |
| SEARCH | 855B | SEND | 8541 | SENDM | 86DE | SENDM1 | 86F2 | SENDM2 | 86F1 | SETPCF | 87CE |
| SHUT | 8C4E | SHUT1 | 8CEB | SHUT2 | 8C87 | SHUTCK | 8C49 | SHUTTL | 8550 | SPEED | 84C5 |
| SRFT | 8599 | ST53 | 8A30 | STAC | 8BD8 | START | 8400 | STI | 8A49 | STOP | 8654 |
| STOP1 | 86F8 | STOP2 | 865B | STOP3 | 866B | STOP4 | 866C | STOP5 | 8675 | STOP6 | 8712 |
| STOP7 | 872A | STOP8 | 8736 | STOP9 | 8744 | STRT | 844F | THDRDX | 8CC5 | THDRDY | 84DE |
| THDY | 8CCD | TPMV | 841F | TS | 8A52 | TSEN | 8554 | TSFR | 857F | TSYN | 8A92 |
| TSYN1 | 8A5A | TT | 8CDF | TTD | 8CD7 | UCADR | 87E5 | UCBTR | 87FF | UCEDR | 87EA |
| UCETR | 87F4 | UCFF | 8909 | UCFR | 894E | UCFWD | 89EC | UCRCFW | 89F7 | UCRCRV | 897C |
| UCREV | 8975 | XORA | 853A | | | | | | | | |

LIST 32

TAPE CONTENTS

```
SC0600C04844521B
S11384CCCF7F40057F4C077F40097F400B7F401160
S113841C7F40138FFB740CAB74010860FB7401258
S113842CB740067F40047F40089605374C05974C43
S113843C07B740134AB740118CDB740098634B7D1
S113844C400B7F40108603B74C4C86AAB7404CCE19
S113845CCC7F6F00098C000026F8730015BF0C7FE2
S113846CBD8BC86539728865597299614810428A7
S113847C04810D2B028609B7401297148D8A060E9B
S113848C7E87777F0044864008843FCER13F2A04EC
S113849C81102A013B81192B482737811A273F81F4
S11384AC1F2B7C81242H2A812E2B1/813C2A013BFD
S113843C81352B0F81372A013B813C2B14813F2BC5
S11384CC013B7F85A5840F97147D00462603974CA3
S11384DC12384F97019702970397049705397E8CB5
S11384EC58115271A81102747F64004C4102601B8
S11384F03B8113270481142637C6FFD74B2C317DD7
S113850CCC4B2608F64004C50127953B9639C14C44
S1138510270SC150270538B611201386122011819D
S113852C1B27298110272981102728811F27293BD7
S113853C4848973986597389740S D73FD74707BC
S113854C48D74ABD8B8CD614F7401238860200ACB
S113855C86022006860420028608931597150F64CA0
S113856C10C40FC101270DC103270901092717C171
S113857C0B271338404270862084401C20228649
S113858C53B4401020184C63BF440108408270A96BD
S113859C14B74012CABC17200886C4B7401C2CA4C64
S11385AC17B7401038912D27269720813427218121
S11385BC32272281332723813027248131272581C3
S11385CC34272631302727813D2728813F27293BBD
S11385DCCFC0005202FCE000A2C29CE000F2024CE66
S11385EC001120180C0132016CE0C162000CE0C45
S11385FC172008CE0018200C3CE00 98671200686A5
S113860C7220028675973ABD88510004270B96C7
S113861C4C1284F04444444420058640C8843FA7F3
S113862C0009963A4A81712ADC8D8AC63BDF386E1F
S113863CF17E8654C27E8ACC027F8AEC027F867AA1
S113864CC027F8699027E8AB30273 180E027F86BAF1
S113865C027E8B9E864C971FBD8B5184C041684C7
S113866CEB2612C41C2704861020314F8740107F58
S113867CC02E7E8777BD86FB2CF53642072CBD8B38
S113868C51EDB0452705BD70BD8B35961584042706
S113869C048671200286512045864497218D385165
S11386ACB640048402260504F8D8B3996158404BB
S11386BC270486732002865320248648072BD88R4
S11386CC518640048402260582DF8D8B3996158A3F
S11386DC082704863200286048740128678974C70
S11386EC10864004168401260904042605BD877704
S11386FC2CEF7FC02E7E8777B640CC9741F4400426
S113870CC4012748B4538A4CB74C1C974686C0B762
S113871C4C12BDRC2EB6400416C40127F840826AF
S113872C098054B640048405278B6401C84138772
S113873C4C10B6059745BD8C2EBD87777A00457D1C
S113874C004526F2864C10841C874C10B6400484A9
S113875C2F26F1860594588D8C2EBD87777A004577
S113876C7D004526F27F00417F09469614B74C12F3
S113877C86039736973739CE00057E8B83B46578DA2
S113878C8851863FBD8851862FBD8851861FBD887C
S113879C51A600BD8851201F8657BD8851863FB0014
S\11387AC8851862FBD8851A6C02708A1CBD88519C
S11387BC7E8BA4861F20F6964 73E7F0C40962C92
S11387CC27CC32327D0C41270 2327F004186 F68
S11387DC972E86C3973697377E862DCE0C112CB8C4
S11387EC0C0013208C3CE00162093CE00172A8ECED9
S11387FC001820R9CE0C1920B4962E27013ABD8CBB
S113880C49BD8A38BDBC2E7F002D963F27037F8B71
S113881CA77D00442713B64012B4F0F64C08C4CC74
S113882C54544444444418205864008843F812CEA
S113883C27A9812127AA81222741812327428813721
S113884C27A3813827A4813927A5813A27A67E87C3
S113885C77C6F F7400AB006B7400A80013CC60373
S113886CD73' 73170003127057A0C312CF6D73152
S113887C7D003027057A00302CEA39CE000A200333
S113888CCE000FA600972A27318656BDC4C43CD74E
```

```
S113889C2B09A6002728972A9A2B8DB5D62PC01C12
S11388ACD72P26ED09A6008DA87D0C4927037A0C5F
S11388BC4BFDRD1ABD8D657E8797R6572CCD7D0C53
S11388CC2A26D5R60F20D1B64005B16B640072B95
S11388DC78B640C9284848286DB6+C132R013R7EDC
S11388E08D01R64C04C6FFD13327037C0C33CE0C8C
S11388F00084029732272AA6004A2E1F8664972FE7
S113890CA7000BA6004A2C1386093C000426F1A7A8
S113891C0008A6C04A84812C028601A7003B7E89B8
S113892CB4A6004CR1642PF3972F6FC00RA6OC4C6B
S113893C81CA2BF78C0C0426F16F0C08A6004C8105
S113894C022BD86F0O3B7E8483B64C0670O0322261E
S113895C0357A0037264D6O3973796330615C401EA
S113896C262D9135243D96192604B64020394A2621
S113897C04865C20324A2604865O2C284A2604862C
S113898C4B20247E8D537E8D567E8D597E8D5CF6D7
S113899C4010C4C82710818O24098605974012R638
S11389AC4C20047FC0333B97398685973897408D28
S11389BC8B8C29FFB64O087D0C3227007A00362613
S11389CCE286039736963D0615C40126219134242C2
S11389DCD2961B2604864020CE4A26048658P2CC7FC
S11389EC4A2604864C2CC04A269FR64420B9FF4C75
S11389FC10C4082601398180250O37E89A366059720
S1138A004012865C20A1CE0010A60C840FA700A615
S1138A1C014848484BAA000C16C00A250680O6CC2A
S1138A201C24FAB48C8C0010260697340802PCD96D
S1138A3C973586709C885139B64004168410274195
S1138A4C01781102704811426099464C261A96PE26B8
S1138A5C1617R4202A3C864F97241784082273986C4
S1138A60509727963C260139178402260086759740
S1138A7C4010864A97247FC03C398677A7401O2CFF
S1138A8CF1963C270220B97F401OBDR8RC8653970A
S1138A902833864F9726200C286519727963CP260170
S1138AAC039963D8010973CR4F027013996248B013A
S1138ABC97243986439724973CBDR451B64004844B
S1138ACC1027C486142C028604786DER64A972484
S1138AD0973CBDR851B642972C0DR651BD8D45275E
S1138AEC06BD86F8BD8H3586517FR6DER64A972480
S1138AFC973CBDR8518644972180R851B640048473
S1138B0C022606RD86F8BD8R23986537ER4CF8646F0
S1138B1C9722BD8851BD8D452706BDR6F88DR835RE
S1138B2C9615B408270586897E86DE8604B740122A
S1138B3C86797F86DE86112C028613C6009746F757
S1138B4C4012B7401CF64004C40327F6R640108A15
S1138B5C4C874010964A260996148740127F004643
S1138B6C039B7401220FAC6C49615973B8658972CBD
S1138B7C7C002C760O3BD73F250HBD88514C4C064F
S1138B8C3E5A26FA39962C8D88512CF2R641CF2C01
S1138B901FA7004C4C088153     77F003C39264CR4
S1138BAC973F9725BD8851CEC0O5A6C0A105263A1A
S1138BB0098C00O026F4860F9747B64004840127E9
S1138BCC01786439720864597218647972286499798
S1138BD02302C2028640204B4F973F9747974897C1
S1138BE04A972E864D97257E87770707497D00047BC
S1138BF02610B604B74012974A9649062B1C865CR9
S1138C0C201A96482625860F97437CC04A964906DE
S1138C1C2B0486502006864C20028658C641D71F56
S1138C2C9739B685973897407F0O2E7E8777CFE0CC8
S1138C30 1FA6C0BDB8851088C0C2A26F58DB8669688
S1138C40 14840F8A60BD885139962F2601399615F0
S1138C5C84C227047F0O2F39CE0005A600A10A262E
S1138C6C2609BCOC0026F496172604865C20444AC4
S1138C7026048640203D4A2604865C20364A26048F
S1138C8C8648202F7ERD5FCE0005A600A105270211
S1138C9C2C2C098C000026F29612604864C2013FC
S1138CAC4A2604865820OC4A26C4B640P2C054A2473
S1138CB0118644973986859738974CBDR88C7F0C01
S1138CCC2F397E8D62864004B4C527013886019BC6
S1138CDC289728840127087F40108641971F3886E5
S1138CEC10B74010B6069743CEFFFFB64C04R41CA9
S1138CFC27058640971F3B0926F17A0043P6E92C81
S1138D0CD6F64008C4C0864012UAFC0E444444442D
S1138D1C054541BC6C5D7447ER48CR6400684C02BAD
S1138D2C09271AB640108410271396422704449730
S1138D3C4239861F9742962988O19729338655978A3
```

```
S1138D4C297F004239H64004840381C1390F7F4CF2
S113805C1C20F87E89A33H02C27E89A33H02027E94
S10H8D6C8CPE7EPCHE390202B8
S10B8FF888C78D4D8D4D840CE6
S9030COCFC
 *STEP* 0
 FIN
 TOTAL JOB TIME=00:15:51
   BEGIN IDLE
```

LIST 35

I claim:

1. In combination with tape recorder means including source and take up reels, transducer means and transport means including a capstan and a motor for driving said capstan for transporting tape from one of said reels in predetermined relation with said transducer means onto the other of said reels, apparatus comprising: first sensor means for generating output signals representative of angular displacement of said capstan motor; first and second reel motors for driving said source and take up reels respectively; second and third sensor means for generating signals representative of the angular displacement of the said first and second reel motors respectively; data processor circuit means responsive to said output signals of said first, second and third sensor means for generating signals representative of the ratio of the output signals of said first sensor means to the output signals of one of said second and third sensor means associated with the reel being emptied, said ratio being independent of the speed of said motors and defining an End of Tape position for said source reel and a Beginning of Tape position for the said take up reel.

2. The apparatus of claim 1 further comprising data entry means actuatable by an operator for generating signals representative of predetermined Beginning of Tape and End of Tape positions, said data processor circuit means being responsive to said signals from said data entry means for storing the same and for comparing the same with said generated signals representative of Beginning of Tape and End of Tape positions respectively to determine when the reel being emptied has reached an associated one of said Beginning of Tape and End of Tape positions, whereby said positions may be changed under operator control by means of said data entry means.

3. The apparatus of claim 1 further comprising ENABLE BOT switch means; function switch means having a plurality of positions including a User Command at Beginning of Tape position and a User Command at End of Tape position, said data processor circuit means being responsive to said data entry means and to said function switch means for entering User Command data representative of a desired function to be performed at one of said Beginning of Tape and End of Tape positions, said data processor circuit means transmitting command signals representative of the desired function to said tape transport when the reel being emptied reaches the associated Beginning of Tape or End of Tape position, and said ENABLE BOT switch is actuated; and control means responsive to said command signals from said data processer circuit means for controlling said tape transport to effect said desired function when said Beginning of Tape or End of Tape position is reached.

* * * * *

UNITED STATES PATENT AND TRADEMARK OFFICE
CERTIFICATE OF CORRECTION

PATENT NO. : 4,302,784
DATED : November 24, 1981
INVENTOR(S) : Thomas J. Mussatt It is certified that error appears in the above-identified patent and that said Letters Patent are hereby corrected as shown below:

In the Abstract:

Line 8, "as" should read -- at --.

Column 2, line 8, "of" should read -- to --.

Column 3, line 63, "realtive" should read -- relative --.

In the Charts List, "R SHT1" should read -- R SHUT1 --.

In the Charts List, "T CLR511" should read -- T CRL511 --.

In the Charts List, "V LOFC" should read -- V LDFC --.

In the Charts List, "CC -" should read -- CC SPEED --.

In the Charts List, after "VV SEND M" insert -- WW NM1 --.

Column 6, line 65, "describe" should read -- described --.

Column 7, line 40, "tap" should read -- tape --.

Column 8, line 12, "bearing" should read -- bearings --.

Column 8, line 67, insert -- , 236 -- after "234".

Column 9, line 54, "366" should read -- 306 --.

UNITED STATES PATENT AND TRADEMARK OFFICE
CERTIFICATE OF CORRECTION

PATENT NO. : 4,302,784
DATED : November 24, 1981
INVENTOR(S) : Thomas J. Mussatt It is certified that error appears in the above-identified patent and that said Letters Patent are hereby corrected as shown below:

Column 9, line 68, "258" should read -- 268 --.

Column 10, line 18, "CCW" should read -- CW --.

Column 13, line 17, "364" should read -- 364B --.

Column 17, line 4, "436-436F" should read -- 436A-436F --.

Column 17, line 18, "as" should read -- are --.

Column 17, line 24, "483A" should read -- 438A --.

Column 17, line 42, "if" should read -- is --.

Column 18, line 11, "436F" should read -- 436 --.

Column 18, line 57, "bepart" should read -- be part --.

Column 19, line 51, "445F" should read -- 445E --.

Column 20, line 2, "of", second occurrence, should read -- by --.

Column 22, line 54, "oscillaotr" should read -- oscillator --.

Column 24, line 51, "6D7" should read -- 6C7 --.

Column 24, line 59, "phase" should read -- signal --.

Column 25, line 50, "356A" should read -- 356D --.

UNITED STATES PATENT AND TRADEMARK OFFICE
CERTIFICATE OF CORRECTION

PATENT NO. : 4,302,784
DATED : November 24, 1981
INVENTOR(S) : Thomas J. Mussatt It is certified that error appears in the above-identified patent and that said Letters Patent are hereby corrected as shown below:

Column 27, line 2, "11" should read -- 411 --.

Column 28, line 23, "356" should read -- 356C --.

Column 28, line 37, "has" should read -- had --.

Column 28, line 64, "CUP" should read -- CPU --.

Column 29, line 7, "of", second occurence, should read -- by --.

Column 29, line 28, insert -- and -- before "depressing".

Column 29, line 30, "aand" should read -- and --.

Column 29, line 32, "reference" should read -- referenced --.

Column 30, line 16, "516-621" should read -- 516-521 --.

Column 30, line 19, "24" should read -- 524 --.

Column 30, line 21, "of" should read -- to --.

Column 30, line 36, "shown," should read -- shown. --.

Column 31, line 1, "the" should read -- to --.

Column 31, line 1, "(Chart H)" should read -- (Chart G) --.

Column 31, line 3, "SCHTCK" should read -- SHUTCK --.

UNITED STATES PATENT AND TRADEMARK OFFICE
CERTIFICATE OF CORRECTION

PATENT NO. : 4,302,784
DATED : November 24, 1981
INVENTOR(S) : Thomas J. Mussatt It is certified that error appears in the above-identified patent and that said Letters Patent are hereby corrected as shown below:

Column 31, line 11, "were" should read -- was --.

Column 31, line 15, "Chart I" should read -- Chart J --.

Column 31, line 16, delete "set", first occurrence.

Column 31, line 17, "Chart I" should read -- Chart J --.

Column 31, line 20, "514" should read -- 614 --.

Column 31, line 37, "Chart F" should read -- Chart G --.

Column 31, line 50, "Chart G" should read -- Chart H --.

Column 31, line 51, "Chart G" should read -- Chart H --.

Column 31, line 67, "Chart H" should read -- Chart G --.

Column 32, line 52, "SHUT" should read -- SHUT2 --.

Column 33, lines 10 and 11, "wheterh" should read -- whether --.

Column 33, line 22, "CLRI11" should read -- CRL511 --.

Column 33, line 27, "240" should read -- 120 --.

Column 33, line 31, "fo" should read -- of --.

Column 33, line 35, "were" should read -- was --.

UNITED STATES PATENT AND TRADEMARK OFFICE
CERTIFICATE OF CORRECTION

PATENT NO. : 4,302,784
DATED : November 24, 1981
INVENTOR(S) : Thomas J. Mussatt It is certified that error appears in the above-identified patent and that said Letters Patent are hereby corrected as shown below:

Column 33, line 41, "brances" should read -- branches --.

Column 33, line 58, "fottage" should read -- footage --.

Column 33, line 58, "THDRDX" should read -- THRDX --.

Column 33, line 61, "LTDW" should read -- LDTW --.

Column 33, line 62, "933" should read -- 973 --.

Column 34, line 50, "the", first occurrence, should read -- then --.

Column 34, line 52, delete "whether".

Column 34, line 62, "DEX HEX" should read -- DECHEX --.

Column 34, line 66, "1175" should read -- 1115 --.

Column 35, line 46, "61-63" should read -- 1161-1163 --.

Column 36, line 39, "1120" should read -- 1220 --.

Column 36, line 52, "the" should read -- then --.

Column 36, line 62, "jump" should read -- jumps --.

Column 36, line 65, delete the comma after "REVERSE".

UNITED STATES PATENT AND TRADEMARK OFFICE
CERTIFICATE OF CORRECTION

PATENT NO. : 4,302,784

DATED : November 24, 1981

INVENTOR(S) : Thomas J. Mussatt

It is certified that error appears in the above-identified patent and that said Letters Patent are hereby corrected as shown below:

Column 36, line 66, "we load" should read -- it loads --.

Column 36, line 67, "branch" should read -- branches --.

Column 37, line 5, delete "not".

Column 37, line 7, insert -- not -- between "is" and "on".

Column 37, line 8, insert a comma after "second".

Column 37, line 31, "Tape" should read -- tape --.

Column 37, line 39, "1273" should read -- 1373 --.

Column 37, line 40, "1274" should read -- 1374 --.

Column 38, line 26, "jump" should read -- jumps --.

Column 38, line 40, "1328" should read -- 1328A --.

Column 38, line 46, insert -- goes -- between "program" and "to".

Column 38, line 63, "TO" should read -- OF --.

UNITED STATES PATENT AND TRADEMARK OFFICE
CERTIFICATE OF CORRECTION

PATENT NO. : 4,302,784

DATED : November 24, 1981

INVENTOR(S) : Thomas J. Mussatt

It is certified that error appears in the above-identified patent and that said Letters Patent are hereby corrected as shown below:

In the Drawing Figures:

Fig. 11, circuit 411 should be labelled — ÷200 —.

Fig. 11, photodetectors "448" should be labelled — 148 —.

Fig. 11, sources "441" should be labelled — 141 —.

Chart Y, block 958 should be labelled — BRANCH TO THRDX —.

Chart LL, blocks 1162 and 1208, "PUL" should be changed to — PULL —.

Signed and Sealed this

Twenty-seventh Day of December 1983

[SEAL]

Attest:

GERALD J. MOSSINGHOFF

Attesting Officer

Commissioner of Patents and Trademarks